US012516086B2

(12) United States Patent
Brown et al.

(10) Patent No.: US 12,516,086 B2
(45) Date of Patent: Jan. 6, 2026

(54) DUAL TARGETING FOR CELL-SPECIFIC DELIVERY TO THE CENTRAL NERVOUS SYSTEM

(71) Applicant: SRI International, Menlo Park, CA (US)

(72) Inventors: Kathlynn C. Brown, Staunton, VA (US); Indu Venugopal, Harrisonburg, VA (US); Michael McGuire, Harrisonburg, VA (US); Weiliang Xu, Stoneham, MA (US); Amanda Powell, Charlottesville, VA (US); Yitong Li, Sun Prairie, WI (US); John Marafino, Harrisonburg, VA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 18/719,490

(22) PCT Filed: Dec. 20, 2022

(86) PCT No.: PCT/US2022/082091

§ 371 (c)(1),
(2) Date: Jun. 13, 2024

(87) PCT Pub. No.: WO2023/122632

PCT Pub. Date: Jun. 29, 2023

(65) Prior Publication Data

US 2025/0002538 A1 Jan. 2, 2025

Related U.S. Application Data

(60) Provisional application No. 63/412,220, filed on Sep. 30, 2022, provisional application No. 63/292,370, filed on Dec. 21, 2021.

(51) Int. Cl.
*C07K 14/00* (2006.01)

(52) U.S. Cl.
CPC .................................. *C07K 14/001* (2013.01)

(58) Field of Classification Search
None
See application file for complete search history.

(56) References Cited

U.S. PATENT DOCUMENTS

| | | | |
|---|---|---|---|
| 2008/0193470 A1 | 8/2008 | Masignani et al. | |
| 2010/0173324 A1 | 7/2010 | Mori et al. | |
| 2013/0259924 A1 | 10/2013 | Bancel et al. | |
| 2019/0117790 A1 | 4/2019 | Song et al. | |
| 2020/0230221 A1 | 7/2020 | Irvine et al. | |

FOREIGN PATENT DOCUMENTS

| | | | |
|---|---|---|---|
| WO | WO-2005049806 A2 * | 6/2005 | ............. C07K 14/47 |
| WO | 2019014199 A1 | 1/2019 | |
| WO | 2021188802 A1 | 9/2021 | |

OTHER PUBLICATIONS

International Search Report and Written Opinion of the International Searching Authority for Application No. PCT/US2022/082091 mailed Apr. 4, 2023 (13 pages).

* cited by examiner

*Primary Examiner* — Sudhakar Katakam
*Assistant Examiner* — Zachary J Miknis
(74) *Attorney, Agent, or Firm* — Dicke, Billig & Czaja, PLLC

(57) ABSTRACT

Disclosed are MGS peptides, MTS peptides, linkers and combinations combining any combination thereof. Disclosed are MGS peptides comprising the amino acid sequence of any of the sequences set forth in SEQ ID NOs: 1-8 Disclosed are MTS peptides comprising the amino acid sequence of any of the sequences set forth in SEQ ID NOS: 9-14. Disclosed are compositions comprising at least one MGS peptide conjugated to at least one MTS peptide, wherein the MGS peptide comprises the amino acid sequence of GFHNVYPYTWGGFSDIDLMADEI (SEQ ID NO: 1); EQRWVQMLHILQTRYAGEWPG (SEQ ID NO: 2); FQHINPFPYTYSMEDTDVEIK (SEQ ID NO: 3); or YAAWPASGAWT (SEQ ID NO: 4). In some aspects, the disclosed compositions can further comprise one or more linkers.

10 Claims, 32 Drawing Sheets

Specification includes a Sequence Listing.

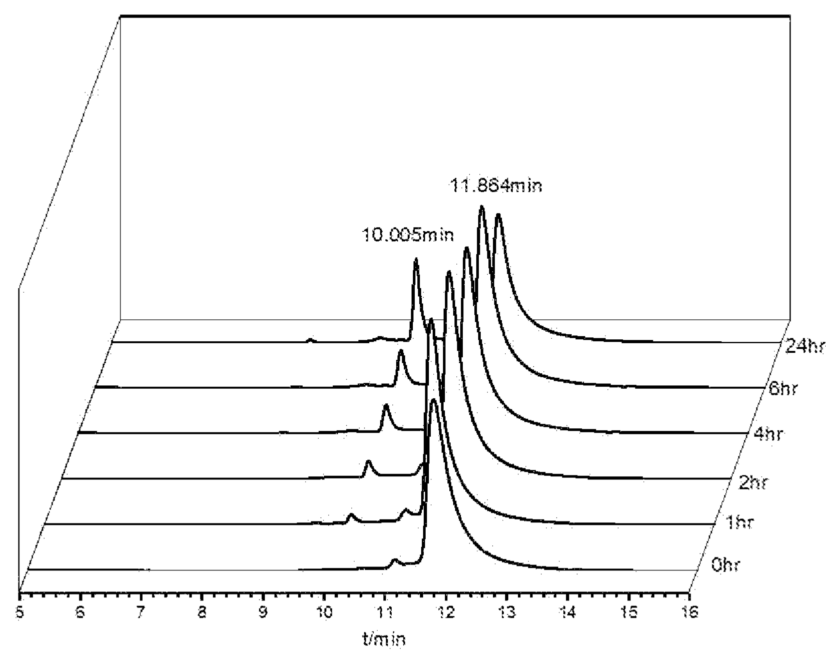
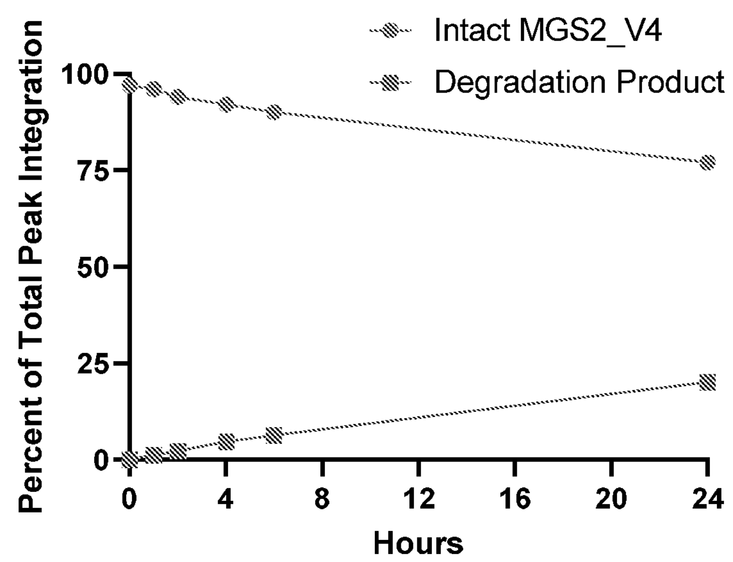
FIG. 10

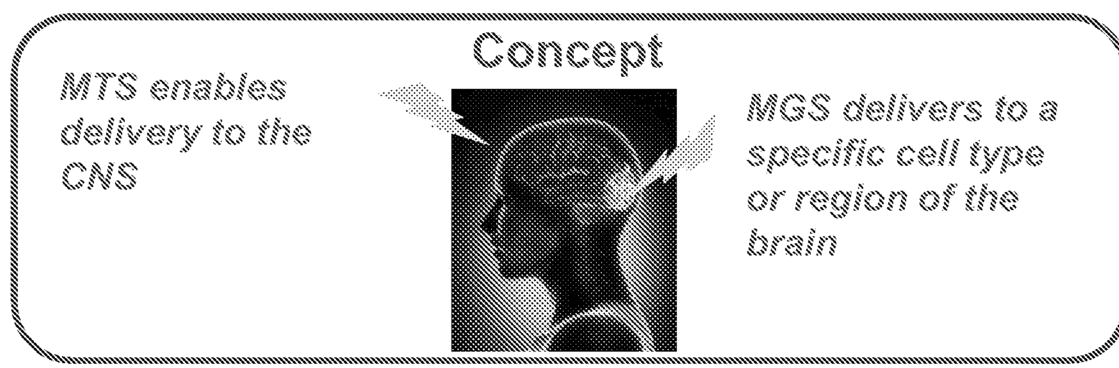
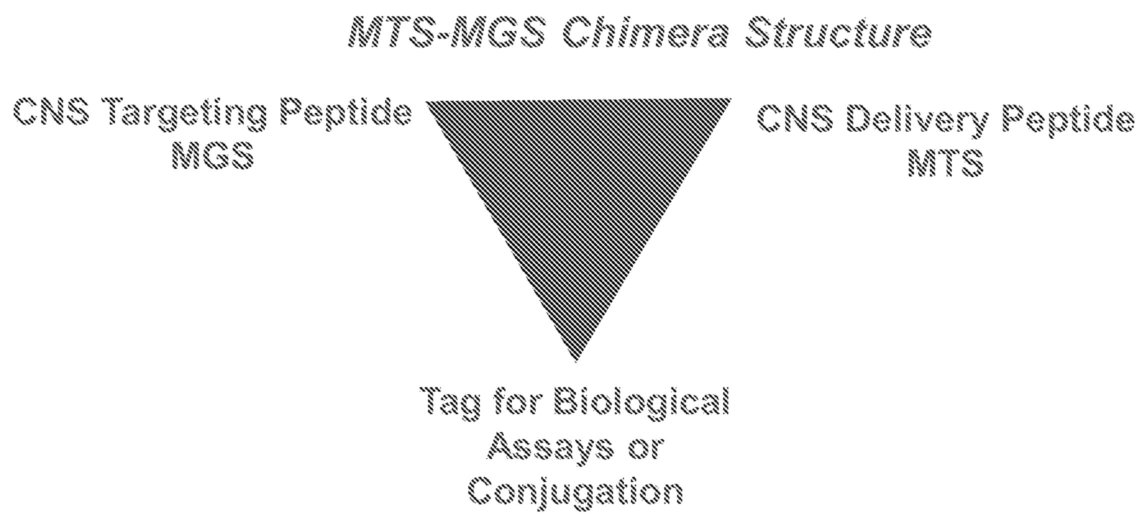
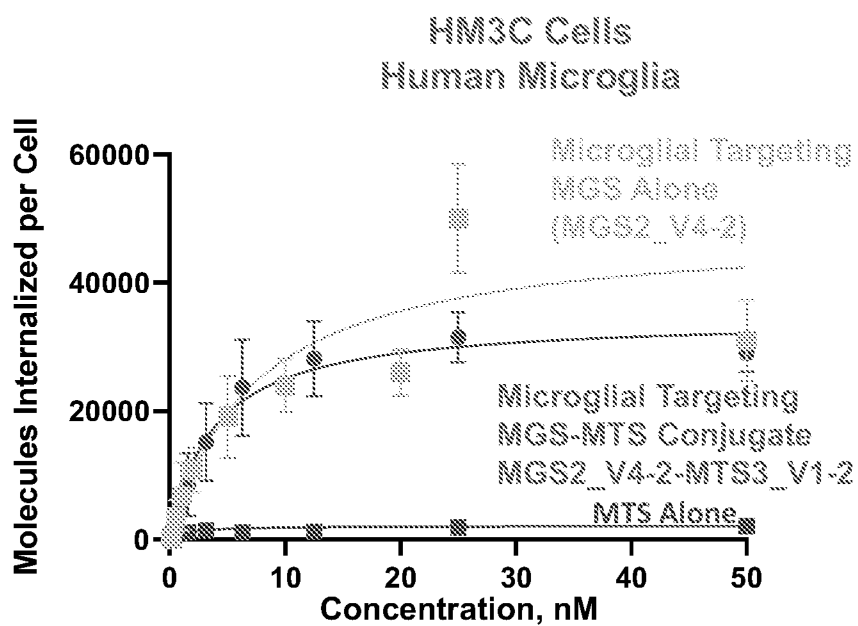
FIG. 12

*HMC3 Cells Human Microglia Cell Line*
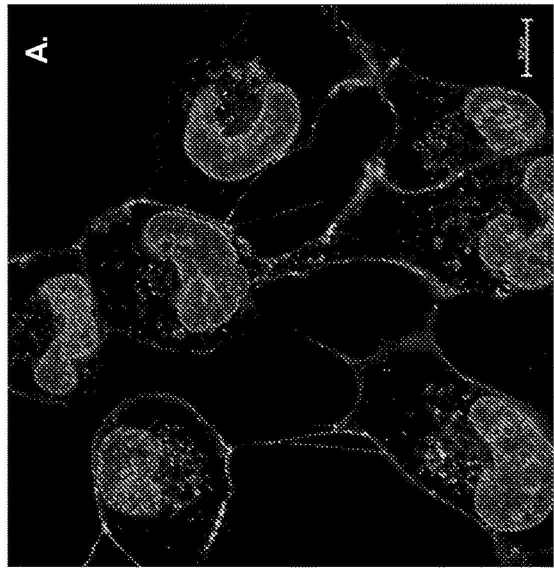
Alexa Fluor 647 Dye Only Control
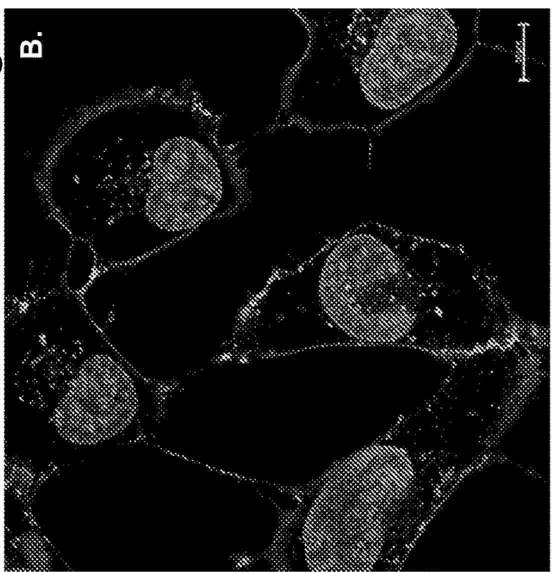
MTS3_V1-2- scrambled MGS2_V4-2 Labeled with Alexa Fluor 647 Control
MTS3_V1-2-MGS2_V4-2 Labeled with Alexa Fluor 647
Red = Alexa Fluor 647
Blue = Nuclear Stain
Green = Membrane Stain
FIG. 13A, FIG. 13B, FIG. 13C

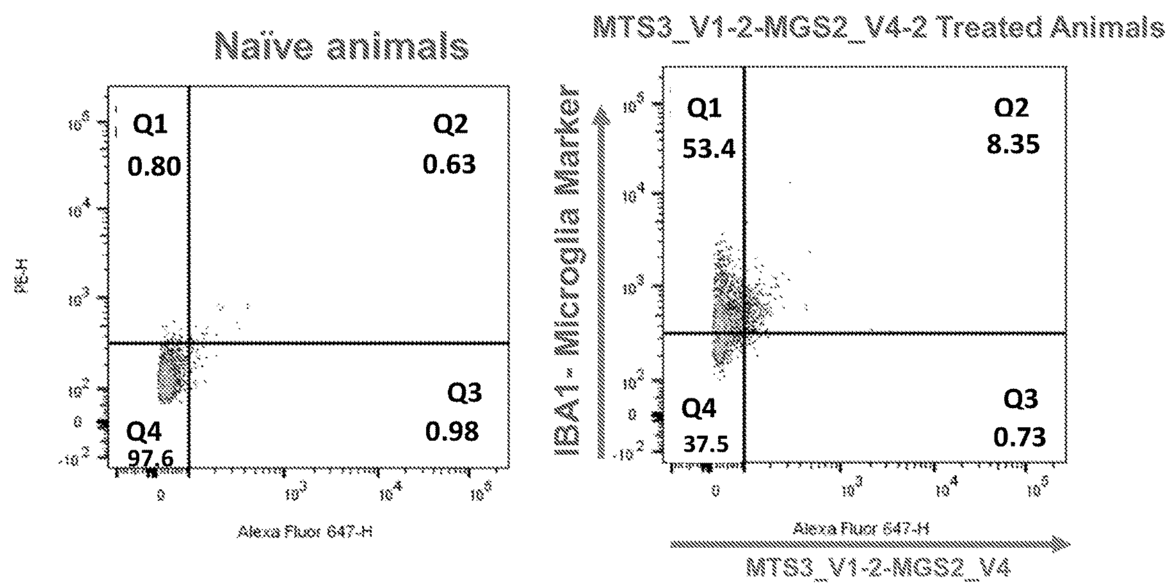

| Cell Population | Quadrant | Percentage of Cell Population |
|---|---|---|
| **Microglia Cells** (IBA1 Positive) | Q1 + Q2 | 62% |
| **Other CNS Cells** (IBA1 Negative) | Q4 + Q3 | 38% |
| **Microglia Cells that have internalized MTS-MGS chimera** (IAB1 positive and MTS_V1-2-MGS2_V4-2 positive) | Q2 | 13% of Microglia Cell Population<br>8% of Total Cell Population |
| **Other CNS Cells that have internalized MTS-MGS chimera** (IBA1 negative and MTS_V1-2-MGS2_V4-2 positive ) | Q3 | 2% of Other CNS Cell Population<br>1% of Total Cell Population |

FIG. 15

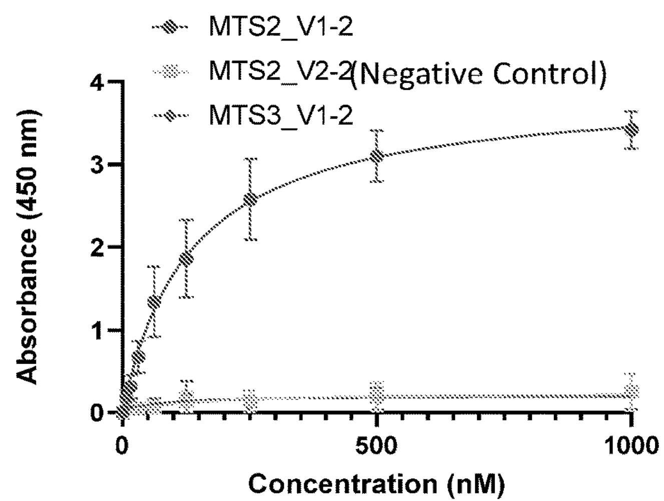
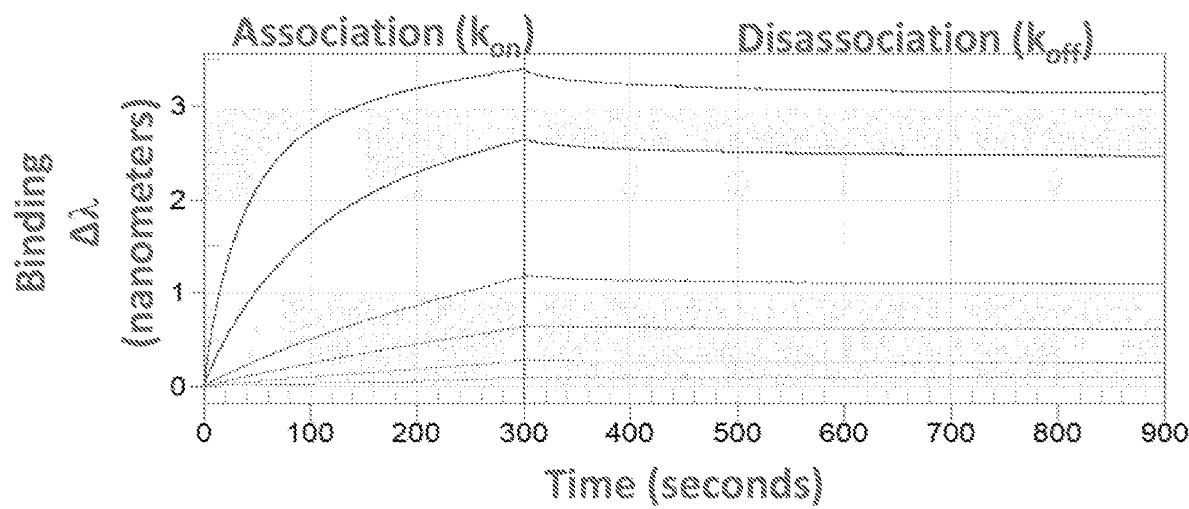
FIG. 27

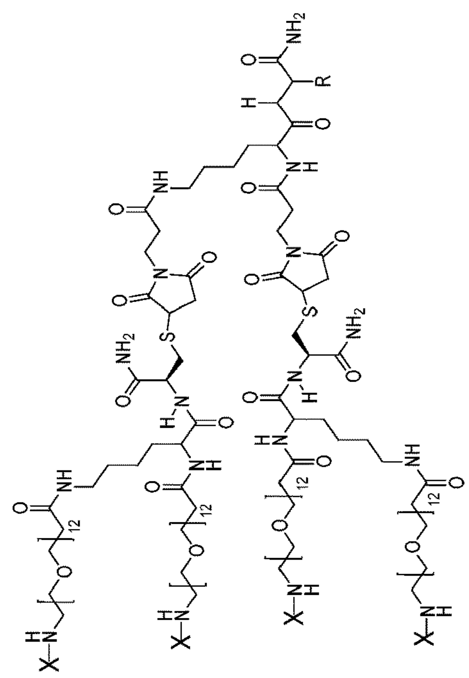
pH ~7
RT, ~3hr
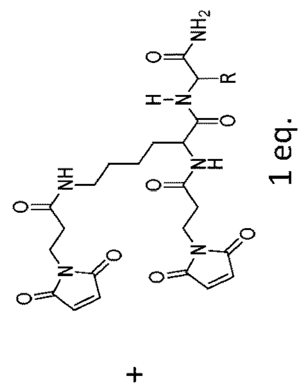
1 eq.
+
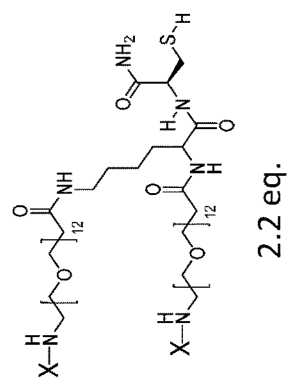
2.2 eq.
FIG. 29

SEQUENCE LISTING

```
Sequence total quantity: 17
SEQ ID NO: 1            moltype = AA  length = 23
FEATURE                 Location/Qualifiers
source                  1..23
                        mol_type = protein
                        organism = synthetic construct
SEQUENCE: 1
GFHNVYPYTW GGFSDIDLMA DEI                                         23

SEQ ID NO: 2            moltype = AA  length = 20
FEATURE                 Location/Qualifiers
source                  1..20
                        mol_type = protein
                        organism = synthetic construct
SEQUENCE: 2
EQRWVQMLHL QTRYAGEWPG                                             20

SEQ ID NO: 3            moltype = AA  length = 20
FEATURE                 Location/Qualifiers
source                  1..20
                        mol_type = protein
                        organism = synthetic construct
SEQUENCE: 3
FQHNPFPYTY SMEDTDVEIK                                             20
```

```
SEQ ID NO: 4            moltype = AA  length = 11
FEATURE                 Location/Qualifiers
source                  1..11
                        mol_type = protein
                        organism = synthetic construct
SEQUENCE: 4
YAAWPASGAW T                                              11

SEQ ID NO: 5            moltype = AA  length = 23
FEATURE                 Location/Qualifiers
source                  1..23
                        mol_type = protein
                        organism = synthetic construct
MOD_RES                 1
                        note = acetylation
SEQUENCE: 5
GFHNVYPYTW GGFSDIDLMA DEI                                 23

SEQ ID NO: 6            moltype = AA  length = 20
FEATURE                 Location/Qualifiers
source                  1..20
                        mol_type = protein
                        organism = synthetic construct
MOD_RES                 1
                        note = acetylation
SEQUENCE: 6
EQRWVQMLHL QTRYAGEWPG                                     20

SEQ ID NO: 7            moltype = AA  length = 20
FEATURE                 Location/Qualifiers
source                  1..20
                        mol_type = protein
                        organism = synthetic construct
MOD_RES                 1
                        note = acetylation
SEQUENCE: 7
FQHNPFPYTY SMEDTDVEIK                                     20

SEQ ID NO: 8            moltype = AA  length = 11
FEATURE                 Location/Qualifiers
source                  1..11
                        mol_type = protein
                        organism = synthetic construct
MOD_RES                 1
                        note = acetylation
SEQUENCE: 8
YAAWPASGAW T                                              11

SEQ ID NO: 9            moltype = AA  length = 16
FEATURE                 Location/Qualifiers
source                  1..16
                        mol_type = protein
                        organism = synthetic construct
SEQUENCE: 9
DAYKLQTSLD WQMWNP                                         16

SEQ ID NO: 10           moltype = AA  length = 16
FEATURE                 Location/Qualifiers
source                  1..16
                        mol_type = protein
                        organism = synthetic construct
MOD_RES                 1
                        note = acetylation
SEQUENCE: 10
DAYKLQTSLD WQMWNP                                         16

SEQ ID NO: 11           moltype = AA  length = 16
FEATURE                 Location/Qualifiers
source                  1..16
                        mol_type = protein
                        organism = synthetic construct
SEQUENCE: 11
FPSWTSKNQQ WTNQRQ                                         16

SEQ ID NO: 12           moltype = AA  length = 16
FEATURE                 Location/Qualifiers
source                  1..16
                        mol_type = protein
                        organism = synthetic construct
```

-continued

```
MOD_RES                1
                       note = acetylation
SEQUENCE: 12
FPSWTSKNQQ WTNQRQ                                                   16

SEQ ID NO: 13          moltype = AA  length = 16
FEATURE                Location/Qualifiers
source                 1..16
                       mol_type = protein
                       organism = synthetic construct
SEQUENCE: 13
SKETYSMNAQ RQHERS                                                   16

SEQ ID NO: 14          moltype = AA  length = 16
FEATURE                Location/Qualifiers
source                 1..16
                       mol_type = protein
                       organism = synthetic construct
MOD_RES                1
                       note = acetylation
SEQUENCE: 14
SKETYSMNAQ RQHERS                                                   16

SEQ ID NO: 15          moltype = AA  length = 16
FEATURE                Location/Qualifiers
source                 1..16
                       mol_type = protein
                       organism = synthetic construct
SEQUENCE: 15
RKSAYNQHSS QMREET                                                   16

SEQ ID NO: 16          moltype = AA  length = 12
FEATURE                Location/Qualifiers
source                 1..12
                       mol_type = protein
                       organism = synthetic construct
SEQUENCE: 16
YSMNAQRQHE RS                                                       12

SEQ ID NO: 17          moltype = AA  length = 11
FEATURE                Location/Qualifiers
source                 1..11
                       mol_type = protein
                       organism = synthetic construct
SEQUENCE: 17
SAWAGAYPWA T                                                        11
```

DUAL TARGETING FOR CELL-SPECIFIC DELIVERY TO THE CENTRAL NERVOUS SYSTEM

CROSS-REFERENCE TO RELATED APPLICATIONS

This application is a U.S. National Stage Application under 35 U.S.C. § 371 of PCT/US2022/082091, filed Dec. 20, 2022, which claims benefit to U.S. Provisional Patent Application No. 63/412,220, filed Sep. 30, 2022 and U.S. Provisional 63/292,370, filed Dec. 21, 2021, which are each incorporated herein by reference in their entireties.

REFERENCE TO SEQUENCE LISTING

The Sequence Listing submitted Dec. 20, 2022 as a ST.26 file named "37794_0099P1.xml," created on Dec. 20, 2022, and having a size of 18,251 bytes is hereby incorporated by reference pursuant to 37 C.F.R. § 1.52 (e) (5).

BACKGROUND

Access to the Central Nervous System (CNS) is the bottleneck in neurotherapeutic development. This is due to the blood brain barrier (BBB) which is a set of specialized and highly selective cellular barriers that protects the Central Nervous System (CNS). While necessary under normal physiology, the BBB prevents entry of many chemical entities such as neurotherapeutics into the brain. As a result, less than 5% of small molecule drugs cross the BBB. Furthermore, newer biologic therapies such as antibodies and gene therapies are essentially excluded from the CNS due to the BBB. Despite the discovery of the BBB over 100 years ago, no general solution for delivery to the CNS has been created. For this reason, many CNS disorders have no treatment options.

Currently, there are several approaches that others have employed to deliver to the CNS. One approach is using BBB permeable compounds. The problems with using BBB permeable compounds are that they tend to have poor biodistribution properties and off-target effects (as they often tend to be highly lipid soluble). There are also few BBB permeable compounds as less than 5% of small molecules penetrate the BBB. BBB permeable agents also have limited indications.

Another approach to access the CNS is by direct injection into the spinal cord or brain. This method is invasive and there is a risk of structural damage to surrounding tissue as well as increased risk of infection.

Disruption of the BBB is another method used. This method allows mass transport of compounds, cells, and pathogens into the CNS. This method can cause structural damage as well as neuronal dysfunction.

Intranasal delivery has also been used. This method is limited to lipophilic, small molecule drugs. Intranasal delivery has been shown to have poor distribution through the CNS. Further, intranasal delivery has variable absorption between doses and patients.

Receptor-mediated delivery (Trojan horse) methods have also been employed. This method lacks generality as it is often only effective for a single cargo. The receptors can be expressed in multiple tissues leading to poor uptake in the CNS and toxicity. Further, most receptor-mediated delivery have no cell specificity once delivered past the BBB and distribution throughout the CNS is inconsistent.

There are no known choroid plexus transporting agents or alternative methods to transport cargo across the blood cerebrospinal fluid barrier, offering a unique development opportunity to impact transport of drugs and macromolecules into the CNS. Thus, disclosed herein are compositions and methods for targeting the CNS.

BRIEF SUMMARY

Disclosed are MGS peptides comprising the amino acid sequence of any of the sequences set forth in SEQ ID NOs: 1-8 as shown in Table 1.

Disclosed herein are MTS peptides. Disclosed are MTS peptides comprising the amino acid sequence of any of the sequences set forth in SEQ ID NOs: 9-14 as shown in Table 2.

In some aspects, the linker comprises the structure of:

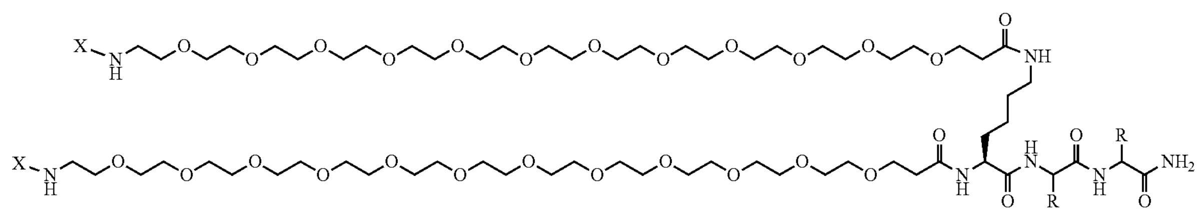

wherein the X is a peptide and R is a reactive group capable of chemically reacting with a moiety. In some aspects, X can be an MGS peptide or MTS peptide. In some aspects, this structure can be called a dimeric core as it can link two peptides.
In some aspects, the linker comprises the structure of
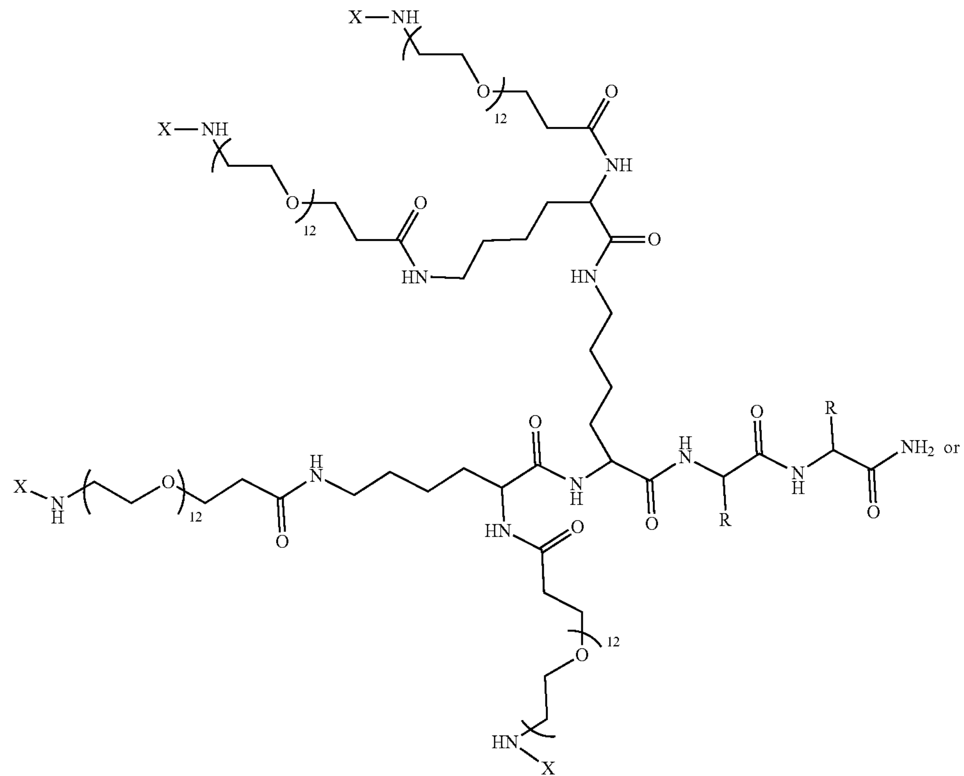
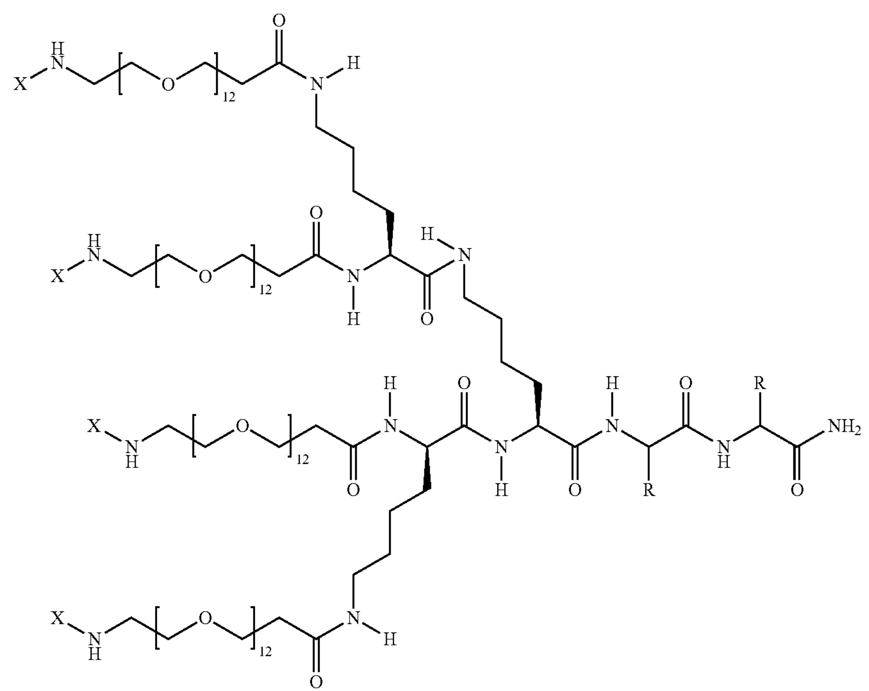

wherein the X is a peptide and R is a reactive group capable of chemically reacting with a moiety. In some aspects, X can be an MGS peptide or MTS peptide. In some aspects, this structure can be called a tetrameric core as it can link four peptides. Another example of a tetrameric core comprises the structure:
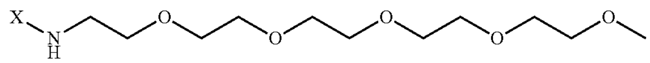
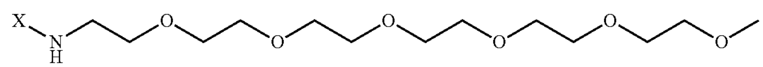
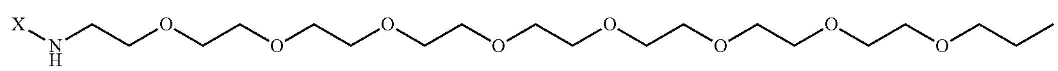
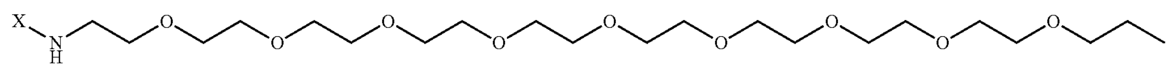
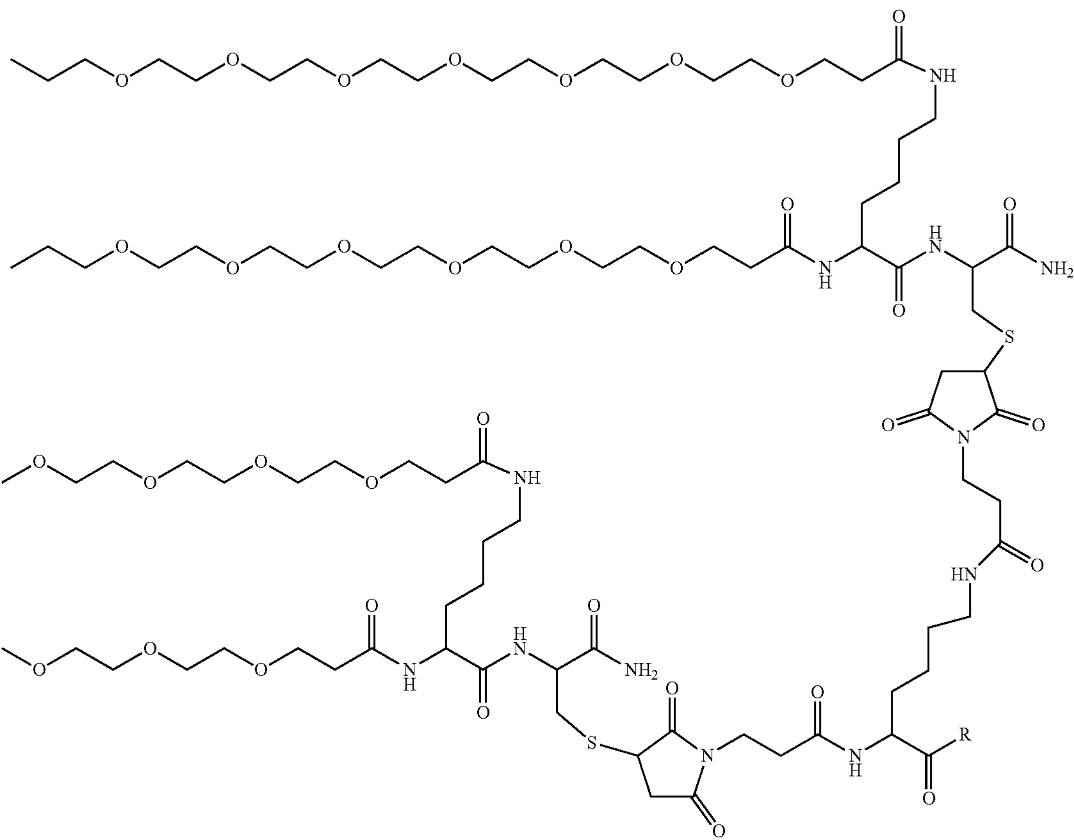

wherein the X is a peptide and R is a reactive group capable of chemically reacting with a moiety. In some aspects, X can be an MGS peptide or MTS peptide.

Disclosed are compositions comprising at least one MGS peptide conjugated to at least one MTS peptide, wherein the MGS peptide comprises the amino acid sequence of GFHNVYPYTWGGFSDIDLMADEI (SEQ ID NO:1); EQRWVQMLHLQTRYAGEWPG (SEQ ID NO:2); FQHNPFPYTYSMEDTDVEIK (SEQ ID NO:3); or YAAWPASGAWT (SEQ ID NO:4).

Disclosed are compositions comprising two or more MGS peptides conjugated to two or more MTS peptides, wherein the two or more MGS peptides comprises the amino acid sequence of GFHNVYPYTWGGFSDIDLMADEI (SEQ ID NO:1); EQRWVQMLHLQTRYAGEWPG (SEQ ID NO:2); FQHNPFPYTYSMEDTDVEIK (SEQ ID NO: 3); or YAAWPASGAWT (SEQ ID NO:4).

Disclosed are compositions comprising four MGS peptides conjugated to two MTS peptides, wherein the four MGS peptides comprise the amino acid sequence of GFHNVYPYTWGGFSDIDLMADEI (SEQ ID NO:1); EQRWVQMLHLQTRYAGEWPG (SEQ ID NO:2); FQHNPFPYTYSMEDTDVEIK (SEQ ID NO:3); or YAAWPASGAWT (SEQ ID NO:4); wherein the two MTS peptides comprise the amino acid sequence of DAYKLQTSLDWQMWNP (SEQ ID NO:9): FPSWTSKNQQWTNQRQ (SEQ ID NO: 11); or SKETYSMNAQRQHERS (SEQ ID NO:13).

Disclosed are compositions comprising a MGS peptide comprising the amino acid sequence of GFHNVYPYTWGGFSDIDLMADEI (SEQ ID NO:1): EQRWVQMLHLQTRYAGEWPG (SEQ ID NO:2); or FQHNPFPYTYSMEDTDVEIK (SEQ ID NO:3); a first linker comprising (i) at least one reactive group capable of binding a C-terminus of a peptide; and (ii) at least one additional reactive group capable of chemically reacting with a moiety: a second linker; a third linker comprising (i) at least one reactive group capable of binding a C-terminus of a peptide; and (ii) at least one additional reactive group capable of chemically reacting with a moiety; and a MTS peptide comprising the amino acid sequence of: DAYKLQTSLDWQMWNP (SEQ ID NO:9): FPSWTSKNQQWTNQRQ (SEQ ID NO:11): or SKETYSMNAQRQHERS (SEQ ID NO: 13).

Disclosed are methods of transporting cargo to the CNS of a subject comprising administering one or more of the compositions disclosed herein to a subject in need thereof, wherein the peptide conjugated to cargo enters the CNS.

Disclosed are methods of treating a CNS disorder or injury in a subject comprising administering one or more of the compositions disclosed herein to a subject in need thereof, wherein the cargo is a CNS disorder or injury therapeutic.

Disclosed are methods of imaging the CNS of a subject comprising administering one or more of the compositions disclosed herein to a subject in need thereof, wherein the cargo is an imaging agent.

Additional advantages of the disclosed method and compositions will be set forth in part in the description which follows, and in part will be understood from the description, or may be learned by practice of the disclosed method and compositions. The advantages of the disclosed method and compositions will be realized and attained by means of the elements and combinations particularly pointed out in the appended claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the disclosed method and compositions and together with the description, serve to explain the principles of the disclosed method and compositions.

FIG. 4A shows an example of the MTS peptide Ac-DAYKLQTSLDWQMWNP, which is also called MTS1_V2. FIG. 4B shows an example of the MTS peptide Ac-FPSWTSKNQQWTNQRQ, which is also called MTS2_V1. FIG. 4C shows an example of the MTS peptide Ac-SKETYSMNAQRQHERS, which is also called MTS3_V1.

FIG. 9A shows HMC3 cells (human microglia cell line) were incubated with varying concentrations of MGS2_V4-2 for 1 h at 37° C. The EC50 (half maximal uptake) is 7.3 nM. FIG. 9B shows uptake of MGS2_V4-2 at 1 hour was determined on HMC3 cells that display a resting or activated phenotype. Under both cell states, an average of ~60,000 molecules of MGS2_V4-2 were internalized. This indicates that MGS2_V4-2 will be effective for delivery to microglial cells in both phenotypic states. FIG. 9C shows uptake is significantly higher in HMC3 cells than other cells of the central nervous system demonstrating the specificity of MGS2_V4-2 for microglia cells. All cell lines were incubated with MGS2_V4-2 at 25 nM for 1 hour at 37° C.

FIG. 10 shows that optimized MGS2_V4-2 is stable in human serum.

FIG. 12 shows an example of dual targeting-MTS-MGS chimera (MTS3_V1-2-MGS2_V4-2) internalizes into microglia.

FIGS. 13A-13C show an example of dual targeting with an MTS-MGS chimeric agent (MTS3_V1-2-MGS2_V4-2) internalizes into microglia as witnessed by confocal microscopy. Single Z slice is shown. Scale Bar=10 μm.

FIGS. 14A and 14B depict a single z-slice image of the MTS3_V1-2-MGS2_V4-2 conjugate internalized into microglia, as evidenced by the perinuclear staining, but not adjacent, non-microglial cells. FIG. 14C depicts a 3D rendering of the MTS3_V1-2-MGS2_V4-2 conjugate internalized into microglia and not surrounding non-microglial cells. (Magnification=630× for all images).

FIG. 15 shows dual targeting with MTS3_V1-2-MGS2_V4-2 chimera targets microglia in the CNS as evidenced by flow cytometry.

FIG. 18A shows the chimeric MGS2_V4-4 (tetramer)-MTS3_V1-2 were conjugated to a test siRNA using click chemistry. Uptake of MGS2_V4-4-MTS3_V1-2 and MGS2_V4-4-MTS3_V1-2-siRNA are shown in FIG. 18B.

FIG. 21A shows that MGS_NOE3_V2-4 binds 2 neuronal cell lines but not to a microglia or astrocyte cell line. FIG. 21B shows that MGS_NOE3_V2-4 uptake is concentration dependent and is internalized at high levels.

FIG. 21C shows that MGS_NOE3_V2-4 uptake continues to at least 24 H and reached intracellular concentrations≈1 μM.

FIG. 24C indicates the fluorescent intensity of MGS_NOE3-V2-4 internalized into brain cells following intrathecal injection compared to naïve animals.

FIG. 26A. MTS3_V1-2-MGS_NOE3_V2-4 Chimera, MGS_NOE3_V2-4 or MTS3_V1-2 were incubated at 200 nM with HT22 cells for 1 h. Peptide uptake data was obtained by a quantitative flow cytometry assay. FIG. 26B. Uptake of MTS3_V1-2-MGS_NOE3_V2-4 chimera on HT22 cells was assessed over time. Cells were incubated with 200 nM, and the average uptake per cell was determined. FIG. 26C. HT22 cells were incubated with MTS3_V1-2-MGS_NOE3_V2-4 Chimera that was labeled with Alexa Fluor 647 at 200 nM for the indicated time at 37° C. Alexa Fluor 488 conjugated wheat germ agglutinin was used to label the cell membrane and Hoechst 33342 was used to stain the nucleus. Live cell imaging was performed, and representative images are shown.

FIG. 27 shows MTS2_V1-2 binds to the transferrin receptor to gain access to the CNS while MTS3_V1-2 utilizes a novel but yet identified cellular receptor for transport.

FIG. 29 shows an example of conjugation between the maleimide core (dimeric (shown) or tetrameric) with 2.2 eq. of peptide (any core architecture (dimeric is shown)). X=MGS or MTS. R=attachment point for dyes, imaging agents, therapeutics, proteins, nucleic acids, carbohydrates, other peptides and/or lipids.

Figure 1:
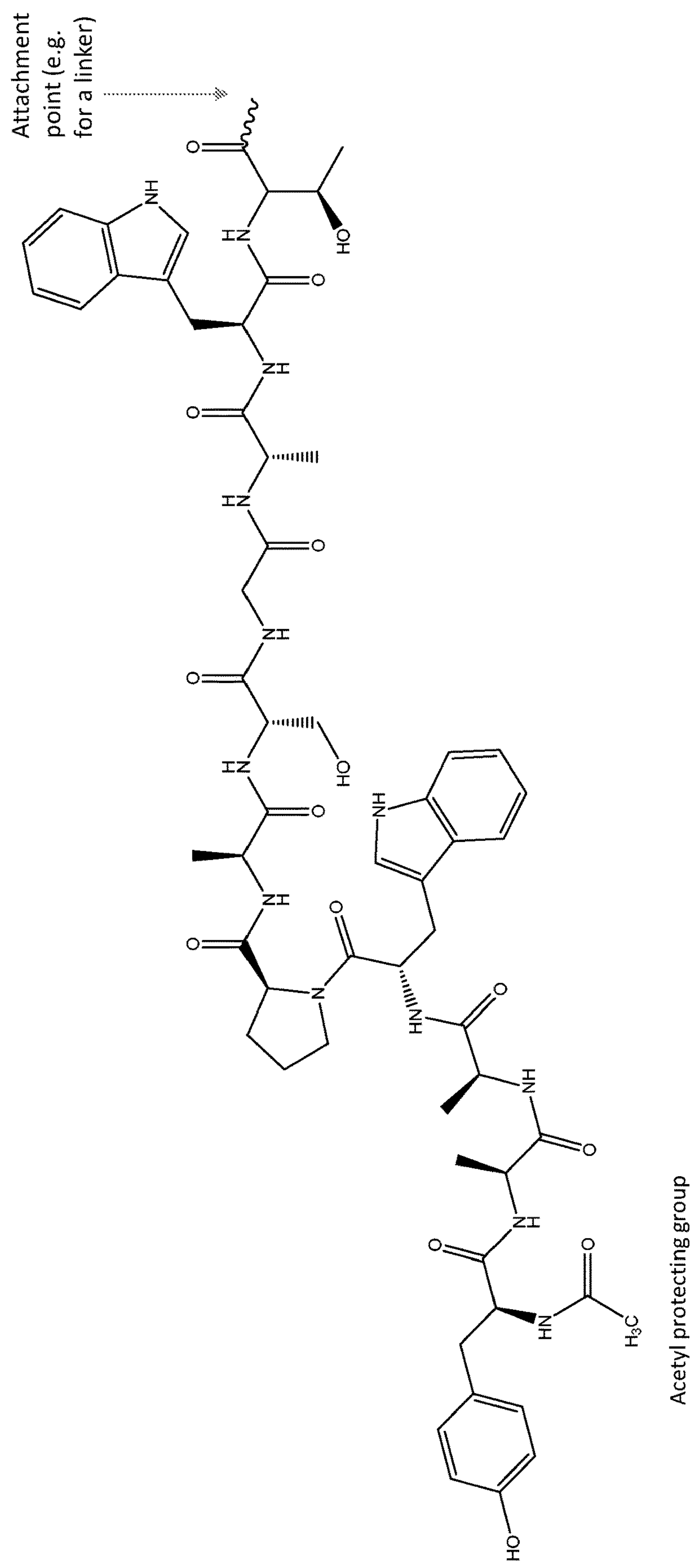
FIG. 1 shows an example of a structure of CH3CO-YAAWPASGAWT (SEQ ID NO: 8), MGS2_V4.

R=attachment point for dyes, imaging agents, therapeutics, proteins, nucleic acids, other peptides, carbohydrates and/or lipids.

DETAILED DESCRIPTION

The disclosed method and compositions may be understood more readily by reference to the following detailed description of particular embodiments and the Example included therein and to the Figures and their previous and following description.

It is to be understood that the disclosed method and compositions are not limited to specific synthetic methods, specific analytical techniques, or to particular reagents unless otherwise specified, and, as such, may vary. It is also to be understood that the terminology used herein is for the purpose of describing particular embodiments only and is not intended to be limiting.

Disclosed are materials, compositions, and components that can be used for, can be used in conjunction with, can be used in preparation for, or are products of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. Thus, if a class of molecules A, B, and C are disclosed as well as a class of molecules D, E, and F and an example of a combination molecule, A-D is disclosed, then even if each is not individually recited, each is individually and collectively contemplated. Thus, in this example, each of the combinations A-E, A-F. B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this application including, but not limited to, steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

Headings are provided for convenience only and are not to be construed to limit the invention in any manner. Embodiments illustrated under any heading or in any portion of the disclosure may be combined with embodiments illustrated under the same or any other heading or other portion of the disclosure.

A. Definitions

It is understood that the disclosed method and compositions are not limited to the particular methodology, protocols, and reagents described as these may vary. It is also to be understood that the terminology used herein is for the purpose of describing particular embodiments only and is not intended to limit the scope of the present invention which will be limited only by the appended claims.

It must be noted that as used herein and in the appended claims, the singular forms "a", "an", and "the" include plural reference unless the context clearly dictates otherwise. Thus, for example, reference to "an MGS peptide" includes a plurality of such MGS peptides, reference to "the linker" is a reference to one or more linkers and equivalents thereof known to those skilled in the art, and so forth.

As used herein, "treat" is meant to mean administer a composition of the invention to a subject, such as a human or other mammal (for example, an animal model), that has a disease or condition, in order to prevent or delay a worsening of the effects of the disease or condition, or to partially or fully reverse the effects of the disease or condition. In some aspects, the disease or condition can be a CNS associated disease or condition or a CNS disorder or injury. Treatment may be administered to a subject who does not exhibit signs of a disease, disorder, and/or condition and/or to a subject who exhibits only early signs of a disease, disorder, and/or condition for the purpose of decreasing the risk of developing pathology associated with the disease, disorder, and/or condition. In some embodiments, treatment comprises delivery of one or more of the disclosed compositions to a subject.

As used herein, "prevent" is meant to mean minimize the chance that a subject who has an increased susceptibility for developing a disease, disorder or condition will develop the disease, disorder or condition.

As used herein, the term "subject" refers to the target of administration, e.g., a human. Thus, the subject of the disclosed methods can be a vertebrate, such as a mammal, a fish, a bird, a reptile, or an amphibian. The term "subject" also includes domesticated animals (e.g., cats, dogs, etc.), livestock (e.g., cattle, horses, pigs, sheep, goats, etc.), and laboratory animals (e.g., mouse, rabbit, rat, guinea pig, fruit fly, etc.). In one aspect, a subject is a mammal. In another aspect, a subject is a human. The term does not denote a particular age or sex. Thus, adult, child, adolescent and new born subjects, as well as fetuses, whether male or female, are intended to be covered.

As used herein, the term "patient" refers to a subject afflicted with a disease or disorder. The term "patient" includes human and veterinary subjects. In some aspects of the disclosed methods, the "patient" has been diagnosed with a need for treatment prior to the administering step. In some aspects, patient and subject can be used interchangeably.

As used herein, the term "amino acid sequence" refers to a list of abbreviations, letters, characters or words representing amino acid residues. The amino acid abbreviations used herein are conventional one letter codes for the amino acids and are expressed as =follows: A, alanine; C, cysteine; D aspartic acid; E, glutamic acid; F, phenylalanine; G, glycine; H histidine; I isoleucine; K, lysine; L, leucine; M, methionine; N, asparagine; P, proline; Q, glutamine; R, arginine; S, serine; T, threonine; V, valine; W, tryptophan; Y, tyrosine.

"Polypeptide" as used herein refers to any peptide, oligopeptide, polypeptide, gene product, expression product, or protein. A polypeptide is comprised of consecutive amino acids. The term "polypeptide" encompasses naturally occurring or synthetic molecules.

In addition, as used herein, the term "polypeptide" refers to amino acids joined to each other by peptide bonds or modified peptide bonds, e.g., peptide isosteres, etc. and may contain modified amino acids other than the 20 gene-encoded amino acids. The polypeptides can be modified by either natural processes, such as post-translational processing, or by chemical modification techniques which are well known in the art. Modifications can occur anywhere in the polypeptide, including the peptide backbone, the amino acid side-chains and the amino or carboxyl termini. The same type of modification can be present in the same or varying degrees at several sites in a given polypeptide. Also, a given polypeptide can have many types of modifications. Modifications include, without limitation, acetylation, acylation, ADP-ribosylation, amidation, covalent cross-linking or cyclization, covalent attachment of flavin, covalent attachment of a heme moiety, covalent attachment of a nucleotide or nucleotide derivative, covalent attachment of a lipid or lipid derivative, covalent attachment of a phosphytidylinositol, disulfide bond formation, demethylation, formation of cysteine or pyroglutamate, formylation, gamma-carboxylation, glycosylation, GPI anchor formation, hydroxylation, iodination, methylation, myristolyation, oxidation, pegylation, proteolytic processing, phosphorylation, prenylation, racemization, selenoylation, sulfation, and transfer-RNA mediated addition of amino acids to protein such as arginylation. (See Proteins-Structure and Molecular Properties 2nd Ed., T. E. Creighton, W.H. Freeman and Company, New York (1993): Posttranslational Covalent Modification of Proteins, B. C. Johnson, Ed., Academic Press, New York, pp. 1-12 (1983)).

The phrase "nucleic acid sequence" as used herein refers to a naturally occurring or synthetic oligonucleotide or polynucleotide, whether DNA or RNA or DNA-RNA hybrid, single-stranded or double-stranded, sense or antisense, which is capable of hybridization to a complementary nucleic acid by Watson-Crick base-pairing. Nucleic acid sequences of the invention can also include nucleotide analogs (e.g., BrdU), and non-phosphodiester internucleoside linkages (e.g., peptide nucleic acid (PNA) or thiodiester linkages). In particular, nucleic acid sequences can include, without limitation, DNA, RNA, cDNA, gDNA, ssDNA, dsDNA or any combination thereof.

As used herein, "effective amount" of a composition is meant to mean a sufficient amount of the composition to provide the desired effect. The exact amount required will vary from subject to subject, depending on the species, age, and general condition of the subject, the severity of disease (or underlying genetic defect) that is being treated, the particular compound used, its mode of administration, and the like. Thus, it is not possible to specify an exact "effective amount." However, an appropriate "effective amount" may be determined by one of ordinary skill in the art using only routine experimentation.

As used herein, "selectively binds" is meant that a MGS or MTS recognizes and physically interacts with its target (for example, a specific cell type) and does not significantly recognize and interact with other targets.

The term "percent (%) homology" is used interchangeably herein with the term "percent (%) identity" and refers to the level of nucleic acid or amino acid sequence identity when aligned with a wild type sequence or sequence of interest using a sequence alignment program. For example, as used herein, 80% homology means the same thing as 80% sequence identity determined by a defined algorithm, and accordingly a homologue of a given sequence has greater than 80% sequence identity over a length of the given sequence. Exemplary levels of sequence identity include, but are not limited to, 80, 85, 90, 95, 98% or more sequence identity to a given sequence, e.g., any of the MTS sequences, as described herein. Exemplary computer programs which can be used to determine identity between two sequences include, but are not limited to, the suite of BLAST programs, e.g., BLASTN, BLASTX, and TBLASTX, BLASTP and TBLASTN, publicly available on the Internet. See also, Altschul, et al., 1990 and Altschul, et al., 1997. Sequence searches are typically carried out using the BLASTN program when evaluating a given nucleic acid sequence relative to nucleic acid sequences in the GenBank DNA Sequences and other public databases. The BLASTX program is preferred for searching nucleic acid sequences that have been translated in all reading frames against amino acid sequences in the GenBank Protein Sequences and other public databases. Both BLASTN and BLASTX are run using default parameters of an open gap penalty of 11.0, and an extended gap penalty of 1.0, and utilize the BLOSUM-62matrix. (See, e.g., Altschul, S. F., et al., Nucleic Acids Res.25:3389-3402, 1997.) A preferred alignment of selected sequences in order to determine "% identity" between two or more sequences, is performed using for example, the CLUSTAL-W program in Mac Vector version 13.0.7, operated with default parameters, including an open gap penalty of 10.0, an extended gap penalty of 0.1, and a BLOSUM 30 similarity matrix.

Substitutions, deletions, insertions or any combination thereof may be used to arrive at a final derivative, variant, or analog. Generally, these changes are done on a few nucleotides to minimize the alteration of the molecule. However, larger changes may be tolerated in certain circumstances.

Generally, the nucleotide identity between individual variant sequences can be at least 90%, 91%, 92%, 93%, 94%, 95%, 96%, 97%, 98%, 99%, or 100%. Thus, a "variant sequence" can be one with the specified identity to the parent or reference sequence (e.g. wild-type sequence) of the invention, and shares biological function, including, but not limited to, at least 80%, 81%, 82%, 83%, 84%, 85%, 86%, 87%, 88%, 89%, 90%, 91%, 92%, 93%, 94%, 95%, 96%, 97%, 98%, or 99% of the specificity and/or activity of the parent sequence. For example, a "variant sequence" can be a sequence that contains 1, 2, or 3, 4 nucleotide base changes as compared to the parent or reference sequence of the invention, and shares or improves biological function, specificity and/or activity of the parent sequence. Thus, a "variant sequence" can be one with the specified identity to the parent sequence of the invention, and shares biological function, including, but not limited to, at least 80%, 81%, 82%, 83%, 84%, 85%, 86%, 87%, 88%, 89%, 90%, 91%, 92%, 93%, 94%, 95%, 96%, 97%, 98%, or 99% of the specificity and/or activity of the parent sequence. The variant sequence can also share at least 80%, 81%, 82%, 83%, 84%, 85%, 86%, 87%, 88%, 89%, 90%, 91%, 92%, 93%, 94%, 95%, 96%, 97%, 98%, or 99% of the specificity and/or activity of a reference sequence (e.g. a MTS sequence).

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

Unless defined otherwise, all technical and scientific terms used herein have the same meanings as commonly understood by one of skill in the art to which the disclosed method and compositions belong. Although any methods and materials similar or equivalent to those described herein can be used in the practice or testing of the present method and compositions, the particularly useful methods, devices, and materials are as described. Publications cited herein and the material for which they are cited are hereby specifically incorporated by reference. Nothing herein is to be construed as an admission that the present invention is not entitled to antedate such disclosure by virtue of prior invention. No admission is made that any reference constitutes prior art. The discussion of references states what their authors assert, and applicants reserve the right to challenge the accuracy and pertinency of the cited documents. It will be clearly understood that, although a number of publications are referred to herein, such reference does not constitute an admission that any of these documents forms part of the common general knowledge in the art.

Throughout the description and claims of this specification, the word "comprise" and variations of the word, such as "comprising" and "comprises," means "including but not limited to," and is not intended to exclude, for example, other additives, components, integers or steps. In particular, in methods stated as comprising one or more steps or operations it is specifically contemplated that each step comprises what is listed (unless that step includes a limiting term such as "consisting of"), meaning that each step is not intended to exclude, for example, other additives, components, integers or steps that are not listed in the step.

B. Molecular Guide System (MGS) Peptides

Disclosed herein are MGS peptides. In some aspects, MGS peptides can selectively bind to specific cell types. For example, disclosed herein are MGS peptides that can selectively bind to cells in the CNS such as, but not limited to, neurons and microglia.

The present invention discloses the use of a phage display to screen a neuron-targeting Molecular Guide System ("MGS") peptide with high affinity and specificity that allows for efficient delivery of therapeutic molecules into the neurons. And this technology allows for the fast and efficient screening of peptide sequences that can be used for neuron targeting. The neuron-targeting MGS peptide showed high affinity to neurons, and it can be internalized into neuron cells. Further, the neuron-targeting MGS peptides showed selectivity among brain cells (e.g., astrocyte, microglia).

The neuron-targeting MGS peptide can be conjugated with small molecules, nucleic acids, and antibodies for therapeutic purposes. Furthermore, the versatile chemistry of the peptide sequence allows for modification that enhances the neuron-targeting sensitivity and specificity, as well as the combination with other peptides for dual- or multi-targeting (e.g., combination with blood-brain barrier trespassing peptides). Also, these neuron-targeting peptides have the capability to induce high neuron targeting sensitivity and specificity. Thus, this neuron-targeting peptide has the potential as a guiding system for therapies against neurological diseases such as Alzheimer's disease, Parkinson's disease, etc.

Disclosed are MGS peptides comprising the amino acid sequence of any of the sequences set forth in SEQ ID NOs: 1-8 as shown in Table 1.

TABLE 1

Examples of MGS peptide sequences.

| SEQ ID NO | Peptide sequence | Alternate names for the sequence | Cell Target |
|---|---|---|---|
| SEQ ID NO: 1 | GFHNVYPYTWGGFSDIDLMADEI | MGS_NOE3_V1 | Neurons |
| SEQ ID NO: 5 | Ac-GFHNVYPYTWGGFSDIDLMADEI | MGS_NOE3_V2 | Neurons |
| SEQ ID NO: 2 | EQRWVQMLHLQTRYAGEWPG | MGS_Neuron1_V1 | Neurons |
| SEQ ID NO: 6 | Ac-EQRWVQMLHLQTRYAGEWPG | MGS_Neuron1_V2 | Neurons |
| SEQ ID NO: 3 | FQHNPFPYTYSMEDTDVEIK | MGS_Neuron2_V1 | Neurons |
| SEQ ID NO: 7 | Ac-FQHNPFPYTYSMEDTDVEIK | MGS_Neuron2_V2 | Neurons |
| SEQ ID NO: 4 | YAAWPASGAWT | MGS2_V3 | Microglia |
| SEQ ID NO: 8 | Ac-YAAWPASGAWT | MGS2 V4 | Microglia |

Only the monomer MGS peptide sequences are shown in Table 1, however, MGS peptides can be used as a multimers, such as dimers and tetramers. In some aspects, adding a "-2" at the end of the peptide name refers to the dimeric MGS peptide. In some aspects, adding a "-4" at the end of the peptide name refers to the tetrameric MGS peptide. For example, MGS_NOE3_V1-2 refers to the dimeric version of the GFHNVYPYTWGGFSDIDLMADEI (SEQ ID NO:1) sequence. In some aspects, MGS_NOE3_V1-4 refers to the tetrameric version of the GFHNVYPYTWGGFSDIDLMA-DEI (SEQ ID NO:1) sequence. In some aspects, MGS_NOE3_V2-2 refers to the dimeric version of the Ac-GFHNVYPYTWGGFSDIDLMADEI (SEQ ID NO:5) sequence. In some aspects, MGS_NOE3_V2-4 refers to the tetrameric version of the Ac-GFHNVYPYTWGGFSDIDL-MADEI (SEQ ID NO:5) (tetrameric). Thus, the same can be true for EQRWVQMLHLQTRYAGEWPG (SEQ ID NO:2), wherein MGS_Neuron1_V1-2 is the dimeric form and MGS_Neuron1_V1-4 is the tetrameric form. Therefore if, MGS_Neuron1_V2, MGS_Neuron2_V1, MGS_Neuron2_V2, MGS2_V3, and MGS2_V4 are the monomeric forms of the peptides shown in Table 1, then MGS_Neuron1_V2-2, MGS_Neuron2_V1-2, MGS_Neuron2_V2-2, MGS2_V3-2, and MGS2_V4-2 are the dimeric forms, respectively, and MGS_Neuron1_V2-4, MGS_Neuron2_V1-4, MGS_Neuron2_V2-4, MGS2_V3-4, and MGS2_V4-4 are the tetrameric forms.

In some aspects, the one or more MGS peptides have a sequence identity of at least 90, 91, 92, 93, 94, 95, 96, 97, 98, or 99% identity with any of the sequences set forth in SEQ ID NOs: 1-8. In some aspects, the one or more MGS peptides have 100% identity in the active portion of the peptide, wherein the active portion is the portion that retains its ability to target CNS cells. Thus, in some aspects, the at least 90, 91, 92, 93, 94, 95, 96, 97, 98, or 99% identity with any of the MGS peptides occurs outside of the active portion.

In some aspects, MGS peptides can be modified. In some aspects, modifying an MGS peptide comprises optimizing the peptide or stabilizing the peptide. In some aspects, MTS peptides can be optimized. Optimized peptides can be obtained by applying modifications to the individual parental peptide sequences. These modifications can be used to identify the essential amino acids within the parental sequence that are required for crossing from the blood into the CSF. These modifications can be obtained by a combination of alanine scanning and truncations of the amino-terminal region and C-terminal region of the parental peptide. PEG can provide protection of the C-terminus of the MGS peptide, provide a spacer between the peptide and the cargo molecule attached through the cysteine at the C-terminus, and enhance solubility of the MGS peptide. Modification at the amino-terminus by acetylation (CH3CO—) and/or d-amino acids, such as d(Leu) can protect against degradation by peptidases in blood. There is not a uniform length of optimized peptide that can be applied to all MGS peptides and all changes can be tested to confirm the effect on peptide uptake and stability. Thus, in some aspects, the MGS peptide can have an N-terminal protection group. In some aspects, the N-terminal protection group can be anything that prevents proteases from cleaving the amino acids from the N-terminus. In some aspects, the MGS peptides disclosed herein can be modified by acetylation on the N-terminus. In some aspects, the N-terminal protection group is an acetyl group (Ac═CH3CO). In some aspects, the N-terminal protection group can be, but is not limited to, PEG, Formyl, CH3-(CH)n-CO, Fluorophore, Fatty acid, alkyl amine, aryl groups, carbohydrates, sulfonamide, or carbamate.

In some aspects, the MGS peptides disclosed herein can be chemically conjugated to another MGS peptide, a cargo and/or another linker. In some aspects, the chemical conjugate can be polyethylene glycol (PEG). Thus, in some aspects, the MGS peptides disclosed herein can be pegylated. In some aspects, the number of PEG units can be 1, 2, 3, 4, 5, 6, 7, 8, 9, 10, 11, 12, 14, 16, 18, 20, 22, 24 or more. In some aspects, the number of PEG units can be of sufficient length to separate the one or more MGS peptides from the cargo to prevent any steric interference between the one or more MGS peptides and the cargo. Thus, in some aspects, the MGS peptides disclosed herein can further comprise a linker. For example, the linker and the chemical conjugate can be used interchangeably. In some aspects, the linker is on the C-terminal end of the MGS peptide. In an aspect, the MGS peptides disclosed herein comprise one or more of the sequences set forth in SEQ ID NOs: 1-8, wherein SEQ ID NOs: 1-8 can be chemically conjugated to PEG or another linker on the C-terminus. In some aspects, the linker can link two or more MGS peptides. In some aspects, the linker can be conjugated to a cargo. As an example, an MGS peptide comprising a linker can comprise the structure shown in FIG. 3, wherein X is an MGS peptide and R is a reactive group that can be conjugated to cargo or another linker.

In some aspects, the linker can be any of those described herein. For example, a linker can be any length that allows conjugation of an MGS peptide with something else and prevents steric hindrance.

In some aspects, the linker comprises a PEG linker, an alkyl linker, a maleimide linker, an amide linker, a peptide linker, an amide linker, an aryl linker, a dibenzocyclooctyne linker, an azide linker, a triazole linker, dibenzoazacyclooctyne, a 8,9-dihydro-1H-dibenzo[1,2,3]triazolo[4,45-d]azocine or a combination thereof.

Figure 2:
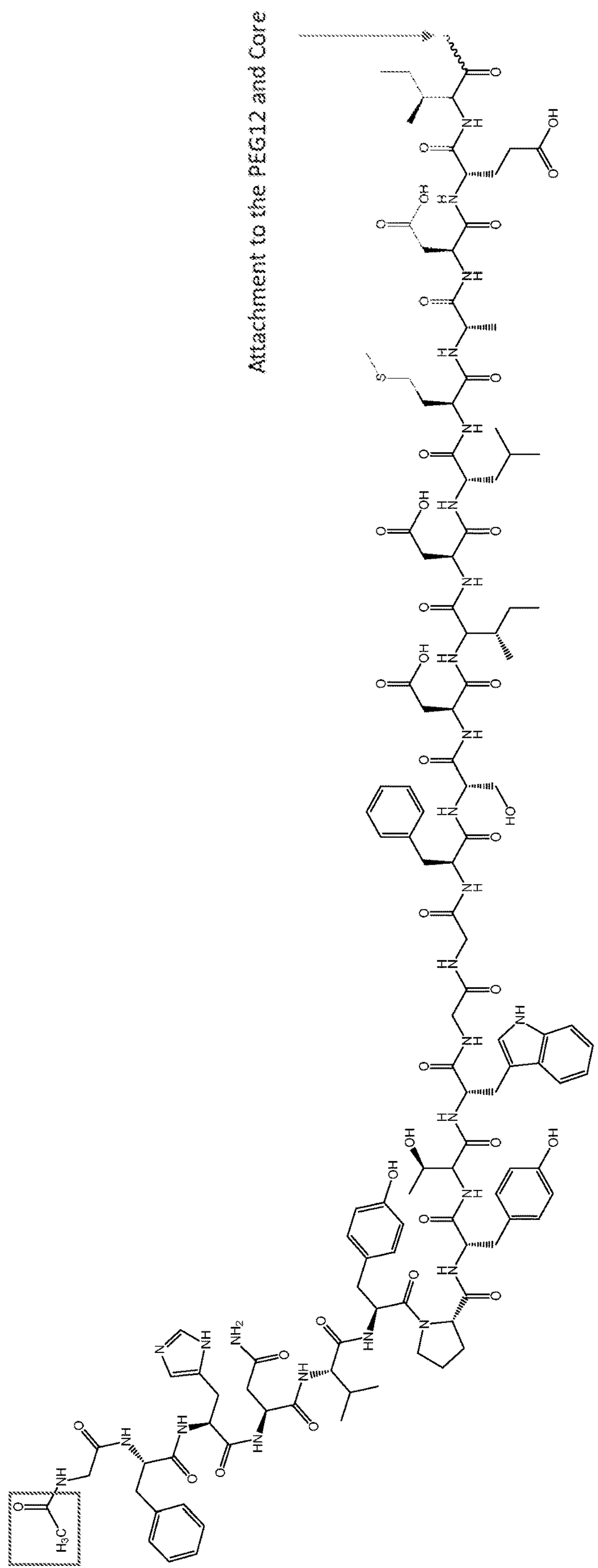
FIG. 2 shows an example of a structure of CH3-CO-GFHNVYPYTWGGFSDIDLMADEI (SEQ ID NO:5), MGS_NOE3_V2.

In some aspects, an example of a structure of an MGS peptide is shown in FIG. 1 and FIG. 2. FIG. 1 shows the structure of MGS2_V4 Peptide Sequence: CH3CO-YAAW-PASGAWT (SEQ ID NO:8). FIG. 2 shows the structure of MGS_NOE3_V2 Peptide Sequence: CH3-CO-GFHNVY-PYTWGGFSDIDLMADEI (SEQ ID NO:5).

Figures 3A, 3B:
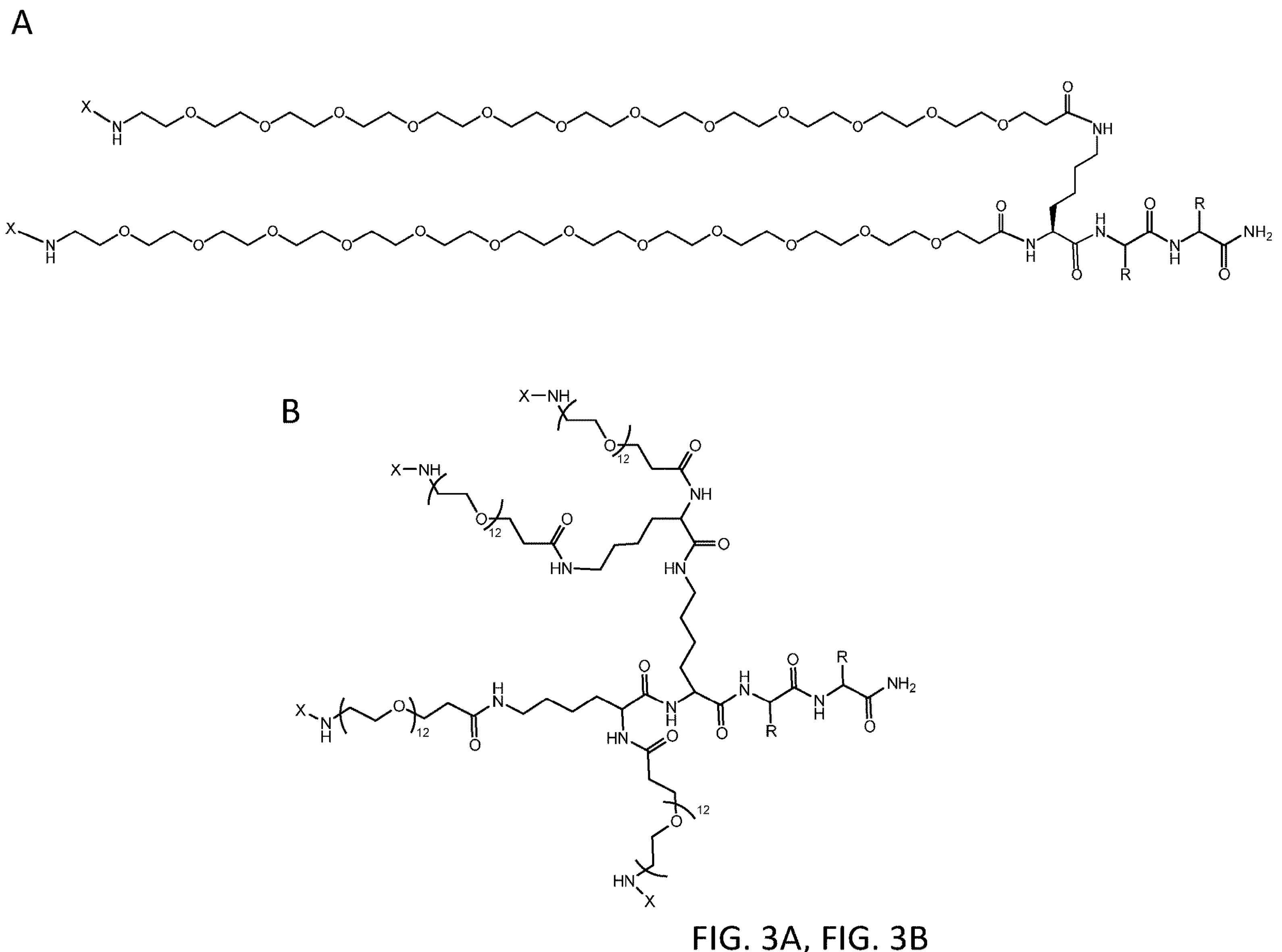
FIGS. 3A and 3B show a dimeric core (A) linker and a tetrameric core (B) linker. X=any peptide, particularly an MGS or MTS. R=attachment point for cargo such as, dyes, imaging agents, therapeutics, proteins, nucleic acids, carbohydrates, other peptides, lipids, or other chemical modifications.

In some aspects, the disclosed MGS peptides can be dimers, wherein two MGS peptides are conjugated. An example of the structure of a dimeric MGS core is shown in FIG. 3A. In some aspects, the two MGS peptides can be the same MGS peptide or two separate MGS peptides. In some aspects, the two MGS peptides are conjugated via a linker.

In some aspects, the disclosed MGS peptides can be tetramers, wherein four MGS peptides are conjugated. An example of the structure of a tetrameric MGS core is shown in FIG. 3B. In some aspects, the four MGS peptides can be the same MGS peptide or a combination of different MGS peptides. In some aspects, the four MGS peptides are conjugated via a linker.

In some aspects, the reactive group can be, but is not limited to, carboxylic acid, acyl halides, sulfonyl halides, chloroformates, aldehydes, alkynes, alkynes (with No Acetylenic Hydrogen), amides and imides, amines, phosphines, and pyridines, anhydrides, azo, diazo, azido, hydrazine, and azide compounds, carbamates, epoxides, esters, sulfate esters, phosphate, esters, thiophosphate esters, and borate esters, halogenated organic compounds, isocyanates and isothiocyanates, ketones, oximes, sulfides (Organic).

C. Molecular Transport System (MTS) Peptides

Transporting cargo across the blood cerebrospinal fluid barrier offers a unique opportunity to impact transport of cargo (e.g., drugs and macromolecules) into the CNS. Thus, disclosed herein are peptides for targeting the CNS often referred to as molecular transport system (MTS) peptides.

Disclosed herein are MTS peptides. Disclosed are MTS peptides comprising the amino acid sequence of any of the sequences set forth in SEQ ID NOs: 9-14 as shown in Table 2.

TABLE 2

Example MTS peptide sequences

| SEQ ID NO | Peptide sequence | Alternate names for the sequence |
|---|---|---|
| SEQ ID NO: 9 | DAYKLQTSLDWQMWNP | MTS1_DA |
| SEQ ID NO: 10 | Ac-DAYKLQTSLDWQMWNP (optimized version of SEQ ID NO: 9) | MTS1_V2 |
| SEQ ID NO: 11 | FPSWTSKNQQWTNQRQ | MTS2 |
| SEQ ID NO: 12 | Ac-FPSWTSKNQQWTNQRQ (optimized version of SEQ ID NO: 11) | MTS2_V1 |
| SEQ ID NO: 13 | SKETYSMNAQRQHERS | MTS3 |
| SEQ ID NO: 14 | Ac-SKETYSMNAQRQHERS (optimized version of SEQ ID NO: 13) | MTS3_V1 |

Only the monomer MTS peptide sequences are shown in Table 2, however, MTS peptides can be used as a multimers, such as dimers. In some aspects, adding a "-2" at the end of the peptide name refers to the dimeric MTS peptide. For example, MTS1_V2-2 refers to the dimeric version of the Ac-DAYKLQTSLDWQMWNP (SEQ ID NO:10) sequence. In some aspects, MTS2_V1-2 and MTS3_V1-2 are the dimer versions of MTS2_V1 and MTS3_V1, respectively. In some aspects, when further optimizations are added, such as lipidation, the next version or "V" of that peptide is referred to. For example, MTS3_V2-2 is the lipidated version of MTS3_V1-2.

In some aspects, the one or more MTS peptides have a sequence identity of at least 90, 91, 92, 93, 94, 95, 96, 97, 98, or 99% identity with any of the sequences set forth in SEQ ID NOs: 9-14. In some aspects, the one or more MTS peptides have 100% identity in the active portion of the peptide, wherein the active portion is the portion that retains its ability to cross from the blood into the CSF. Thus, in some aspects, the at least 90, 91, 92, 93, 94, 95, 96, 97, 98, or 99% identity with any of the MTS peptides occurs outside of the active portion.

In some aspects, MTS peptides can be modified. In some aspects, modifying an MTS peptide comprises optimizing the peptide or stabilizing the peptide.

In some aspects, MTS peptides can be stabilized so that the MTS peptide remains intact (e.g. does not degrade) during synthesis and/or storage. In some aspects, an MTS peptide can be stabilized by changing a glycine to alanine. In some aspects, the glycine at position two of SEQ ID NO:9 or 10 can be stabilized by changing it to a alanine.

In some aspects, MTS peptides can be optimized. Optimized peptides can be obtained by applying modifications to the individual parental peptide sequences. These modifications can be used to identify the essential amino acids within the parental sequence that are required for crossing from the blood into the CSF. These modifications can be obtained by a combination of alanine scanning and truncations of the amino-terminal region and C-terminal region of the parental peptide. PEG12 can provide protection of the C-terminus of the MTS peptide, provide a spacer between the peptide and the cargo molecule attached through the cysteine at the C-terminus, and enhance solubility of the MTS peptide. Modification at the N-terminus of the MTS peptide by acetylation (CH3CO—) and/or d-amino acids, such as d(Leu) can protect against degradation by peptidases in blood. There is not a uniform length of optimized peptide that can be applied to all MTS peptides and all changes can be tested to confirm the effect on peptide uptake and stability.

In some aspects, the MTS peptides disclosed herein can have an N-terminal protection group. In some aspects, the N-terminal protection group can be anything that prevents proteases from cleaving the amino acids from the N-terminus. In some aspects, the MTS peptides disclosed herein can be modified by acetylation on the N-terminus. In some aspects, the N-terminal protection group is an acetyl group. Thus, in some aspects, the MTS peptides disclosed herein can be acetylated. In some aspects, the N-terminal protection group can be, but is not limited to, PEG, Formyl, CH3-(CH2)n-CO, Fluorophore, Fatty acid, alkyl amine, sulfonamide, an aryl group, a carbohydrate, a D-amino acid, or carbamate.

In some aspects, the MTS peptides disclosed herein can be chemically conjugated to another MTS peptide, a cargo and/or another linker. In some aspects, the chemical conjugate can be polyethylene glycol (PEG). Thus, in some aspects, the MTS peptides disclosed herein can be pegylated. In some aspects, the number of PEG units can be 1, 2, 3, 4, 5, 6, 7, 8, 9, 10, 11, 12, 14, 16, 18, 20, 22, 24 or more. In some aspects, the number of PEG units can be of sufficient length to separate the one or more MTS peptides from the cargo to prevent any steric interference between the one or more MTS peptides and the cargo. Thus, in some aspects, the MTS peptides disclosed herein can further comprise a linker. For example, the linker and the chemical conjugate can be used interchangeably. In some aspects, the linker is on the C-terminal end of the MTS peptide. In an aspect, the MTS peptides disclosed herein comprise one or more of the sequences set forth in SEQ ID NOs: 9-14, wherein SEQ ID NOs: 9-14 can be acetylated on the N-terminus and can be chemically conjugated to PEG, or another linker on the C-terminus. In some aspects, the linker can link two or more MTS peptides. In some aspects, the linker can be conjugated to a cargo. As an example, an MTS peptide comprising a linker can comprise the structure shown in FIG. 3, wherein X is an MTS peptide and R is a reactive group that can be conjugated to cargo or another linker.

In an aspect, the MTS peptides disclosed herein can be truncated. In some aspects, the MTS peptides disclosed herein are truncated to eliminate all amino acids except the active portion of the MTS peptide. In some aspects, the active portion of an MTS peptide can be used in the disclosed compositions and methods. In some aspects, the active portion can be determined using techniques well known in the art, for example Alanine scanning or truncation studies. The active portion of the MTS peptide is the portion that retains its ability to cross from the blood into the CSF. For example, SKETYSMNAQRQHERS (SEQ ID NO: 13) can be truncated by up to four amino acids on the N-terminal end. In some aspects, the amino acid sequence YSMNAQRQHERS (SEQ ID NO: 16) is the active portion of SKETYSMNAQRQHERS (SEQ ID NO:13).

In some aspects, disclosed are stabilized or optimized variants of MTS peptides disclosed herein.

Figure 4:
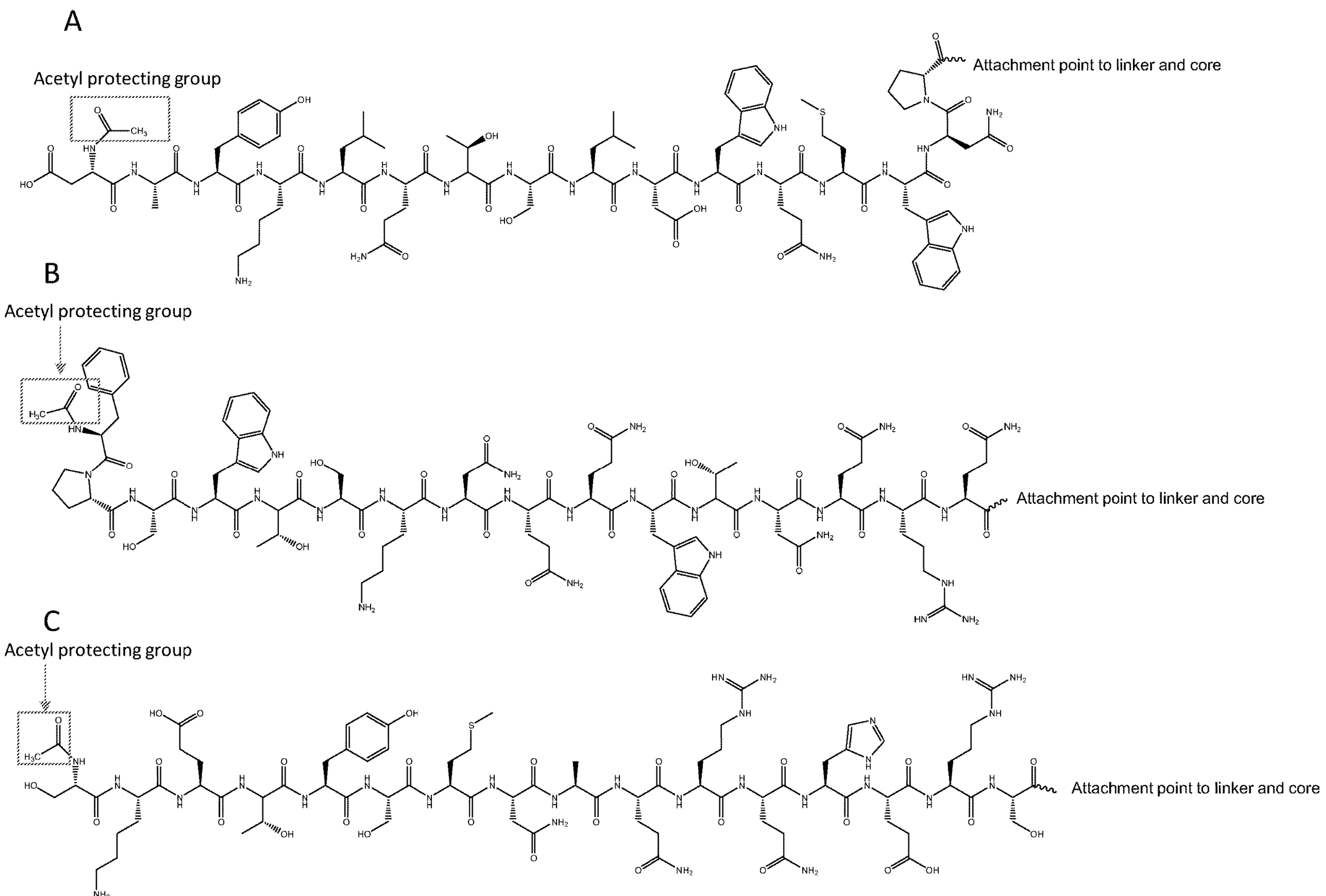
FIGS. 4A-4C show example structures of MTS peptides.

Examples of MTS peptides are provided in FIG. 4. FIG. 4A shows an example of the MTS peptide Ac-DAYKLQTSLDWQMWNP (SEQ ID NO: 10), which is also called MTS1_V2. FIG. 4B shows an example of the MTS peptide Ac-FPSWTSKNQQWTNQRQ (SEQ ID NO:12), which is also called MTS2_V1. FIG. 4C shows an example of the MTS peptide Ac-SKETYSMNAQRQHERS (SEQ ID NO: 14), which is also called MTS3_V1.

In some aspects, the disclosed MTS peptides can be dimers, wherein two MTS peptides are conjugated. An example of the structure of a dimeric MTS core is shown in FIG. 3A. In some aspects, the two MTS peptides can be the same MTS peptide or two separate MTS peptides. In some aspects, the two MTS peptides are conjugated via a linker.

In some aspects, the reactive group can be, but is not limited to, carboxylic acid, acyl halides, sulfonyl halides, chloroformates, aldehydes, alkynes, alkynes (with No Acetylenic Hydrogen), amides and imides, amines, phosphines, and pyridines, anhydrides, azo, diazo, azido, hydrazine, and azide compounds, carbamates, epoxides, esters, sulfate esters, phosphate, esters, thiophosphate esters, and borate esters, halogenated organic compounds, isocyanates and isothiocyanates, ketones, oximes, sulfides (Organic).

D. Linkers

Disclosed are linkers. In some aspects, the linkers can conjugate or link two or more MGS peptides together, two or more MTS peptides together, two or more linkers together, or a linker or peptide to a cargo.

In some aspects, a linker that conjugates two or more MGS peptides together or two or more MTS peptides together can be referred to as a dimeric core (if linked to two peptides) or a tetrameric core (if linked to four peptides). FIG. 3 shows an example of a structure for both a dimeric core and a tetrameric core. In FIG. 3, the linker comprises PEG12, however, in some aspects, any length of PEG can be used. For example, any of PEG1-PEG30 can be used. In some aspects, a PEG of length 1-5000 can be used. In some aspects, any linker can be used in place of PEG12 of the dimeric core or tetrameric core.

Disclosed are linkers comprising at least one reactive group capable of binding a C-terminus of a peptide; and at least one additional reactive group capable of chemically reacting with a moiety.

In some aspects, the linker has a length of up to PEG5000. With regards to PEG linkers, in some aspects, the length of the linker can be a single PEG all the way up to 5000 PEGs. In some aspects, the linker between the peptide and the cargo can be longer than the linker between two MGS or MTS peptides. In some aspects, the linker comprises two to four PEG linkers. In some aspects, a linker with two PEG linkers can be referred to as a dimeric core. In some aspects, a linker with four PEG linkers can be referred to as a tetrameric core.

In some aspects, a linker comprises at least two PEG linkers and a reactive group between at least two of the PEG linkers. In some aspects, the reactive group connects at least two PEG linkers.

In some aspects, the linker comprises an amino acid, a peptide, an alkyl group, a maleimide, a thiol, hydrazone, or amide. In some aspects, the amino acid can be a modified amino acid. For example, a modified amino acid can be a functionalized lysine, functionalized cysteine, functionalized glutamic acid, or functionalized aspartic acid. In some aspects, the linker comprises biotin.

In some aspects, the linker comprises the structure of:

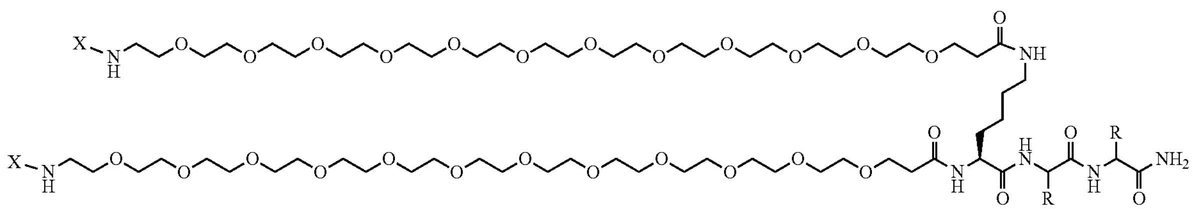

wherein the X is a peptide and R is a reactive group capable of chemically reacting with a moiety. In some aspects, X can be an MGS peptide or MTS peptide. In some aspects, this structure can be called a dimeric core as it can link two peptides.

In some aspects, the linker further comprises a lipid moiety. For example, one of the R groups from the dimeric core can react with a lipid moiety. Thus, in some aspects, the linker comprises the structure of:

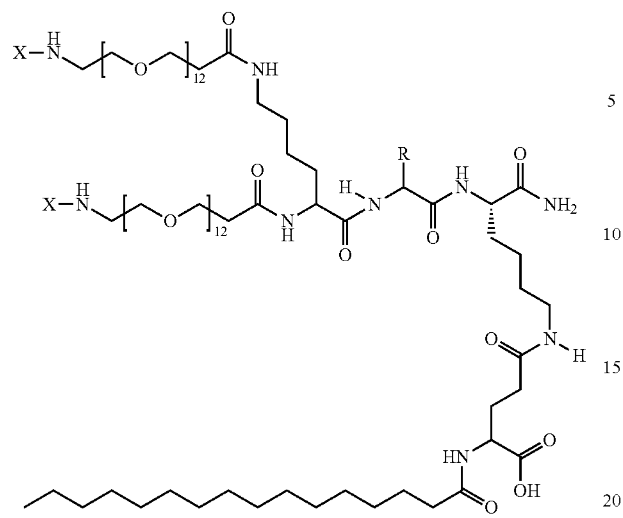
wherein the X is a peptide and R is a reactive group capable of chemically reacting with a moiety. In some aspects, X can be an MGS peptide or MTS peptide. In some aspects, X can be an MGS peptide or MTS peptide.
In some aspects, the linker comprises the structure of
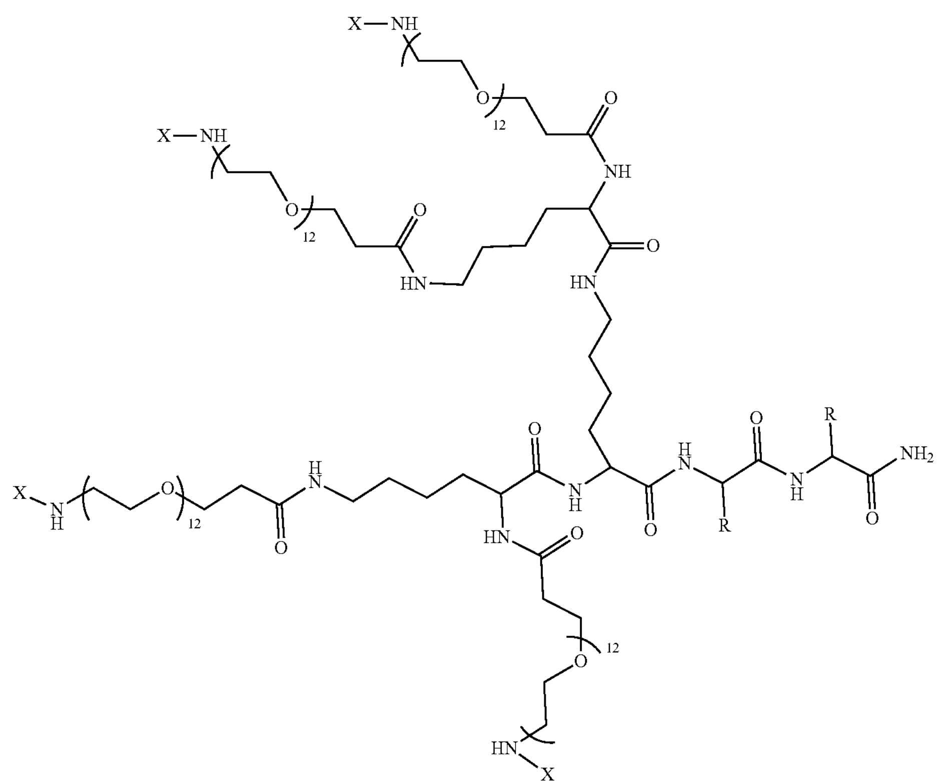

wherein the X is a peptide and R is a reactive group capable of chemically reacting with a moiety. In some aspects, X can be an MGS peptide or MTS peptide. In some aspects, this structure can be called a tetrameric core as it can link four peptides. Another example of a tetrameric core comprises the structure:
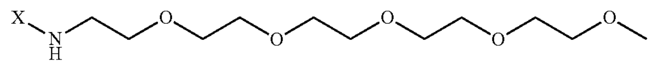
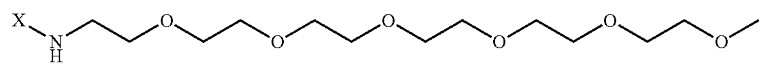
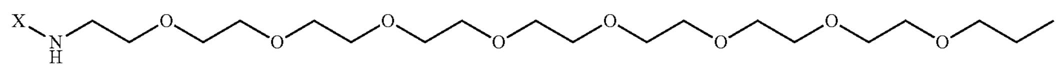
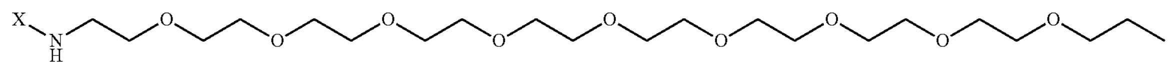
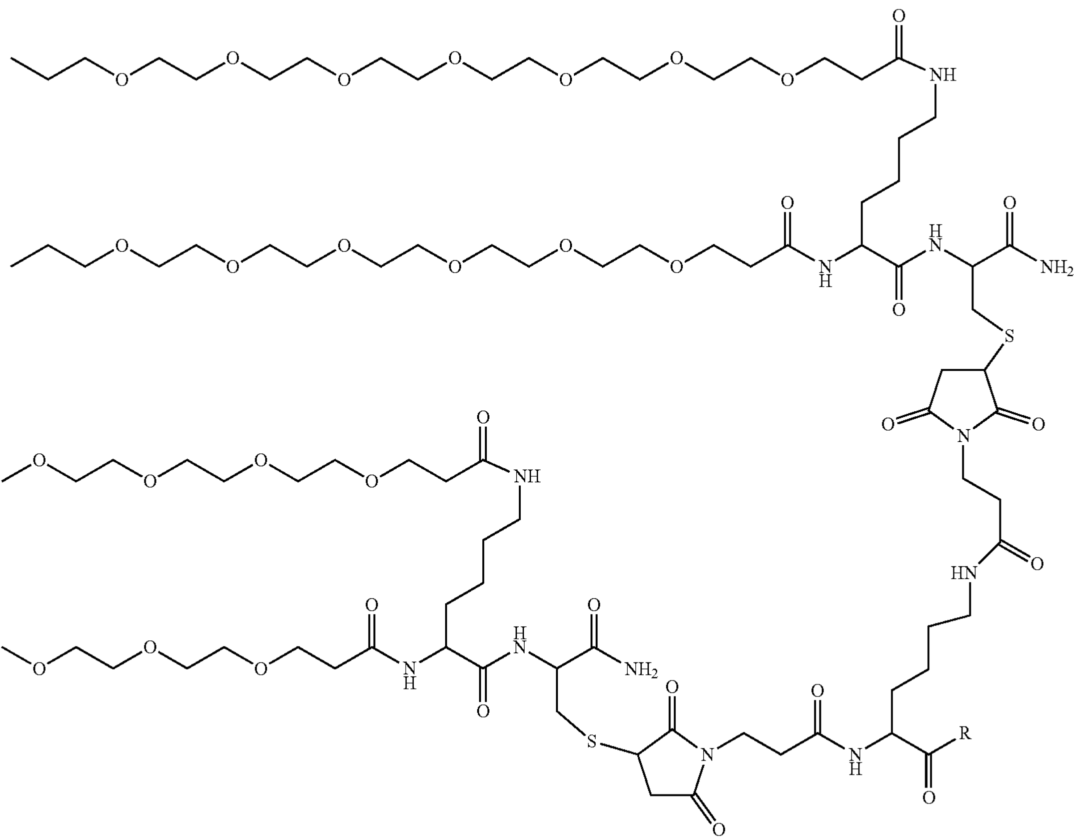

wherein the X is a peptide and R is a reactive group capable of chemically reacting with a moiety. In some aspects, X can be an MGS peptide or MTS peptide. In some aspects, the reactive group can be, but is not limited to, carboxylic acid, acyl halides, sulfonyl halides, chloroformates, aldehydes, alkynes, alkynes (with No Acetylenic Hydrogen), amides and imides, amines, phosphines, and pyridines, anhydrides, azo, diazo, azido, hydrazine, and azide compounds, carbamates, epoxides, esters, sulfate esters, phosphate, esters, thiophosphate esters, and borate esters, halogenated organic compounds, isocyanates and isothiocyanates, ketones, oximes, sulfides (Organic).

In some aspects, a moiety can be a cargo. In some aspects, a cargo can be, but is not limited to, a dye, an imaging agent, a therapeutic, a protein, a nucleic acid, an amino acid, a peptide, a lipid, an antibody, a radionuclide, carbohydrate or a nanoparticle. In some aspects, the moiety can be a linker. Therefore, in some aspects, disclosed are linkers comprising linkers. For example, if the linker is a tetrameric core (i.e., first linker), the tetrameric core can comprise moiety that is a second linker. In some aspects, a second linker can comprise the same elements or different elements from the tetrameric core. In some aspects, a second linker conjugates a tetrameric core (i.e., third linker) to a dimeric core.

In some aspects, any of the first, second, or third linkers can comprise an amino acid, a peptide, an alkyl group, a maleimide, a thiol, a hydrazone, dibenzocyclooctyne, azide, or an amide.

E. Compositions

Disclosed are compositions comprising one or more of the disclosed MGS peptides, MTS peptides, linkers, and/or combinations thereof.

Disclosed are compositions comprising at least one MGS peptide conjugated to at least one MTS peptide, wherein the MGS peptide comprises the amino acid sequence of GFHNVYPYTWGGFSDIDLMADEI (SEQ ID NO:1): EQRWVQMLHLQTRYAGEWPG (SEQ ID NO:2): FQHNPFPYTYSMEDTDVEIK (SEQ ID NO:3): or YAAWPASGAWT (SEQ ID NO:4).

Disclosed are compositions comprising two or more MGS peptides conjugated to two or more MTS peptides, wherein the two or more MGS peptides comprises the amino acid sequence of GFHNVYPYTWGGFSDIDLMADEI (SEQ ID NO:1); EQRWVQMLHLQTRYAGEWPG (SEQ ID NO:2): FQHNPFPYTYSMEDTDVEIK (SEQ ID NO: 3): or YAAWPASGAWT (SEQ ID NO:4).

In some aspects, the two or more MGS peptides are four MGS peptides. Thus, for example, disclosed are compositions comprising four MGS peptides conjugated to at least two MTS peptides, wherein the four MGS peptides comprises the amino acid sequence of GFHNVYPYTWGGFSDIDLMADEI (SEQ ID NO: 1): EQRWVQMLHLQTRYAGEWPG (SEQ ID NO:2): FQHNPFPYTYSMEDTDVEIK (SEQ ID NO: 3); and/or YAAWPASGAWT (SEQ ID NO:4).

Disclosed are compositions comprising four MGS peptides conjugated to two MTS peptides, wherein the four MGS peptides comprise the amino acid sequence of GFHNVYPYTWGGFSDIDLMADEI (SEQ ID NO:1): EQRWVQMLHLQTRYAGEWPG (SEQ ID NO:2): FQHNPFPYTYSMEDTDVEIK (SEQ ID NO:3); or YAAWPASGAWT (SEQ ID NO:4): wherein the two MTS peptides comprise the amino acid sequence of DAYKLQTSLDWQMWNP (SEQ ID NO:9): FPSWTSKNQQWTNQRQ (SEQ ID NO: 11): or SKETYSMNAQRQHERS (SEQ ID NO:13).

In some aspects, the two or more MGS peptides are the same MGS peptide. For example, if there are four MGS peptides in the composition, in some aspects, all four MGS peptides are the same MGS peptide. In some aspects, at least one MGS peptide is different from the other MGS peptides. In some aspects, each MGS peptide is different than the others.

In some aspects, the two or more MTS peptides are the same MTS peptide. For example, in some aspects there are two MTS peptides in the disclosed compositions and both MTS peptides are the same MTS peptide. In some aspects, there are two MTS peptides in the disclosed compositions and each is different from the other.

In some aspects, the MGS peptide and/or the MTS peptide has an N-terminal protection group. In some aspects, the N-terminal protection group is an acetyl group.

In some aspects, the disclosed compositions can further comprise one or more linkers. In some aspects, the disclosed compositions can further comprise a first linker. In some aspects, the first linker is attached to the C-terminal end of the MGS peptide. In some aspects, the first linker can be any of the linkers described herein. In some aspects, the first linker can comprise a PEG linker, an alkyl linker, a maleimide linker, an amide linker, a peptide linker, an amide linker, an aryl linker, a dibenzocyclooctyne linker, an azide linker, a triazole linker, dibenzoazacyclooctyne, a 8,9-dihydro-1H-dibenzo[1,2,3]triazolo[4,45-d]azocine or a combination thereof. In some aspects, the first linker can link a MGS peptide to another MGS peptide or link a MGS peptide to a cargo or link a MGS peptide to another linker. In some aspects, a first linker can comprise one or more of the structures shown in FIG. 3. For example, each MGS peptide can be attached to a linker, such as PEG (of any length). Each MGS peptide-PEG can then be linked using one or more amino acids, modified amino acids, or linkers which can create dimeric or tetrameric cores described herein.

In some aspects, the compositions can further comprise a second linker. In some aspects, the second linker is attached to the first linker. In some aspects, the second linker is further attached to third linker. Thus, in some aspects, the compositions further comprise a third linker.

In some aspects, the third linker is attached to the second linker. In some aspects, the third linker is attached to the C-terminal end of a MTS peptide. In some aspects, the third linker can be any of the linkers described herein. In some aspects, the third linker can comprise a PEG linker, an alkyl linker, a maleimide linker, an amide linker, a peptide linker, an aryl linker, a dibenzocyclooctyne linker, an azide linker, a triazole linker, dibenzoazacyclooctyne, a 8,9-dihydro-1H-dibenzo[1,2,3]triazolo[4,45-d]azocine, or a combination thereof. In some aspects, the third linker can link a MTS peptide to another MTS peptide or link a MTS peptide to a cargo or link a MTS peptide to another linker. In some aspects, a third linker can comprise one or more of the structures shown in FIG. 3. For example, each MTS peptide can be attached to a linker, such as PEG (of any length). Each MTS peptide-PEG can then be linked using one or more amino acids, modified amino acids, or linkers which can create dimeric or tetrameric cores described herein.

In some aspects, the first linker and/or the second linker, and/or the third linker comprises a polyethylene glycol (PEG) linker, an alkyl linker, a maleimide linker, a disulfide linker, a peptide linker, an amide linker, an aryl linker, a dibenzocyclooctyne linker, an azide linker, a triazole linker, dibenzoazacyclooctyne, a 8,9-dihydro-1H-dibenzo[1,2,3]triazolo[4,45-d]azocine or a combination thereof. In some aspects, the first, second and/or third linker comprises a PEG linker. In some aspects, any length of PEG linker can be used. For example, any of PEG 1-PEG 30 can be used. In some aspects, a PEG of length 1-5000 can be used.

In some aspects, the compositions further comprise a cargo. In some aspects, a cargo can be, but is not limited to, a dye, an imaging agent, a therapeutic, a protein, a nucleic acid, an amino acid, a peptide, a lipid, small molecule, an antibody, a radionuclide, carbohydrate or a nanoparticle. For example, in some aspects, the cargo is an imaging agent, antibody, and/or siRNA. In some aspects, the cargo is attached to the first linker, the second linker, and/or the third linker. Thus, in some aspects, the disclosed compositions can comprise one or more cargos. In some aspects, one or more of the linkers can comprise a cargo.

In some aspects, the MTS peptide is any of the MTS peptides described throughout. In some aspects, the MTS peptide targets the central nervous system. In some aspects, the MTS peptide comprises the amino acid sequence of any of SEQ ID NOs: 9-14. In some aspects, the MTS peptide comprises the amino acid sequence of DAYKLQTSLDWQMWNP (SEQ ID NO:9): FPSWTSKNQQWTNQRQ (SEQ ID NO: 11): or SKETYSMNAQRQHERS (SEQ ID NO:13). In some aspects, the MTS peptide comprises an N-terminal protection group. In some aspects, the N-terminal protection group can be anything that prevents proteases from cleaving the amino acids from the N-terminus. In some aspects, the N-terminal protection group is an acetyl group. In some aspects, the N-terminal protection group can be, but is not limited to, PEGylation, Formyl, CH3-(CH2)n-CO, an aryl group, a carbohydrate, a D-amino acid, Fluorophore, Fatty acid, alkyl amine, sulfonamide, or carbamate.

In some aspects, the compositions comprise two MTS peptides. In some aspects, the two MTS peptides are linked via a dimeric core as described throughout.

Disclosed are compositions comprising a MGS peptide comprising the amino acid sequence of GFHNVYPYTWGGFSDIDLMADEI (SEQ ID NO:1): EQRWVQMLHLQTRYAGEWPG (SEQ ID NO:2): or FQHNPFPYTYSMEDTDVEIK (SEQ ID NO:3): a first linker comprising (i) at least one reactive group capable of binding a C-terminus of a peptide; and (ii) at least one additional reactive group capable of chemically reacting with a moiety: a second linker: a third linker comprising (i) at least one reactive group capable of binding a C-terminus of a peptide; and (ii) at least one additional reactive group capable of chemically reacting with a moiety; and a MTS peptide comprising the amino acid sequence of: DAYKLQTSLDWQMWNP (SEQ ID NO:9): FPSWTSKNQQWTNQRQ (SEQ ID NO:11): or SKETYSMNAQRQHERS (SEQ ID NO: 13).

In some aspects, the C-terminus of the MGS peptide comprising the amino acid sequence of GFHNVYPYTWGGFSDIDLMADEI (SEQ ID NO:1): EQRWVQMLHLQTRYAGEWPG (SEQ ID NO:2): or FQHNPFPYTYSMEDTDVEIK (SEQ ID NO:3) is attached to the first linker. In some aspects, the first linker is attached to the second linker. In some aspects, the second linker is attached to the third linker. In some aspects, third linker is attached to the attached to the C-terminus of a peptide (MTS) comprising the amino acid sequence of: DAYKLQTSLDWQMWNP (SEQ ID NO:9); FPSWTSKNQQWTNQRQ (SEQ ID NO:11): or SKETYSMNAQRQHERS (SEQ ID NO: 13).

Thus, in some aspects, disclosed are compositions comprising a MGS peptide comprising the amino acid sequence of GFHNVYPYTWGGFSDIDLMADEI (SEQ ID NO: 1): EQRWVQMLHLQTRYAGEWPG (SEQ ID NO:2): or FQHNPFPYTYSMEDTDVEIK (SEQ ID NO:3); attached to a first linker via a reactive wherein the first linker is attached to a second linker, wherein the second linker is attached to a third linker, wherein the third linker is attached to the C-terminus of a peptide (MTS) comprising the amino acid sequence of: DAYKLQTSLDWQMWNP (SEQ ID NO:9); FPSWTSKNQQWTNQRQ (SEQ ID NO:11); or SKETYSMNAQRQHERS (SEQ ID NO: 13).

In some aspects, the composition comprises the structure:

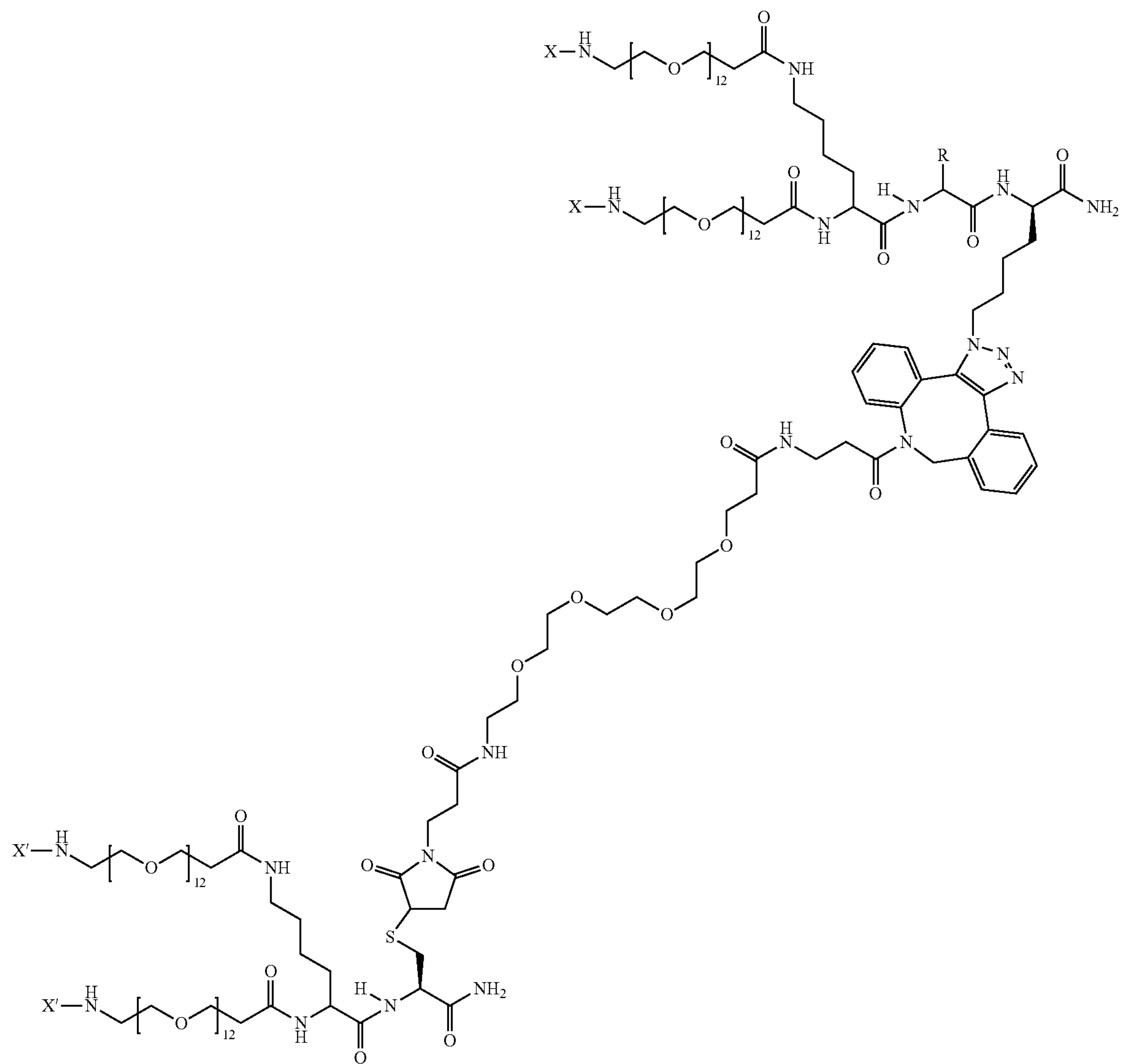

wherein X is an MGS peptide, X' is an MTS peptide and R is a reactive group capable of chemically reacting with a moiety. In some aspects, the MGS peptide is any of those disclosed herein. In some aspects, the MGS peptide comprises the amino acid sequence of any of the sequences set forth in SEQ ID NOs: 1-8 as shown in Table 1. In some aspects, the MTS peptide is any of those disclosed herein. In some aspects, the MTS peptide comprises the amino acid sequence of any of the sequences set forth in SEQ ID NOs: 9-14 as shown in Table 2.

In some aspects, the composition comprises the structure:

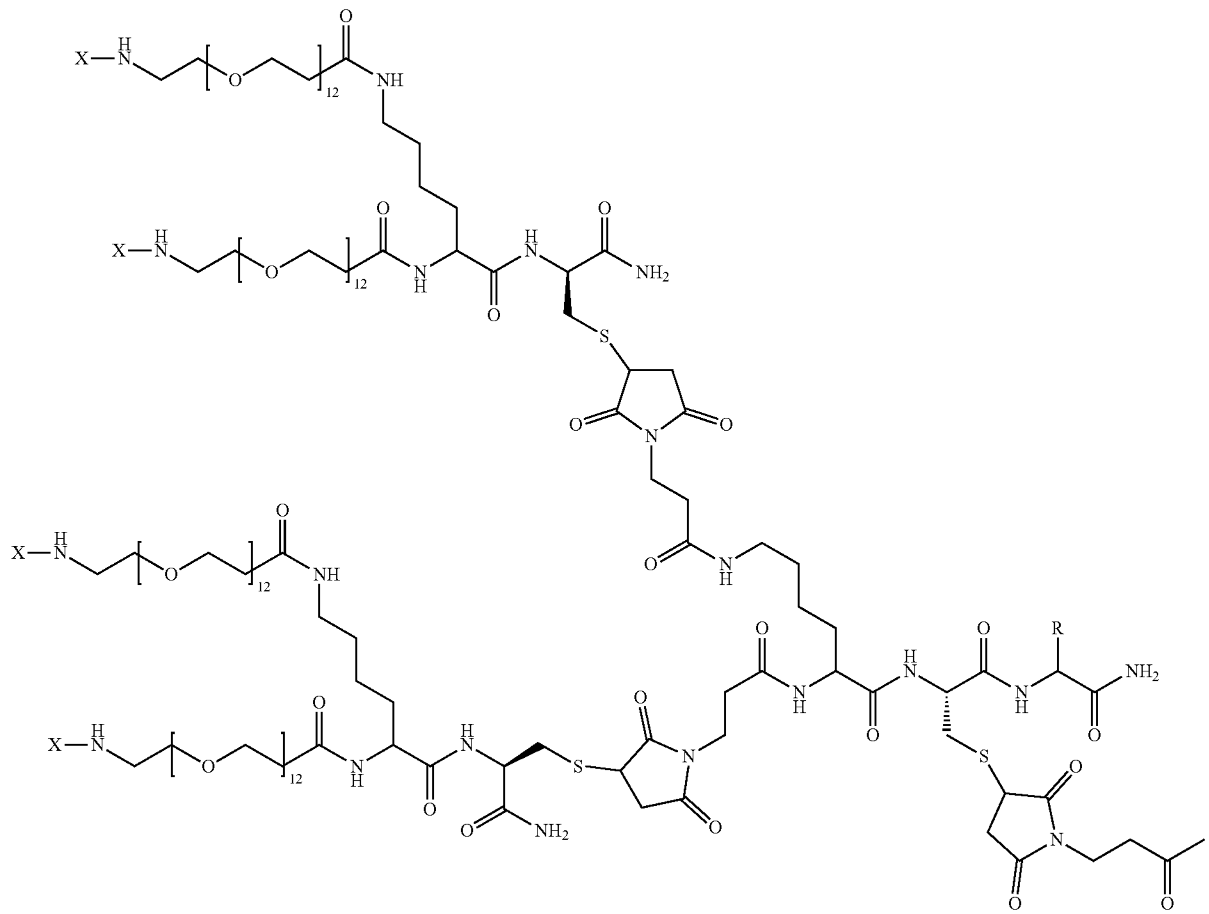

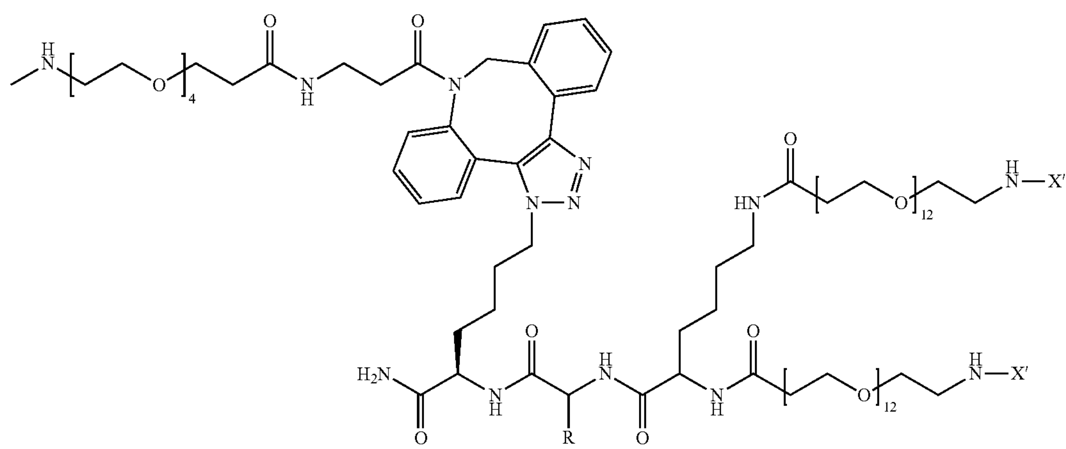

wherein X' is a MTS peptide, X is a MGS peptide, and R is a reactive group capable of chemically reacting with a moiety. In some aspects, the MGS peptide is any of those disclosed herein. In some aspects, the MGS peptide comprises the amino acid sequence of any of the sequences set forth in SEQ ID NOs: 1-8 as shown in Table 1. In some aspects, the MTS peptide is any of those disclosed herein. In some aspects, the MTS peptide comprises the amino acid sequence of any of the sequences set forth in SEQ ID NOs: 9-14 as shown in Table 2.

In some aspects, the composition comprises the structure:

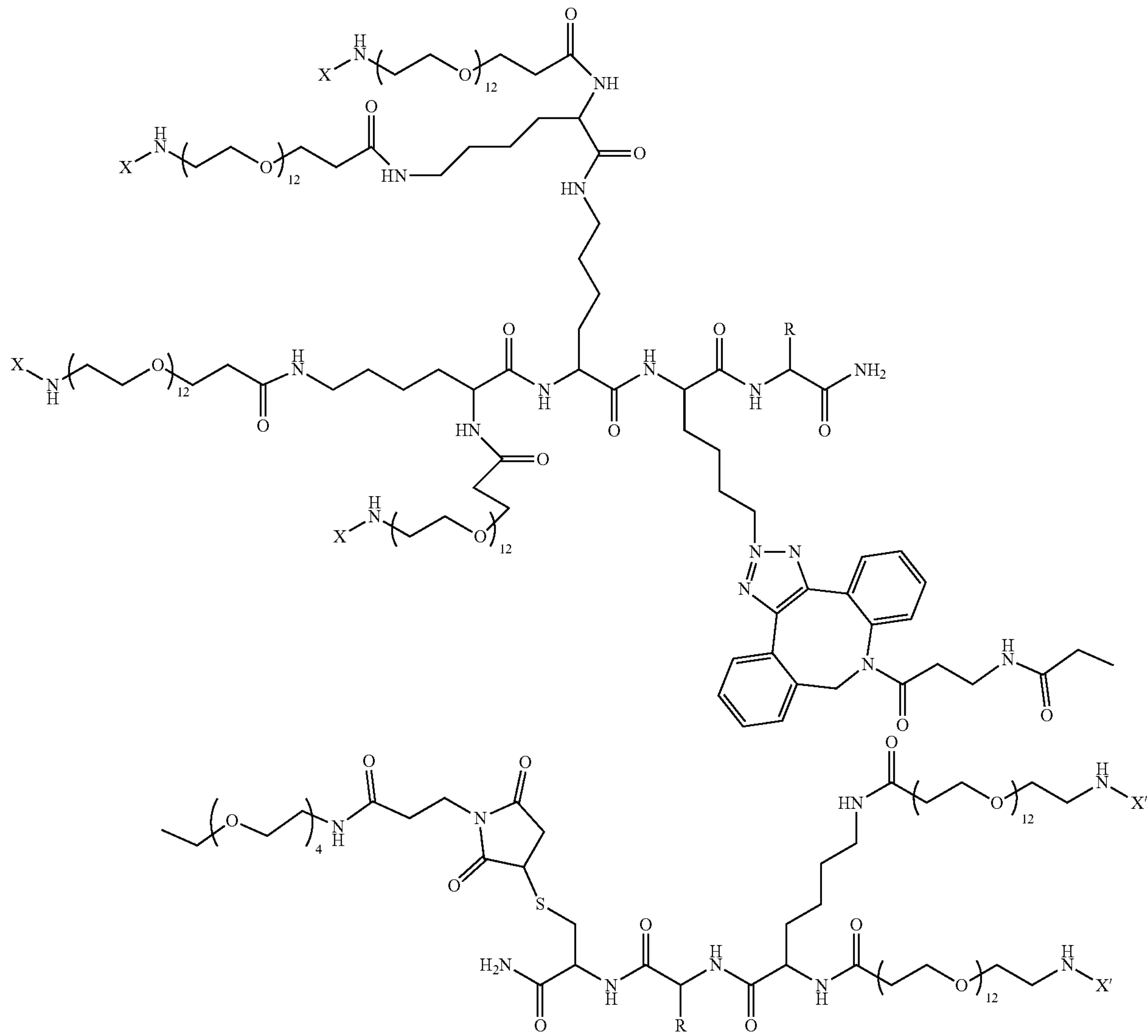

wherein X' is a MTS peptide, X is a MGS peptide, and R is a reactive group capable of chemically reacting with a moiety. In some aspects, the MGS peptide is any of those disclosed herein. In some aspects, the MGS peptide comprises the amino acid sequence of any of the sequences set forth in SEQ ID NOs: 1-8 as shown in Table 1. In some aspects, the MTS peptide is any of those disclosed herein. In some aspects, the MTS peptide comprises the amino acid sequence of any of the sequences set forth in SEQ ID NOs: 9-14 as shown in Table 2.

In some aspects, the reactive group can be, but is not limited to, carboxylic acid, acyl halides, sulfonyl halides, chloroformates, aldehydes, alkynes, alkynes (with No Acetylenic Hydrogen), amides and imides, amines, phosphines, and pyridines, anhydrides, azo, diazo, azido, hydrazine, and azide compounds, carbamates, epoxides, esters, sulfate esters, phosphate, esters, thiophosphate esters, and borate esters, halogenated organic compounds, isocyanates and isothiocyanates, ketones, oximes, sulfides (Organic).

Disclosed are pharmaceutical compositions. Thus, the disclosed compositions can further comprise a pharmaceutically acceptable carrier. Disclosed are compositions comprising MGS peptides comprising the amino acid sequence of any of the sequences set forth in SEQ ID NOs: 1-8 as shown in Table 1 and a pharmaceutically acceptable carrier. Disclosed are compositions comprising MTS peptides comprising the amino acid sequence of any of the sequences set forth in SEQ ID NOs: 9-14 as shown in Table 2 and a pharmaceutically acceptable carrier. Disclosed are compositions comprising four MGS peptides conjugated to two MTS peptides, wherein the four MGS peptides comprise the amino acid sequence of GFHNVYPYTWGGFSDIDLMADEI (SEQ ID NO:1): EQRWVQMLHLQTRYAGEWPG (SEQ ID NO:2): FQHNPFPYTYSMEDTDVEIK (SEQ ID NO: 3): or YAAWPASGAWT (SEQ ID NO:4): wherein the two MTS peptides comprise the amino acid sequence of DAYKLQTSLDWQMWNP (SEQ ID NO:9); FPSWTSKNQQWTNQRQ (SEQ ID NO:11): or SKETYSMNAQRQHERS (SEQ ID NO: 13) and a pharmaceutically acceptable carrier.

1. Delivery of Compositions

In the methods described herein, delivery (or administration) of the peptides or compositions disclosed herein can be via a variety of mechanisms. As defined above, disclosed herein are compositions comprising any one or more of the peptides described herein can be used to produce a composition which can also include a carrier such as a pharmaceutically acceptable carrier. For example, disclosed are pharmaceutical compositions, comprising the peptides disclosed herein, and a pharmaceutically acceptable carrier.

For example, the compositions described herein can comprise a pharmaceutically acceptable carrier. By "pharmaceutically acceptable" is meant a material or carrier that would be selected to minimize any degradation of the active ingredient and to minimize any adverse side effects in the subject, as would be well known to one of skill in the art. Examples of carriers include dimyristoylphosphatidyl choline (DMPC), phosphate buffered saline or a multivesicular liposome. For example, PG: PC: Cholesterol: peptide or PC: peptide can be used as carriers in this invention. Other suitable pharmaceutically acceptable carriers and their formulations are described in Remington: The Science and Practice of Pharmacy (19th ed.) ed. A. R. Gennaro, Mack Publishing Company, Easton, PA 1995. Typically, an appropriate amount of pharmaceutically acceptable salt is used in the formulation to render the formulation isotonic. Other examples of the pharmaceutically acceptable carrier include, but are not limited to, saline, Ringer's solution and dextrose solution. The pH of the solution can be from about 5 to about 8, or from about 7 to about 7.5. Further carriers include sustained release preparations such as semi-permeable matrices of solid hydrophobic polymers containing the composition, which matrices are in the form of shaped articles, e.g., films, stents (which are implanted in vessels during an angioplasty procedure), liposomes or microparticles. It will be apparent to those persons skilled in the art that certain carriers may be more preferable depending upon, for instance, the route of administration and concentration of composition being administered. These most typically would be standard carriers for administration of drugs to humans, including solutions such as sterile water, saline, and buffered solutions at physiological pH.

Pharmaceutical compositions can also include carriers, thickeners, diluents, buffers, preservatives, and the like, as long as the intended activity of the polypeptide, peptide, nucleic acid, vector of the invention is not compromised. Pharmaceutical compositions may also include one or more active ingredients (in addition to the composition of the invention) such as antimicrobial agents, anti-inflammatory agents, anesthetics, and the like. The pharmaceutical composition may be administered in a number of ways depending on whether local or systemic treatment is desired, and on the area to be treated.

Preparations of parenteral administration include sterile aqueous or non-aqueous solutions, suspensions, and emulsions. Examples of non-aqueous solvents are propylene glycol, polyethylene glycol, vegetable oils such as olive oil, and injectable organic esters such as ethyl oleate. Aqueous carriers include water, alcoholic/aqueous solutions, emulsions, or suspensions, including saline and buffered media. Parenteral vehicles include sodium chloride solution, Ringer's dextrose, dextrose and sodium chloride, lactated Ringer's, or fixed oils. Intravenous vehicles include fluid and nutrient replenishers, electrolyte replenishers (such as those based on Ringer's dextrose), and the like. Preservatives and other additives may also be present such as, for example, antimicrobials, anti-oxidants, chelating agents, and inert gases and the like.

Formulations for optical administration may include ointments, lotions, creams, gels, drops, suppositories, sprays, liquids and powders. Conventional pharmaceutical carriers, aqueous, powder or oily bases, thickeners and the like may be necessary or desirable.

Compositions for oral administration include powders or granules, suspensions or solutions in water or non-aqueous media, capsules, sachets, or tablets. Thickeners, flavorings, diluents, emulsifiers, dispersing aids, or binders may be desirable. Some of the compositions may potentially be administered as a pharmaceutically acceptable acid- or base-addition salt, formed by reaction with inorganic acids such as hydrochloric acid, hydrobromic acid, perchloric acid, nitric acid, thiocyanic acid, sulfuric acid, and phosphoric acid, and organic acids such as formic acid, acetic acid, propionic acid, glycolic acid, lactic acid, pyruvic acid, oxalic acid, malonic acid, succinic acid, maleic acid, and fumaric acid, or by reaction with an inorganic base such as sodium hydroxide, ammonium hydroxide, potassium hydroxide, and organic bases such as mon-, di-, trialkyl and aryl amines and substituted ethanolamines.

The disclosed delivery techniques can be used not only for the disclosed compositions but also the disclosed nucleic acid sequences and vectors.

F. Methods of Transporting Cargo

Disclosed are methods of transporting cargo to the CNS of a subject comprising administering one or more of the compositions disclosed herein to a subject in need thereof, wherein the peptide conjugated to cargo enters the CNS.

In some aspects, the cargo can be, but is not limited to, a dye, an imaging agent, a therapeutic, a protein, a nucleic acid, an amino acid, a peptide, a lipid, small molecule, an antibody, a radionuclide, carbohydrate or a nanoparticle, For example, in some aspects, the cargo is an imaging agent, antibody, and/or siRNA.

In some aspects, the composition, and thus the cargo, enters the choroid plexus. In some aspects, the composition, and thus the cargo, enters the cerebrospinal fluid (CSF). In some aspects, the CSF transports the composition, and thus the cargo, throughout the CNS.

In some aspects, the MTS peptide allows the composition to pass the blood brain barrier and enter the CNS. In some aspects, the MGS peptide targets the cargo to specific CNS cells. In some aspects, the CNS cells are neuronal cells or microglia.

In some aspects, the cargo retains functional activity inside the CNS.

In some aspects, administering is an intravenous or intrathecal administration. In some aspects, any delivery method described herein can be used.

In some aspects, the composition can be a composition comprising four MGS peptides conjugated to two MTS peptides, wherein the four MGS peptides comprise the amino acid sequence of GFHNVYPYTWGGFSDIDLMADEI (SEQ ID NO:1): EQRWVQMLHLQTRYAGEWPG (SEQ ID NO:2): FQHNPFPYTYSMEDTDVEIK (SEQ ID NO: 3): or YAAWPASGAWT (SEQ ID NO:4): wherein the two MTS peptides comprise the amino acid sequence of DAYKLQTSLDWQMWNP (SEQ ID NO:9); FPSWTSKNQQWTNQRQ (SEQ ID NO:11): or SKETYSMNAQRQHERS (SEQ ID NO: 13).

As described throughout, the compositions can further comprise one or more linkers. In some aspects, the disclosed compositions can further comprise a first linker. In some aspects, the first linker is attached to the C-terminal end of the MGS peptide. In some aspects, the first linker can be any of the linkers described herein. In some aspects, the first linker can comprise a PEG linker, an alkyl linker, a maleimide linker, an amide linker, a peptide linker, an amide linker, an aryl linker, a dibenzocyclooctyne linker, an azide linker, a triazole linker, dibenzoazacyclooctyne, a 8,9-dihydro-1H-dibenzo[1,2,3]triazolo[4,45-d]azocine or a combination thereof. In some aspects, the first linker can link a MGS peptide to another MGS peptide or link a MGS peptide to a cargo or link a MGS peptide to another linker. In some aspects, a first linker can comprise one or more of the structures shown in FIG. 3. For example, each MGS peptide can be attached to a linker, such as PEG (of any length). Each MGS peptide-PEG can then be linked using one or more amino acids, modified amino acids, or linkers which can create dimeric or tetrameric cores described herein.

In some aspects, the compositions can further comprise a second linker. In some aspects, the second linker is attached to the first linker. In some aspects, the second linker is further attached to third linker. Thus, in some aspects, the compositions further comprise a third linker.

In some aspects, the third linker is attached to the second linker. In some aspects, the third linker is attached to the C-terminal end of a MTS peptide. In some aspects, the third linker can be any of the linkers described herein. In some aspects, the third linker can comprise a PEG linker, an alkyl linker, a maleimide linker, an amide linker, an aryl linker, a peptide linker, a dibenzocyclooctyne linker, an azide linker, a triazole linker, dibenzoazacyclooctyne, a 8,9-dihydro-1H-dibenzo[1,2,3]triazolo[4,45-d]azocine or a combination thereof. In some aspects, the third linker can link a MTS peptide to another MTS peptide or link a MTS peptide to a cargo or link a MTS peptide to another linker. In some aspects, a third linker can comprise one or more of the structures shown in FIG. 3. For example, each MTS peptide can be attached to a linker, such as PEG (of any length). Each MTS peptide-PEG can then be linked using one or more amino acids, modified amino acids, or linkers which can create dimeric or tetrameric cores described herein.

In some aspects, the first linker and/or the second linker, and/or the third linker comprises a polyethylene glycol (PEG) linker, an alkyl linker, a maleimide linker, a disulfide linker, a peptide linker, an amide linker, an aryl linker, a dibenzocyclooctyne linker, an azide linker, a triazole linker, dibenzoazacyclooctyne, a 8,9-dihydro-1H-dibenzo[1,2,3]triazolo[4,45-d]azocine or a combination thereof. In some aspects, the first, second and/or third linker comprises a PEG linker. In some aspects, any length of PEG linker can be used. For example, any of PEG 1-PEG 30 can be used. In some aspects, a PEG of length 1-5000 can be used.

In some aspects, the cargo is attached to the first linker, the second linker, and/or the third linker. Thus, in some aspects, the disclosed compositions can comprise one or more cargos. In some aspects, one or more of the linkers can comprise a cargo.

In some aspects, the MGS peptides, the MTS peptides, or both are N-terminally protected. For example, in some aspects, the MGS peptides, the MTS peptides, or both comprise an N-terminal acetylation. Thus, in some aspects, the MGS peptide or MTS peptide can be any of those in Tables 1 and/or 2.

G. Methods of Treating

Disclosed are methods of treating a CNS disorder or injury in a subject comprising administering one or more of the compositions disclosed herein to a subject in need thereof, wherein the cargo is a CNS disorder or injury therapeutic.

In some aspects, the CNS disorder or injury is Parkinson's disease, Alzheimer's disease, Glioblastoma, Amyotrophic lateral sclerosis, Multiple sclerosis, or traumatic brain injury. Thus, in some aspects, the CNS disorder therapeutic is an antibody (e.g., monoclonal, polyclonal, bispecific), a gene therapy, a compound, a nucleic acid sequence, a small molecule, ribonucleoproteins, or a peptide (or protein). In some aspects, specific examples of a CNS disorder or injury therapeutic can be, but are not limited to, an N-methyl D-aspartate (NMDA) antagonist, chemotherapeutic, glutamate antagonist, or immune modulator (e.g. immune suppressor or immune activator). In some aspects, gene therapy allows for the delivery of genetic materials that encode therapeutic molecules. In some aspects, gene therapy encompasses the administration of biological medicinal products containing recombinant nucleic acids, administered to a subject to regulate, repair, replace, add, or delete a genetic sequence with the aim to treat or cure diseases. In some aspects, the nucleic acid can be a small RNA such as, but not limited to, short interfering RNAs (siRNAs), microRNAs (miRNAs), and piwi-interacting RNAs (piRNAs). In some aspects, a therapeutic can be an antibody that targets Aβ peptides/plaques (such as Donanemab, Lecanemab), Tau tangles. β-secretase, γ-secretase, acetylcholinesterase (AChE), butyrylcholinesterase (BuChE). In some aspects, nucleic acid therapies can be used that reduce expression of Aβ peptides. Tau tangles. β-secretase, γ-secretase, acetylcholinesterase (AChE), butyrylcholinesterase (BuChE), CD22.

In some aspects, the composition can be a composition comprising four MGS peptides conjugated to two MTS peptides, wherein the four MGS peptides comprise the amino acid sequence of GFHNVYPYTWGGFSDIDLMADEI (SEQ ID NO:1): EQRWVQMLHLQTRYAGEWPG (SEQ ID NO:2); FQHNPFPYTYSMEDTDVEIK (SEQ ID NO: 3): or YAAWPASGAWT (SEQ ID NO:4): wherein the two MTS peptides comprise the amino acid sequence of DAYKLQTSLDWQMWNP (SEQ ID NO:9): FPSWTSKNQQWTNQRQ (SEQ ID NO:11); or SKETYSMNAQRQHERS (SEQ ID NO: 13).

As described throughout, the compositions can further comprise one or more linkers. In some aspects, the disclosed compositions can further comprise a first linker. In some aspects, the first linker is attached to the C-terminal end of the MGS peptide. In some aspects, the first linker can be any of the linkers described herein. In some aspects, the first linker can comprise a PEG linker, an alkyl linker, a maleimide linker, an amide linker, a peptide linker, an aryl linker, a dibenzocyclooctyne linker, an azide linker, a triazole linker, dibenzoazacyclooctyne, a 8,9-dihydro-1H-dibenzo[1,2,3]triazolo[4,45-d]azocineor a combination thereof. In some aspects, the first linker can link a MGS peptide to another MGS peptide or link a MGS peptide to a cargo or link a MGS peptide to another linker. In some aspects, a first linker can comprise one or more of the structures shown in FIG. 3. For example, each MGS peptide can be attached to a linker, such as PEG (of any length). Each MGS peptide-PEG can then be linked using one or more amino acids, modified amino acids or linkers which can create dimeric or tetrameric cores described herein.

In some aspects, the compositions can further comprise a second linker. In some aspects, the second linker is attached to the first linker. In some aspects, the second linker is further attached to third linker. Thus, in some aspects, the compositions further comprise a third linker.

In some aspects, the third linker is attached to the second linker. In some aspects, the third linker is attached to the C-terminal end of a MTS peptide. In some aspects, the third linker can be any of the linkers described herein. In some aspects, the third linker can comprise a PEG linker, an alkyl linker, a maleimide linker, an amide linker, a peptide linker, an aryl linker, a dibenzocyclooctyne linker, an azide linker, a triazole linker, dibenzoazacyclooctyne, a 8,9-dihydro-1H-dibenzo[1,2,3]triazolo[4,45-d]azocine or a combination thereof. In some aspects, the third linker can link a MTS peptide to another MTS peptide or link a MTS peptide to a cargo or link a MTS peptide to another linker. In some aspects, a third linker can comprise one or more of the structures shown in FIG. 3. For example, each MTS peptide can be attached to a linker, such as PEG (of any length). Each MTS peptide-PEG can then be linked using one or more amino acids, modified amino acids or linkers which can create dimeric or tetrameric cores described herein.

In some aspects, the first linker and/or the second linker, and/or the third linker comprises a polyethylene glycol (PEG) linker, an alkyl linker, a maleimide linker, a disulfide linker, a peptide linker, an amide linker, an aryl linker, a dibenzocyclooctyne linker, an azide linker, a triazole linker, dibenzoazacyclooctyne, a 8,9-dihydro-1H-dibenzo[1,2,3]triazolo[4,45-d]azocine or a combination thereof. In some aspects, the first, second and/or third linker comprises a PEG linker. In some aspects, any length of PEG linker can be used. For example, any of PEG 1-PEG 30 can be used. In some aspects, the linker has a length of up to PEG5000.

In some aspects, the cargo is attached to the first linker, the second linker, and/or the third linker. Thus, in some aspects, the disclosed compositions can comprise one or more cargos. In some aspects, one or more of the linkers can comprise a cargo.

In some aspects, the MGS peptides, the MTS peptides, or both are N-terminally protected. For example, in some aspects, the MGS peptides, the MTS peptides, or both comprise an N-terminal acetylation. Thus, in some aspects, the MGS peptide or MTS peptide can be any of those in Tables 1 and/or 2.

H. Methods of Imaging

Disclosed are method of imaging the CNS of a subject comprising administering one or more of the compositions disclosed herein to a subject in need thereof, wherein the cargo is an imaging agent. In some aspects, the imaging agent can be, but is not limited to, a dye, radionuclides, contrast agents, a fluorescent protein or a fluorescent molecule. In some aspects, the imaging agent is attached to a protein, peptide, or nucleic acid.

In some aspects, the composition can be a composition comprising four MGS peptides conjugated to two MTS peptides, wherein the four MGS peptides comprise the amino acid sequence of GFHNVYPYTWGGFSDIDLMADEI (SEQ ID NO:1): EQRWVQMLHLQTRYAGEWPG (SEQ ID NO:2): FQHNPFPYTYSMEDTDVEIK (SEQ ID NO: 3): or YAAWPASGAWT (SEQ ID NO:4): wherein the two MTS peptides comprise the amino acid sequence of DAYKLQTSLDWQMWNP (SEQ ID NO:9): FPSWTSKNQQWTNQRQ (SEQ ID NO:11): or SKETYSMNAQRQHERS (SEQ ID NO: 13).

As described throughout, the compositions can further comprise one or more linkers. In some aspects, the disclosed compositions can further comprise a first linker. In some aspects, the first linker is attached to the C-terminal end of the MGS peptide. In some aspects, the first linker can be any of the linkers described herein. In some aspects, the first linker can comprise a PEG linker, an alkyl linker, a maleimide linker, an amide linker, a peptide linker, an aryl linker, a dibenzocyclooctyne linker, an azide linker, a triazole linker, dibenzoazacyclooctyne, a 8,9-dihydro-1H-dibenzo[1,2,3]triazolo[4,45-d]azocine or a combination thereof. In some aspects, the first linker can link a MGS peptide to another MGS peptide or link a MGS peptide to a cargo or link a MGS peptide to another linker. In some aspects, a first linker can comprise one or more of the structures shown in FIG. 3. For example, each MGS peptide can be attached to a linker, such as PEG (of any length). Each MGS peptide-PEG can then be linked using one or more amino acids, modified amino acids, or linkers which can create dimeric or tetrameric cores described herein.

In some aspects, the compositions can further comprise a second linker. In some aspects, the second linker is attached to the first linker. In some aspects, the second linker is further attached to third linker. Thus, in some aspects, the compositions further comprise a third linker.

In some aspects, the third linker is attached to the second linker. In some aspects, the third linker is attached to the C-terminal end of a MTS peptide. In some aspects, the third linker can be any of the linkers described herein. In some aspects, the third linker can comprise a PEG linker, an alkyl linker, a maleimide linker, an amide linker, a peptide linker, an amide linker, an aryl linker, a dibenzocyclooctyne linker, an azide linker, a triazole linker, dibenzoazacyclooctyne, a 8,9-dihydro-1H-dibenzo[1,2,3]triazolo[4,45-d]azocine or a combination thereof. In some aspects, the third linker can link a MTS peptide to another MTS peptide or link a MTS peptide to a cargo or link a MTS peptide to another linker. In some aspects, a third linker can comprise one or more of the structures shown in FIG. 3. For example, each MTS peptide can be attached to a linker, such as PEG (of any length). Each MTS peptide-PEG can then be linked using an amino acid or modified amino acid which can create dimeric or tetrameric cores described herein. For example, in some aspects, the PEG can be added during Fmoc solid phase peptide synthesis to a deprotected lysine (both the ε-amino group of the side chain and the amino terminus). This can provide 2 free amino groups to couple the PEGs to resulting in a dimer. For the tetramer, a fully deprotected lysine can be coupled to another lysine in the peptide synthesis. This can result in 4 free amino groups that can be used for attaching the PEG.

In some aspects, the first linker and/or the second linker, and/or the third linker comprises a polyethylene glycol (PEG) linker, an alkyl linker, a maleimide linker, a disulfide linker, a peptide linker, an amide linker, an aryl linker, a dibenzocyclooctyne linker, an azide linker, a triazole linker, dibenzoazacyclooctyne, a 8,9-dihydro-1H-dibenzo[1,2,3]triazolo[4,45-d]azocine or a combination thereof. In some aspects, the first, second and/or third linker comprises a PEG linker. In some aspects, any length of PEG linker can be used. For example, any of PEG 1-PEG 30 can be used. In some aspects, a length of up to PEG5000 can be used.

In some aspects, the cargo is attached to the first linker, the second linker, and/or the third linker. Thus, in some aspects, the disclosed compositions can comprise one or more cargos. In some aspects, one or more of the linkers can comprise a cargo.

In some aspects, the MGS peptides, the MTS peptides, or both are N-terminally protected. For example, in some aspects, the MGS peptides, the MTS peptides, or both comprise an N-terminal acetylation. Thus, in some aspects, the MGS peptide or MTS peptide can be any of those in Tables 1 and/or 2.

I. Dosages

Disclosed are dosing regimens comprising administering a single dose of one or more of the disclosed compositions or peptides to a subject in need thereof, wherein the single dose comprises an amount effective to enter the CNS and target specific CNS cell types.

Disclosed are dosing regimens comprising administering at least two doses of one or more of the disclosed compositions or peptides to a subject in need thereof, wherein each dose is the same concentration. In some aspects, each dose after a first dose can be decreased. In some aspects, each dose after a first dose can be increased.

In some aspects, a single dose can be a continuous administration. In some aspects, a continuous administration can be hours, days, weeks, or months. In some aspects, there can be two or more doses. In some aspects, the two or more doses can be administered days, weeks, or months apart.

J. Kits

The materials described above as well as other materials can be packaged together in any suitable combination as a kit useful for performing, or aiding in the performance of, the disclosed method. It is useful if the kit components in a given kit are designed and adapted for use together in the disclosed method. For example disclosed are kits comprising one or more of the disclosed MGS peptides, MTS peptides, linkers, or combinations thereof. For example, disclosed are kits comprising any of the disclosed compositions.

Examples

A. Example 1: Dual Targeting

Figure 5:
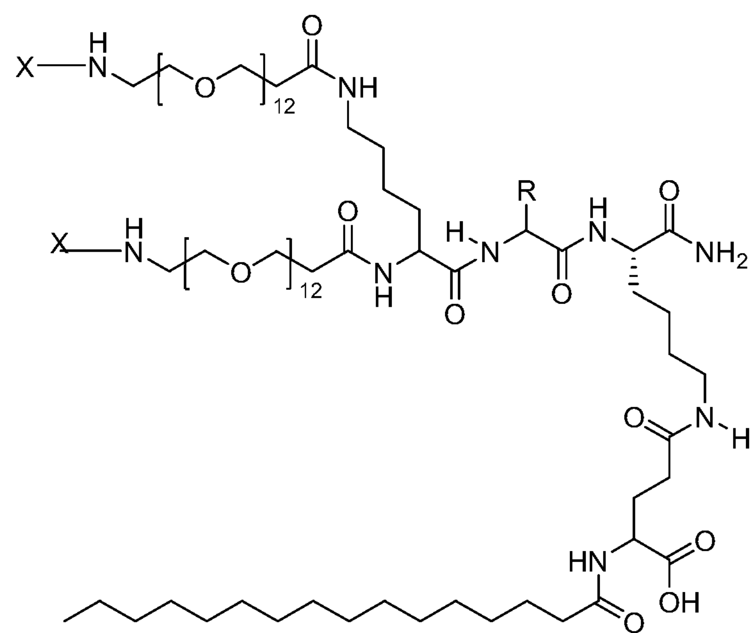
FIG. 5 shows an example of a structure of the dimeric core with a fatty acid modification. The resultant MTS peptide is referred to as MTS3_V2-2. This modification can be made with MTS1 and MTS2 as well.

FIG. 5 shows an example of a structure of the dimeric core with a fatty acid modification. When X is CH30-SKETYSMNAQRQHERS (SEQ ID NO:14), the structure is referred to as MTS3_V2-2. Similar structures can be made with X being SEQ ID NO:9 (MTS1) or SEQ ID NO: 10 (acetylated MTS1) or SEQ ID NO:11 (MTS2) or SEQ ID NO: 12 (acetylated MTS2).

Figure 6:
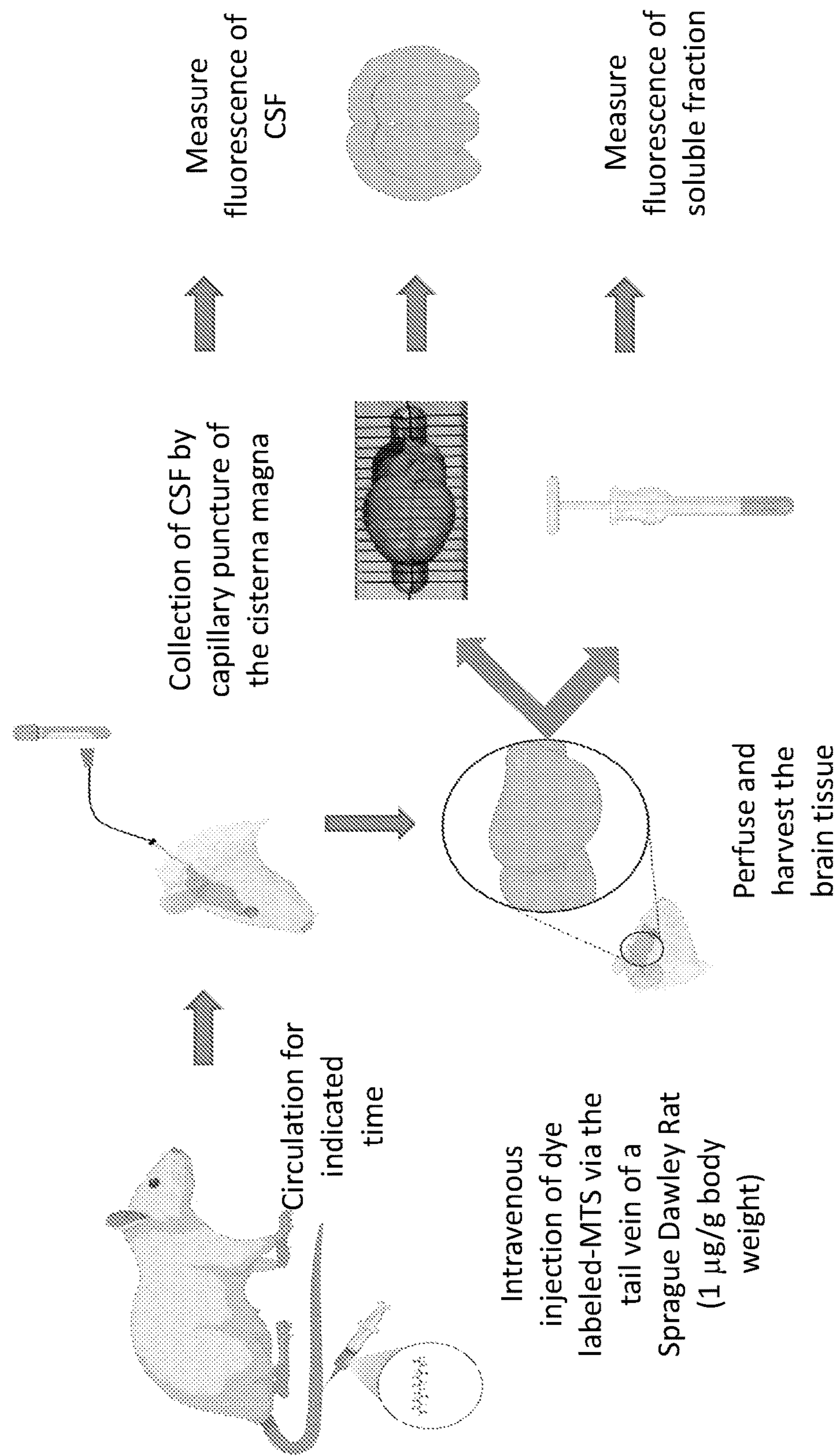
FIG. 6 shows a schematic of an experimental workflow for addressing MTS transport into the CNS in vivo.

FIG. 6 provides a schematic diagram of the general experimental flow used to assess delivery of the disclosed compositions to the CNS.

Figures 7A, 7B:
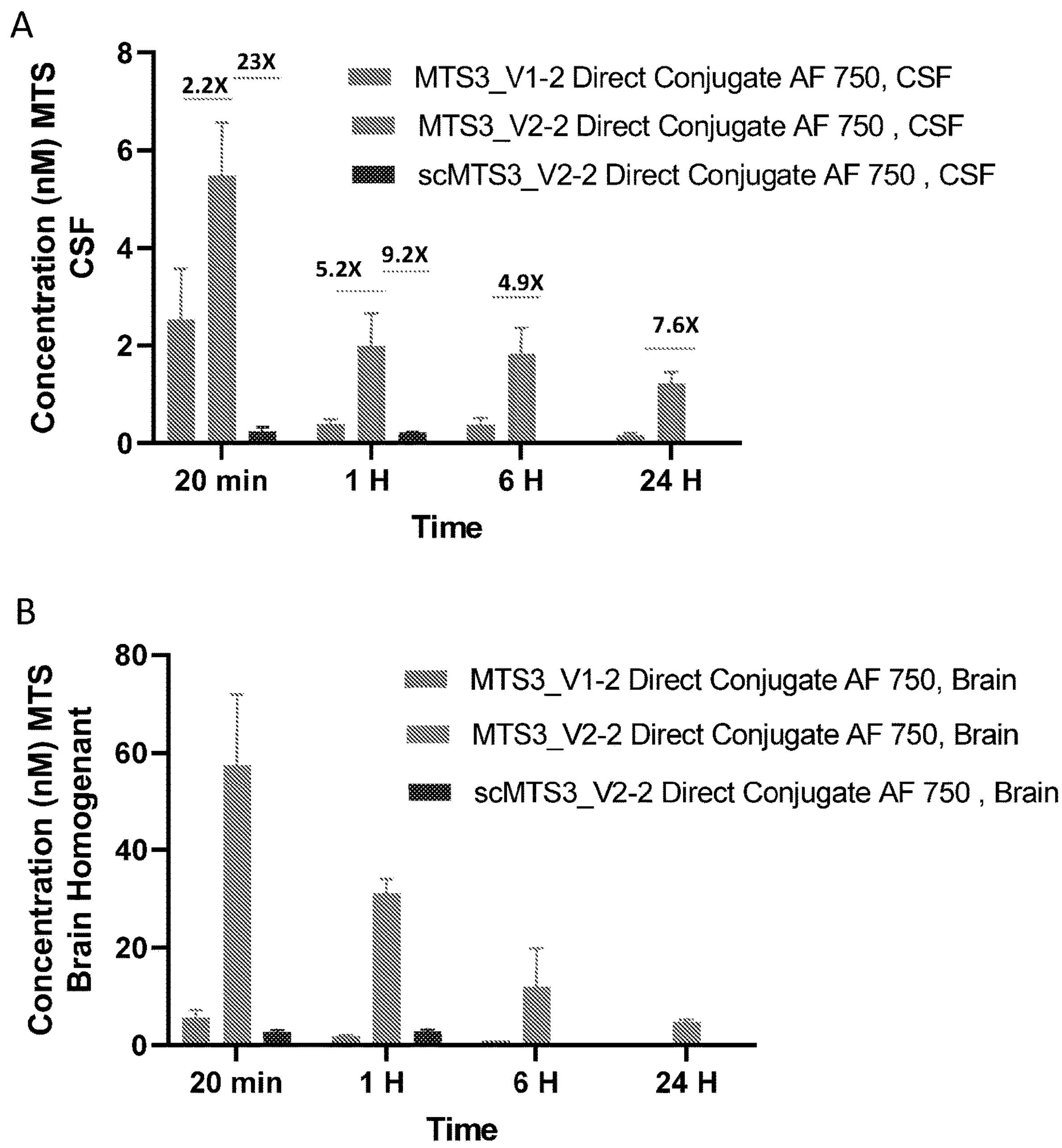
FIGS. 7A and B show the lipidation of MTS3 with a C16 fatty acid increases transport into the CSF (A) and Brain (B). MTS3_V1-2 is the dimeric Ac-SKETYSMNAQRQHERS (SEQ ID NO:14). MTS3_V2-2 is the dimeric, C16 fatty acid modified core with Ac-SKETYSMNAQRQHERS (SEQ ID NO:14). scMTS3_V2-2 is a dimeric, C16 fatty acid modified core with a scrambled MTS3 sequence (scMTS3: RKSAYNQHSSQMREET: SEQ ID NO:15).

Lipidation of MTS3 with a C16 Fatty Acid Increases Transport into the CSF and Brain (FIG. 7). MTS variants labeled with the near infrared dye Alexa Fluor 750 were injected into the tail vein of Sprague Dawley rats at 1 μg MTS/kg rat body weight. At the indicated time, CSF was isolated via capillary puncture of the cisterna magna. FIG. 7A shows the concentration of MTS3 variants isolated the CSF after indicated in vivo circulation time. MTS3_V2-which contains the C16 fatty acid modification displays 2.2-7.6-fold higher CSF concentration than the nonlipidated MTS3_V1-2. To assure the fatty acid is not driving the transport into the CNS, a control peptide scMTS3_V2-2 which contains the MTS3 amino acid composition but with a scrambled sequence was lipidated. Uptake of MTS3_V2-2 is 9-23-fold higher than scMTS3_V2-2 indicating that transport is dependent on the MTS3 sequence and not the fatty acid modification. FIG. 7B shows the concentrations of the same MTS3 variants found in the brain homogenates after indicated circulation times. Transport into the brain parenchyma of MTS3_V2-2 is 10-12-fold higher than the non-modified MTS3_V1-2 and 17-31-fold higher than the scrambled control, scMTS3_V2-2. Level of MTS3_V1-2 was below detection limit at 24 hours. The concentration in the brain tissue is higher than that in the CSF indicating diffusion throughout the brain and slower washout.

Figure 8:
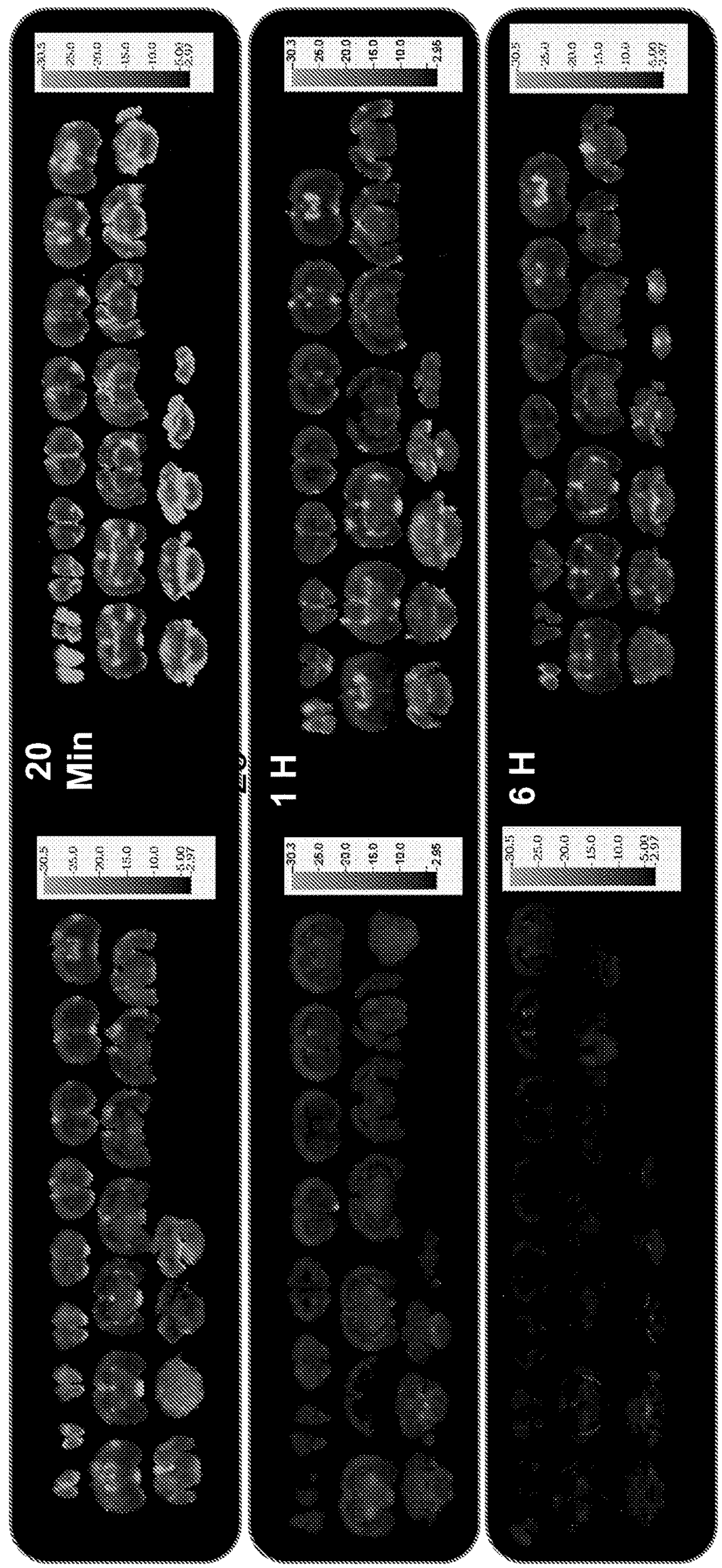
FIG. 8 shows brain accumulation is enhanced for MTS3_V2-2 compared to parental MTS3_V1-2 as witnessed by sectioning and fluorescent imaging of the brain. Both versions were conjugated to the same near-infrared dye, and circulation times are indicated within each panel. Intensity scales bars are shown and are held constant for all images for comparison.

Brain accumulation is enhanced for MTS3_V2-2 compared to parental MTS3_V1-2 as witnessed by sectioning and fluorescent imaging of the brain (FIG. 8). Coronal slices are 1 mm and arranged from the front (upper left) to back (lower right). Consistent with the data from the brain homogenates, MTS3_V2-2 (C16 fatty acid modification) has increased brain uptake compared to MTS3_V1-2 at all time points. Fluorescent signal is seen throughout the brain suggesting diffusion within the parenchyma.

FIG. 3 shows an example of core structures used for the microglial targeting experiments shown below. FIG. 3A shows a dimeric core and FIG. 3B shows a tetrameric core. The core structures shown comprise an MGS peptide, represented as X. The specific MGS peptide used in the below experiments is MGS2_V4, CH3CO-YAAWPASGAWT. Specifically, the tetrameric core, MGS2_V4-4, is used.

Figure 9A:
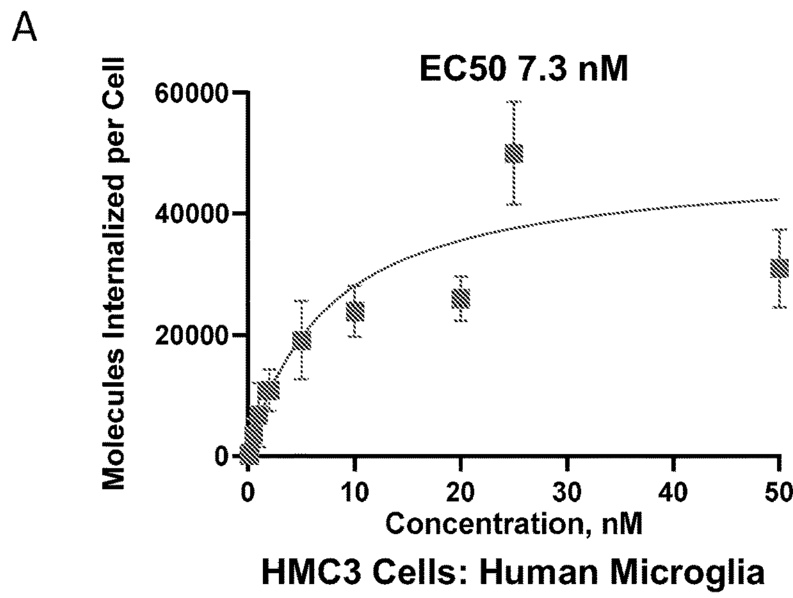
FIGS. 9A-9C show that MGS2_V4-2 is specific for microglia cells and facilitates high levels of cellular uptake.
Figure 9B:
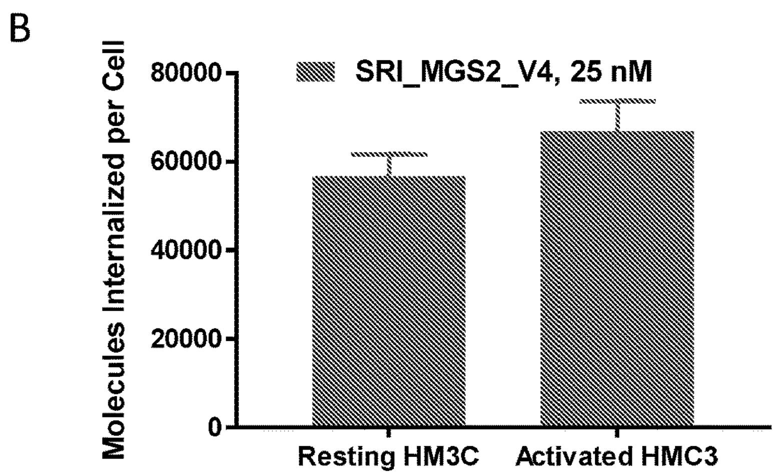
Figure 9C:
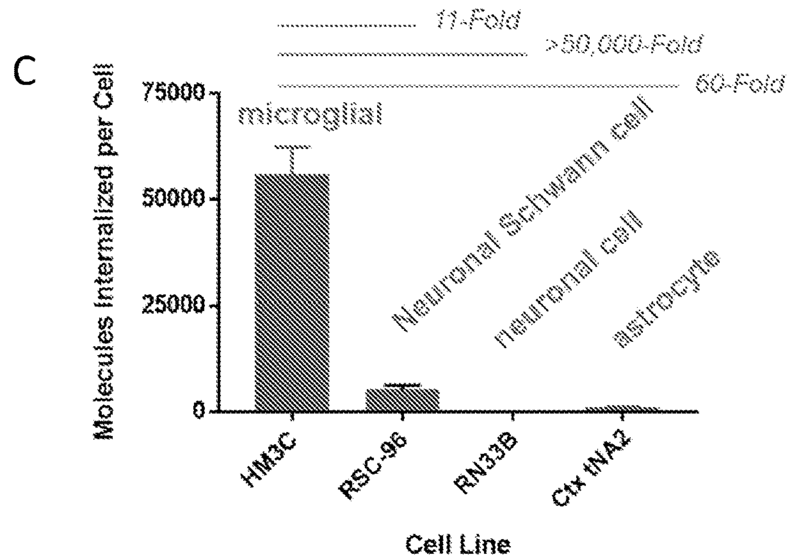
Figure 11:
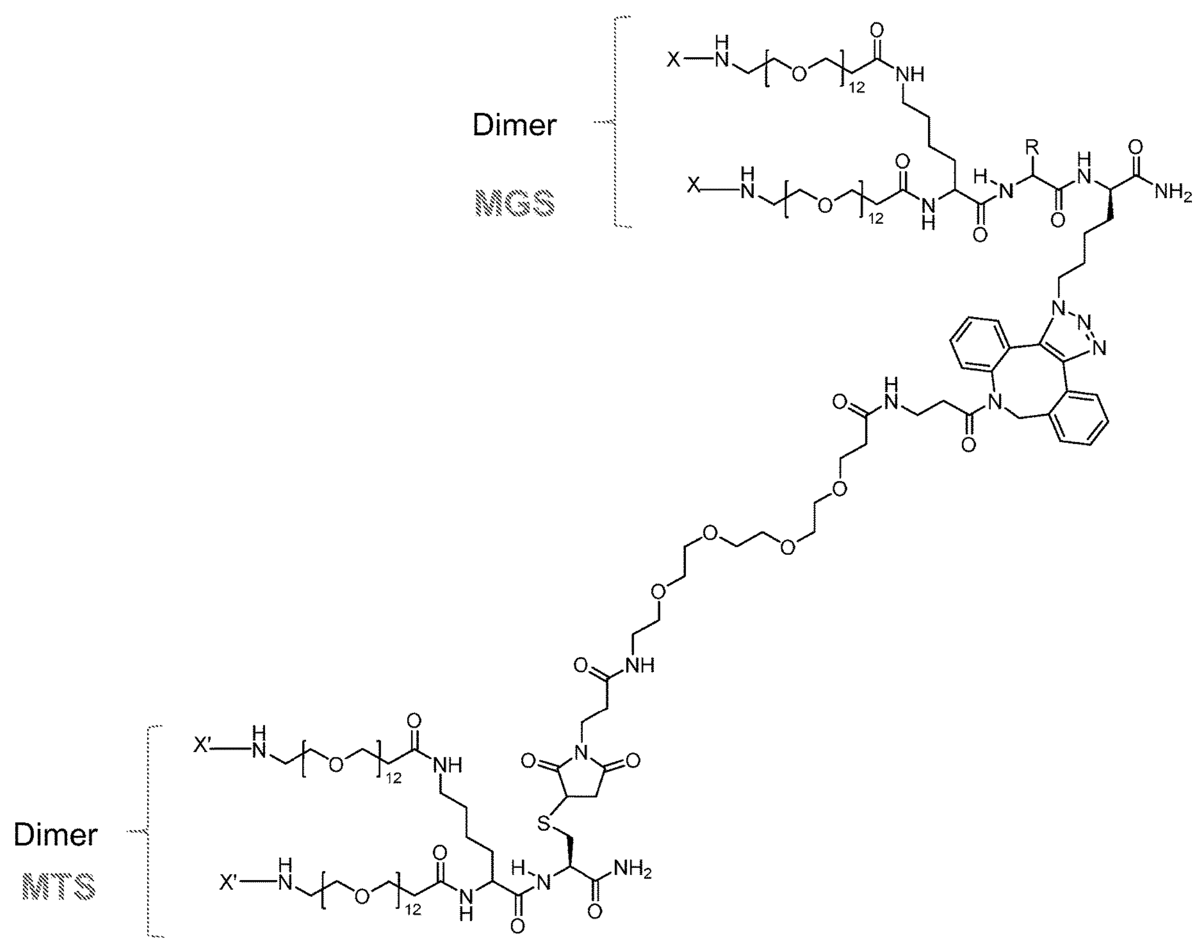
FIG. 11 shows the structure of MTS3_V1-2-MGS2_V4-2 chimera. X=MGS2_V4. X'=MTS3_V1. R=attachment point for dyes, imaging agents, therapeutics, proteins, nucleic acids, other peptides, carbohydrates and/or lipids.

MGS2_V4-2 is specific for microglia cells and facilitates high levels of cellular uptake (FIG. 9). FIG. 9A shows that MGS2_V4-2 binds and internalizes into microglial cells with high affinity and FIG. 9B shows that MGS2_V4-2 binds and internalizes into resting and activated microglial cells. MGS2_V4-2 is specific for microglial cells compared to neuronal cells, Schwann cell, and astrocytes (FIG. 9C).

FIG. 10 shows that optimized MGS2_V4-2 is stable in human serum. MGS2_V4-2 labeled with Alex Fluor 647 was incubated in human serum at 37° C. At the indicated times, an aliquot was removed, serum proteins were precipitated, and the resultant supernatant was analyzed by reverse phase HPLC monitoring the absorbance at 650 nm. Chromatograms for each time point are shown. Intact peptide has a retention time at 11.864. A new species with a retention time of 10.005 mins is observed at 1 h and continues to increase overtime. Peaks were integrated to determine the percentage of intact peptide as well as the amount of observed degradation product. At 24 h, >75% of the MGS2_V4-2 is still intact. Electrospray mass spectrometry was performed on the peptide product arising at the 10.005 min retention time. The mass of this new species corresponds to the loss of the 3 amino acids on both branches of MGS2_V4-2.

FIG. 12 shows the general concept of dual targeting to specific cell types in the CNS. The graph of FIG. 12 shows an example of the uptake of MGS2_V4-2, MTS3_V1-2-MGS2_V4-2 chimera, and MTS3_V1-2 determined on HMC3 cells. Cells were incubated at the indicated concentration of each peptide construct that had been labeled with Alexa Fluor 647. After 1 h incubation at 37° C., uptake was determined by quantitative flow cytometry. MGS2_V4-2 and the MTS3_V1-2-MGS2_V4-2 chimera display the same EC50) and cellular uptake amounts indicating that attachment of MTS3_V1-2 does not impact the cellular efficacy of MGS2_V4-2. As anticipated, MTS3_V1-2 displays no significant cellular uptake at any of the concentrations tested. Thus, uptake is mediated by the MGS not the MTS.

FIG. 13 shows that dual targeting with an MTS-MGS chimeric agent internalizes into microglia as witnessed by confocal microscopy. HMC3 cells were incubated with 25 nM of the MTS3_V1-2-MGS2_V4-2 conjugate which was labeled with Alexa Fluor 647. After 1 h, the peptide solution was removed. Alexa Fluor 488 conjugated wheat germ agglutinin was used to label the cell membrane and Hoechst 33342 was used to stain the nucleus. Live cell imaging was performed on a Zeiss LSM 700. Representative single z-slice images are shown. Cells treated with Alexa Fluor 647 dye alone (FIG. 13A) or the chimeric construct made with a scramble sequence version of the MGS2 peptide, SAWAGAYPWAT (SEQ ID NO:17) (FIG. 13B) do not show Alexa Fluor 647 staining indicative of cellular uptake. By contrast, MTS3_V1-2-MGS2_V4-2 is internalized into HMC3 cells as witnessed by punctate staining within the cell perimeter (FIG. 13C). This indicates that MGS2_V4-2 is mediating the cellular internalization into HMC3 cells and is consistent with the flow cytometry assay quantifying uptake.

Figures 14A, 14B, 14C:
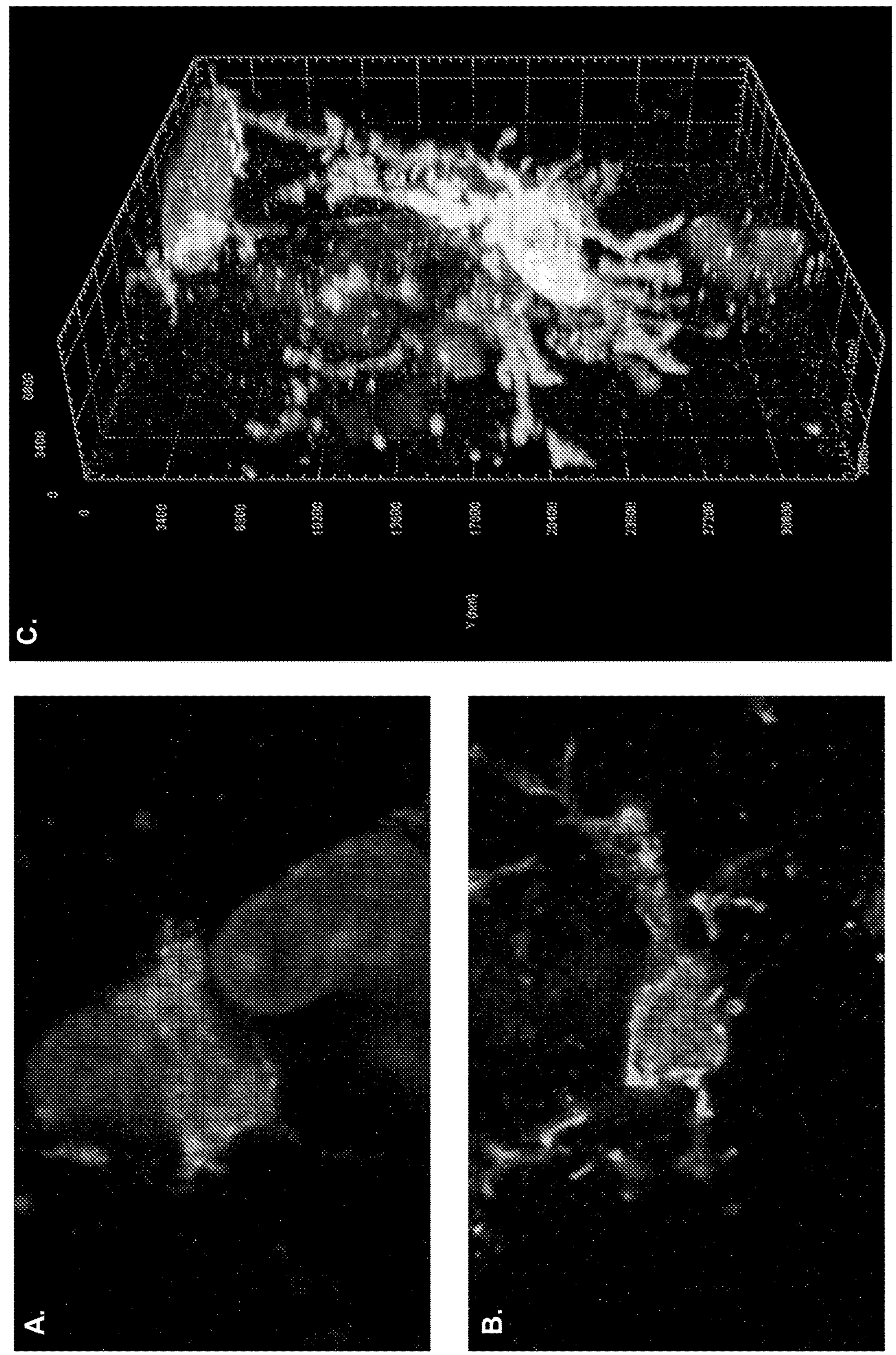
FIGS. 14A-14C shows dual targeting with MTS3_V1-2-MGS2_V4-2 chimera targets microglia in the CNS. The MTS3_V1-2-MGS2_V4-2 conjugate was labeled with Alexa Fluor 647 (red) and injected (0.09 nmol/g) into the lateral tail vein of a Sprague Dawley rat. Following a 2 h circulation time, the animal was euthanized, and the brain was fixed via transcardial perfusion, harvested, cryoprotected, and frozen sectioned in 15 μm sections on a Leica CM1950. Images were taken using a Zeiss LSM 800. Microglia were stained with Iba-1 (grey) and cell nuclei were stained with Hoechst 33342 (Blue).

FIG. 14 shows dual targeting with MTS3_V1-2-MGS2_V4-2 chimera targets microglia in the CNS. Staining was only observed in microglia. No microglial staining was observed with MTS alone, MGS alone, or a scrambled control version of the conjugate.

FIG. 15 shows dual targeting with MTS3_V1-2-MGS2_V4-2 chimera targets microglia in the CNS as evidenced by flow cytometry. The MTS3_V1-2-MGS2_V4-2 conjugate was labeled with Alexa Fluor 647 (red) and injected (0.09 nmol/g) into the lateral tail vein of a Sprague Dawley rat. Following a 2 h circulation time, the animal was euthanized, and brain tissue harvested. The brain was dissociated using the Miltenyi Biotec gentleMACS Octo Dissociator. Whole brain cells were incubated with CD11b/c (Microglia) Magnetic MicroBeads (Miltenyi Biotec) and isolated from the rest of the brain via the Miltenyi QuadroMACS Separator. Microglia were subsequently stained with Iba1 microglia marker. Flow cytometry data were collected via BD FACSCelesta. Animals treated with the MTS3_V1-2-MGS2_V4-2 conjugate exhibited a positive shift in microglia cells (IBA1 Positive) but not other CNS cells (IBA1 negative: FIG. 15).

Figure 16:
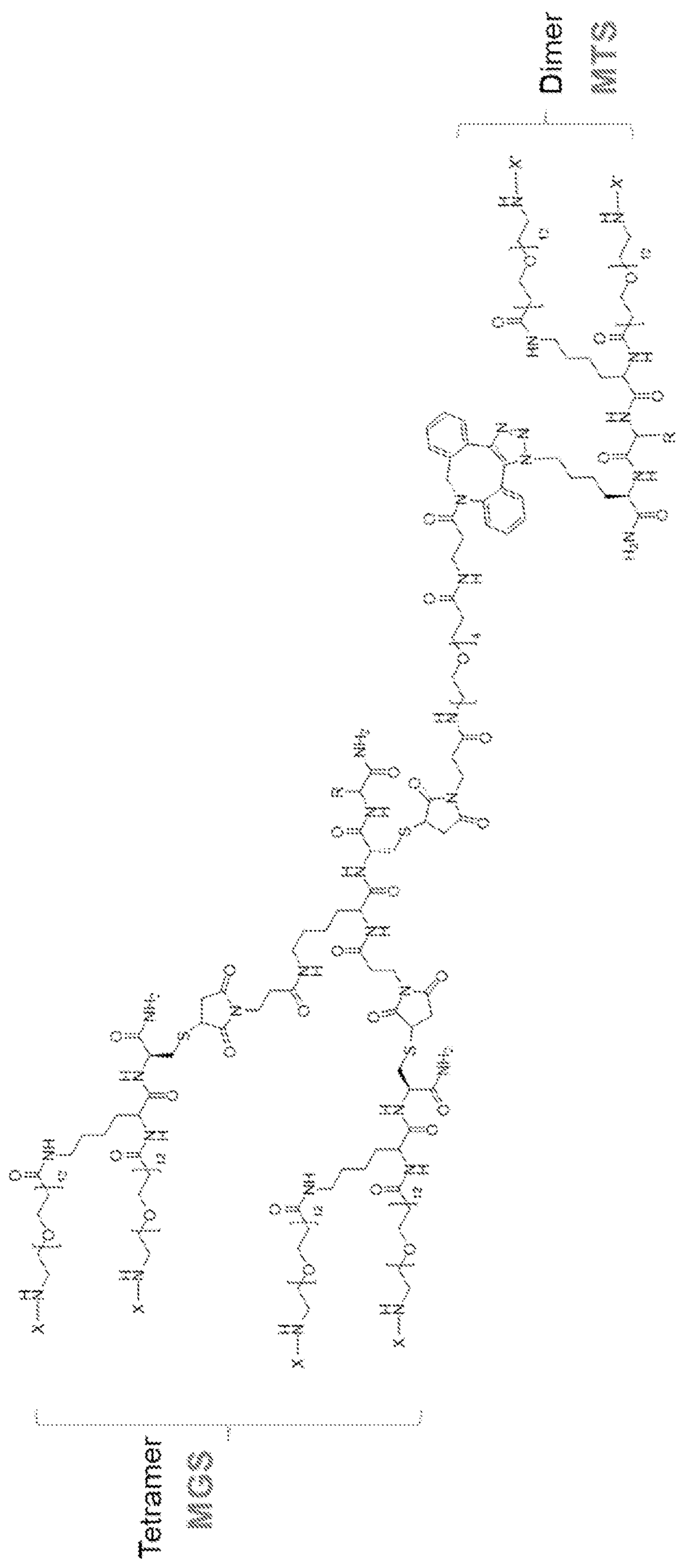
FIG. 16 shows the structure of MTS3_V1-2-MGS2_V4-4 chimera. X=MGS2_V4. X'=MTS3_V1. R=attachment point for dyes, imaging agents, therapeutics, proteins, nucleic acids, other peptides and/or lipids.
Figure 17:
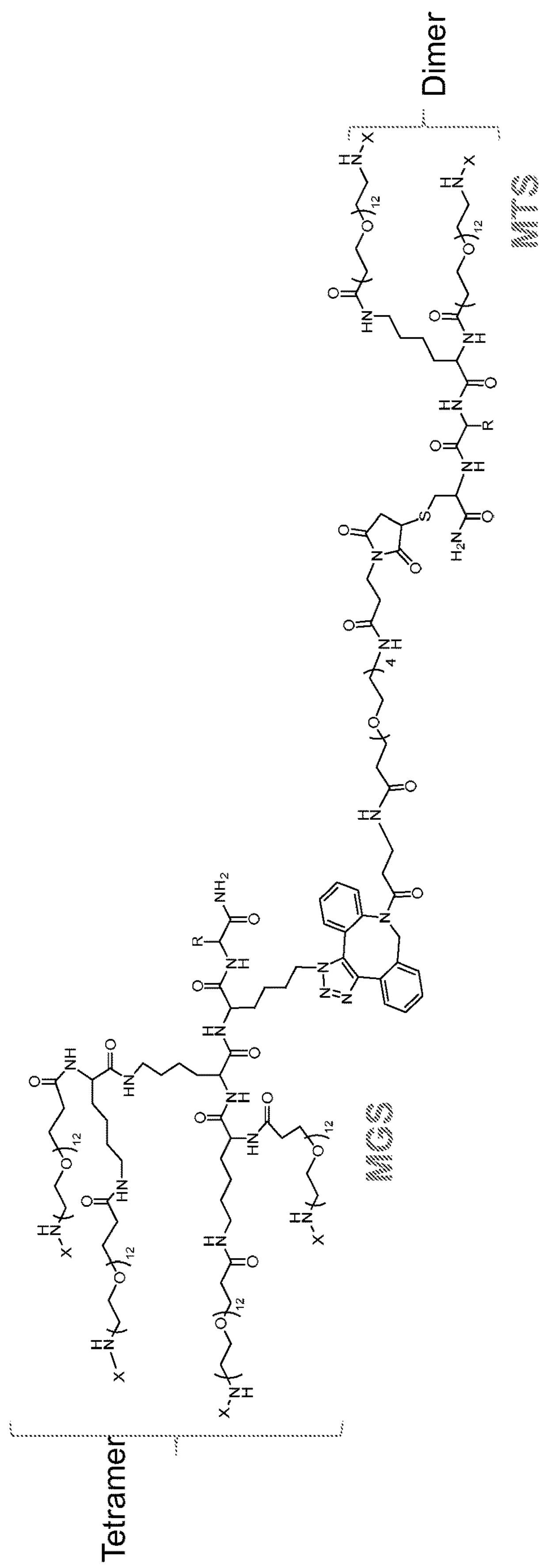
FIG. 17 shows the structure of MTS3_V1-2-MGS2_V4-4 chimera using alternate linkage compared to FIG. 16. X=MGS2_V4. X'=MTS3_V1 or MTS2_V1 or MTS1_V2. R=attachment point for dyes, imaging agents, therapeutics, proteins, nucleic acids, other peptides, carbohydrates and/or lipids.

FIG. 16 shows the structure of MTS3_V1-2-MGS2_V4-4 chimera that was used for the siRNA delivery experiments shown in FIG. 18. FIG. 17 is a similar structure of MTS3_V1-2-MGS2_V4-4 chimera using alternate linkage.

Figures 18A, 18B:
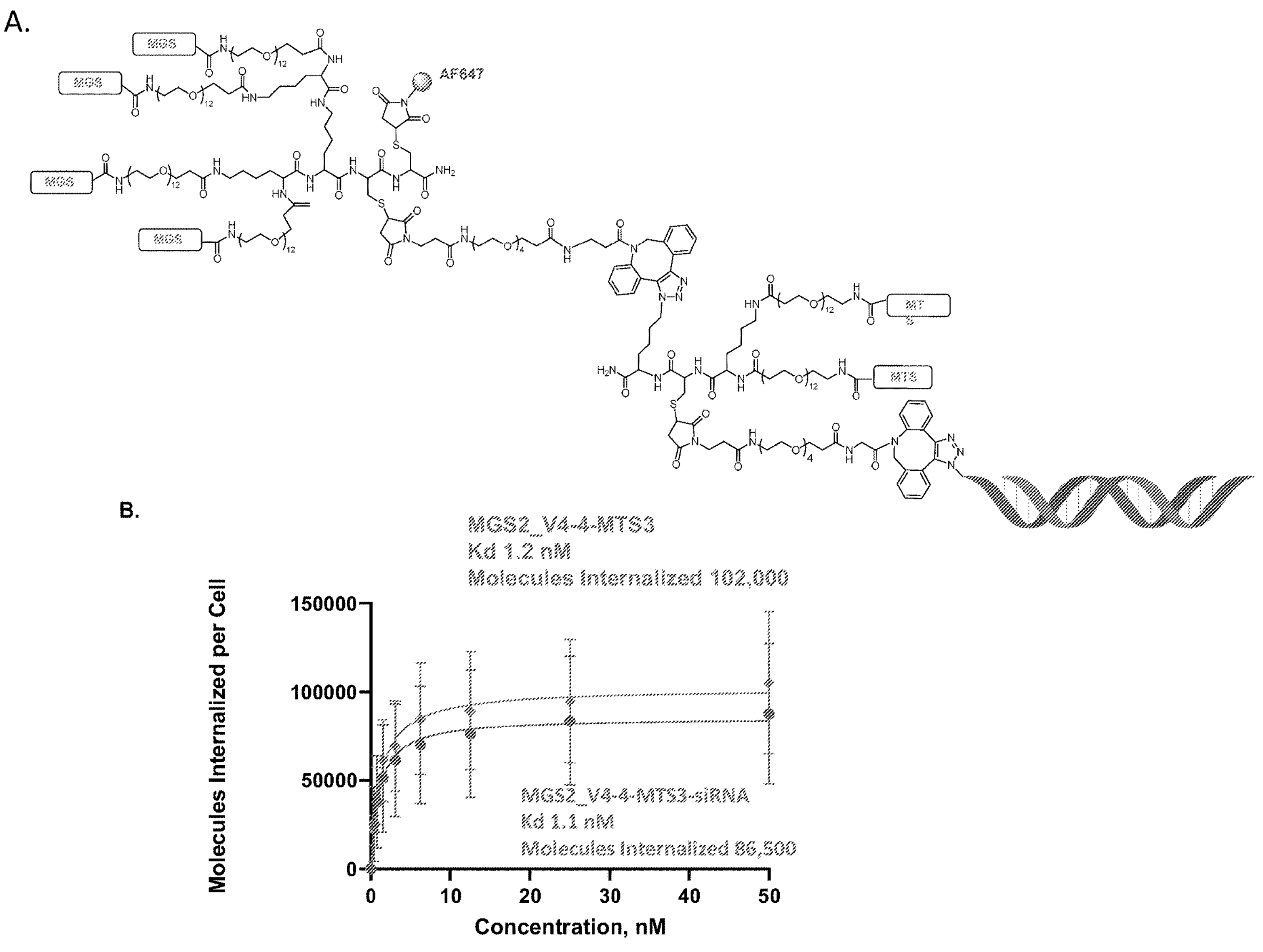
FIGS. 18A and 18B provide an example of siRNA delivery with MGS2-MTS3 chimera in microglia.
Figure 19:
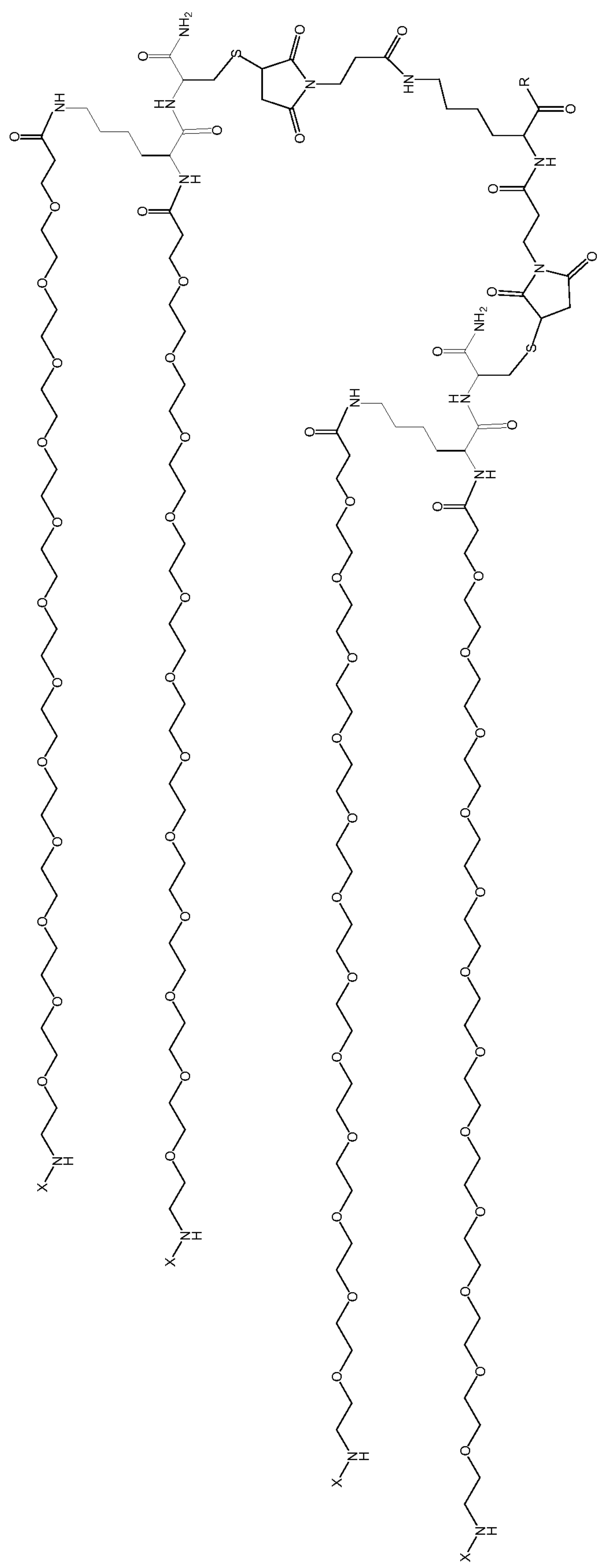
FIG. 19 shows the structure of a tetrameric MGS_NOE3_V2-4 core. X=MGS_NOE3_V2 peptide sequence CH3CO-GFHNVYPYTWGGFSDIDLMADEI (SEQ ID NO: 5). R=attachment point for dyes, imaging agents, therapeutics, proteins, nucleic acids, carbohydrates, lipids, and other peptides

An example of siRNA delivery with MGS2-MTS3 chimera in microglia is shown in FIG. 18. FIG. 18A shows the structure of a chimeric MGS2_V4-4 (tetramer)-MTS3_V1-2 were conjugated to a test siRNA using click chemistry. Surprisingly, conjugation of the siRNA to MGS2_V4-2 (dimer)-MTS3_V1-2 resulted in a loss of binding to the HMC3 cells. However, binding was rescued by using the tetrameric MGS2_V4-4 as the targeting peptide in this multifunctional chimera (shown in panel A). Uptake of MGS2_V4-4-MTS3_V1-2 and MGS2_V4-4-MTS3_V1-2-siRNA are shown in Panel B. There is no significant difference in the EC50 uptake into HMC3 cells indicating that the conjugation of the siRNA does not disrupt the ability of the chimera to internalize into microglial cells. Additionally, the MGS2_V4-4-MTS3_V1-2 displays better affinity and higher uptake than the dimeric MGS2_V4-2-MTS3_V1-2 indicating superiority of the MGS2_V4-4 over MGS2_V4-2 for targeting microglial cells within this context. Unexpectedly, the siRNA conjugate with MGS2_V4-2 (dimer)-MTS3_V1-2 chimera has significantly diminished uptake in microglia cells, however, using the tetrameric MGS2_V4-4 overcomes this problem FIG. 19 shows the structure of a tetrameric MGS_NOE3_V2-4 core used for FIGS. 20-24 showing neuronal cell targeting.

Figure 20:
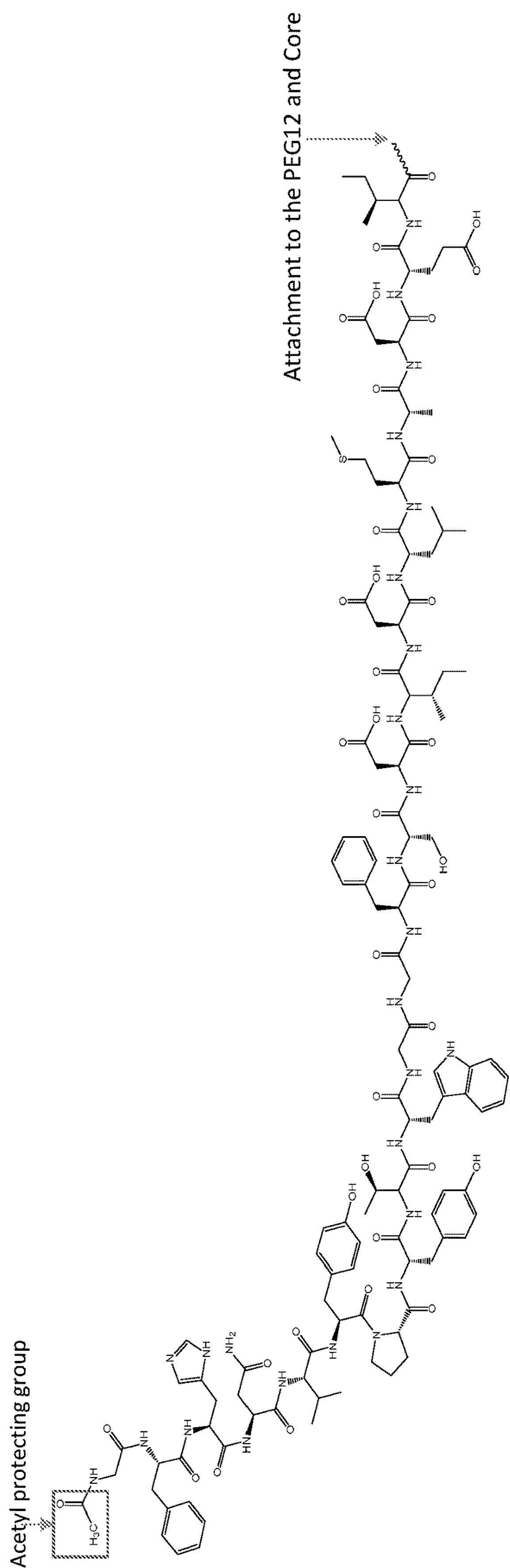
FIG. 20 shows the structure of MGS_NOE3_V2 peptide sequence. The sequence is CH3-CO-GFHNVYPY-TWGGFSDIDLMADEI (SEQ ID NO:5).

FIG. 20 shows the structure of MGS_NOE3_V2 peptide sequence. The sequence is CH3-CO-GFHNVYPYTWGGFSDIDLMADEI. MGS_NOE3_V1 peptide is the same sequence but does not containing the N-terminal protecting group. Thus, the structure of FIG. 20 replaces X in the structure of FIG. 19.

Figures 21A, 21B, 21C:
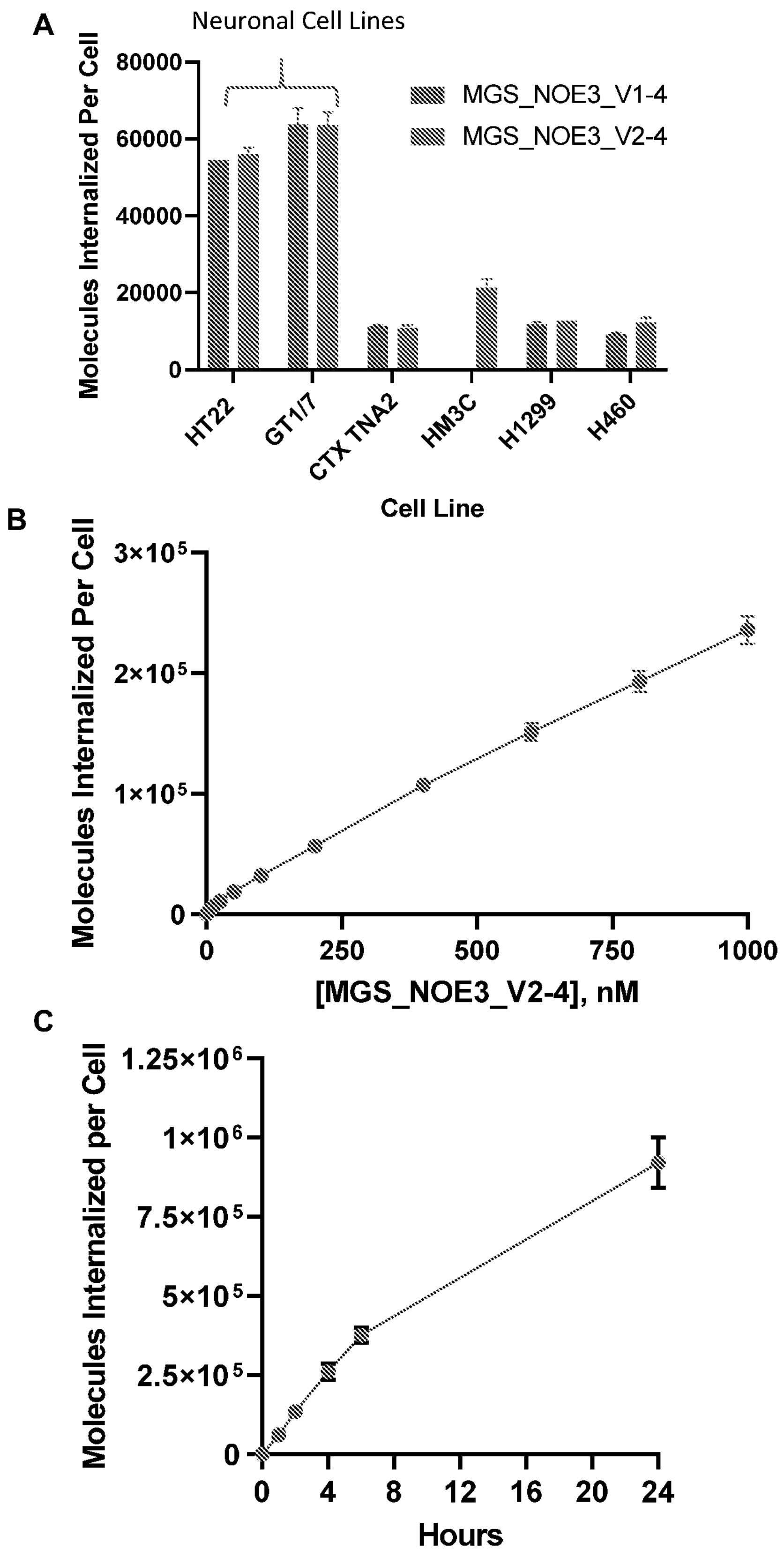
FIGS. 21A-21C show that tetrameric MGS_NOE3_V2-4 is specific for neuronal cells and facilitates high levels of cellular uptake.

FIG. 21 shows that tetrameric MGS_NOE3_V2-4 is specific for neuronal cells and facilitates high levels of cellular uptake. Monomeric and Dimeric MGS_NOE3_V2 do not bind. It must be on the tetrameric core to function. FIG. 21A shows the uptake of MGS_NOE3_V1-4 and MGS_NOE3_V2-4 were incubated at 200 nM with indicated cell lines for 1 h. The number of molecules of peptide internalized per cell was determined by a quantitative flow cytometry assay. Uptake is significantly higher in the two neuronal cell lines, HT22 (mouse hippocampal neuronal cell line) and GT1/7 (mouse hypothalamic neuronal line) than CTX TNA2 (rat astrocytes from frontal cortex), HMC3 (human microglial cell line), H1299 and H460 (both human non-small cell lung cancer cell lines). MGS_NOE3_V1-4 and MGS_NOE3_V2-4 display a 5-6-fold specificity for neurons over astrocytes and 3-fold specificity compared to microglia. FIG. 21B shows the uptake MGS_NOE3_V2-4 into HT22 cells increases with increasing concentration. Incubations were performed for 1 h at 37° C. Uptake was also assessed for the monomeric (MGS_NOE3_V2-1) and dimeric (MGS_NOE3_V2-2) versions, and no uptake was observed on HT22 cells indicating that the MGS_NOE_V2 must be on a tetrameric core in order to induce binding and uptake into neurons. FIG. 21C shows the uptake of MGS_NOE3_V2-4 increases over time. HT22 cells were incubated with 200 nM MGS_NOE3_V2-4 at 37° C. for indicated time point. Uptake was determined by flow cytometry assay.

Figure 22:
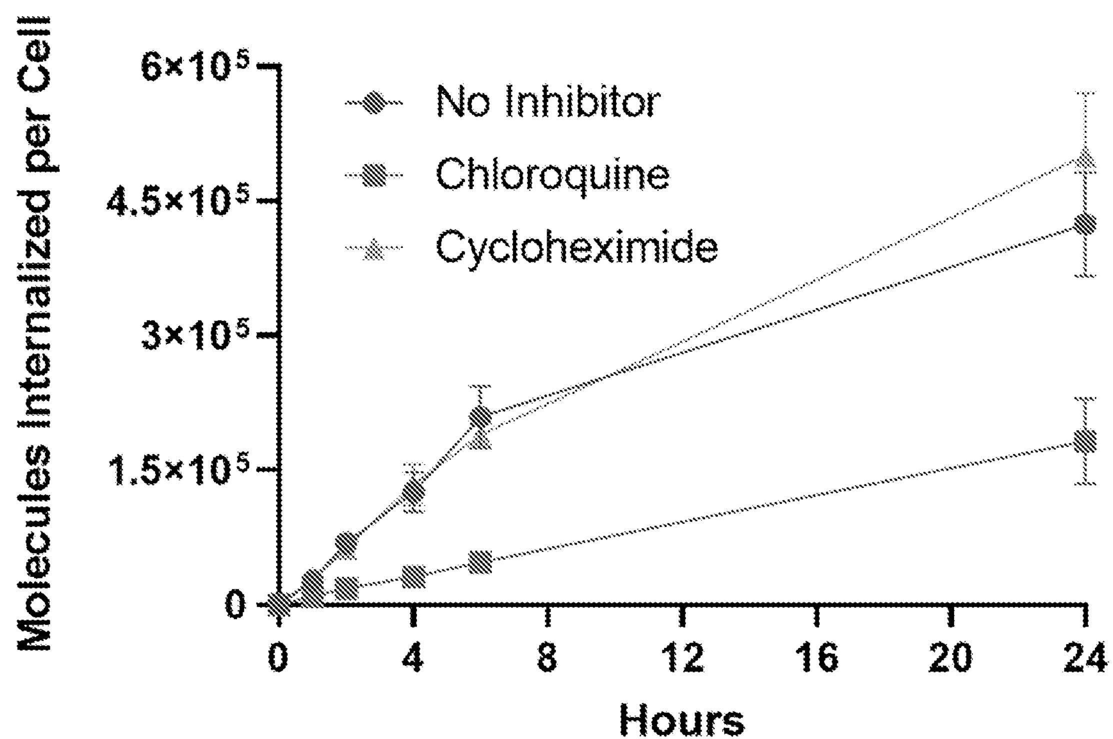
FIG. 22 shows the cellular receptor for NOE_NOE3_V2-4 is recycled. Chloroquine: Inhibits receptor recycling: Cycloheximide: Inhibits new protein synthesis.

The cellular receptor for MGS_NOE3_V2-4 is recycled (FIG. 22). HT-22 cells were incubated with culture medium containing 100 nM MGS_NOE3_V2-4 in the presence of 100 μM chloroquine or 250 μM cycloheximide for the indicated times. The cellular uptake was analyzed by flow cytometry. Cycloheximide, which inhibits new protein synthesis, has no impact on MGS_NOE3_V2-4 uptake indicating that new protein synthesis is not required for continual uptake. However, chloroquine, an inhibitor of endosomal acidification and trafficking, greatly reduces uptake starting at 1 h incubation and continues to suppress internalization of the MGS to 24 h. New protein synthesis is not required for continued uptake of MGS_NOE3_V2-4. Endosomal acidification is required for continued uptake of MGS_NOE3_V2-4. MGS_NOE3_V2-4 uptake continues with time. Taken together, the data indicates that the cellular receptor for MGS_NOE3_V2-4 is internalized and then recycled back to the cell surface where it can repeat the internalization of more MGS_NOE3_V2-4.

Figures 23A, 23B, 23C:
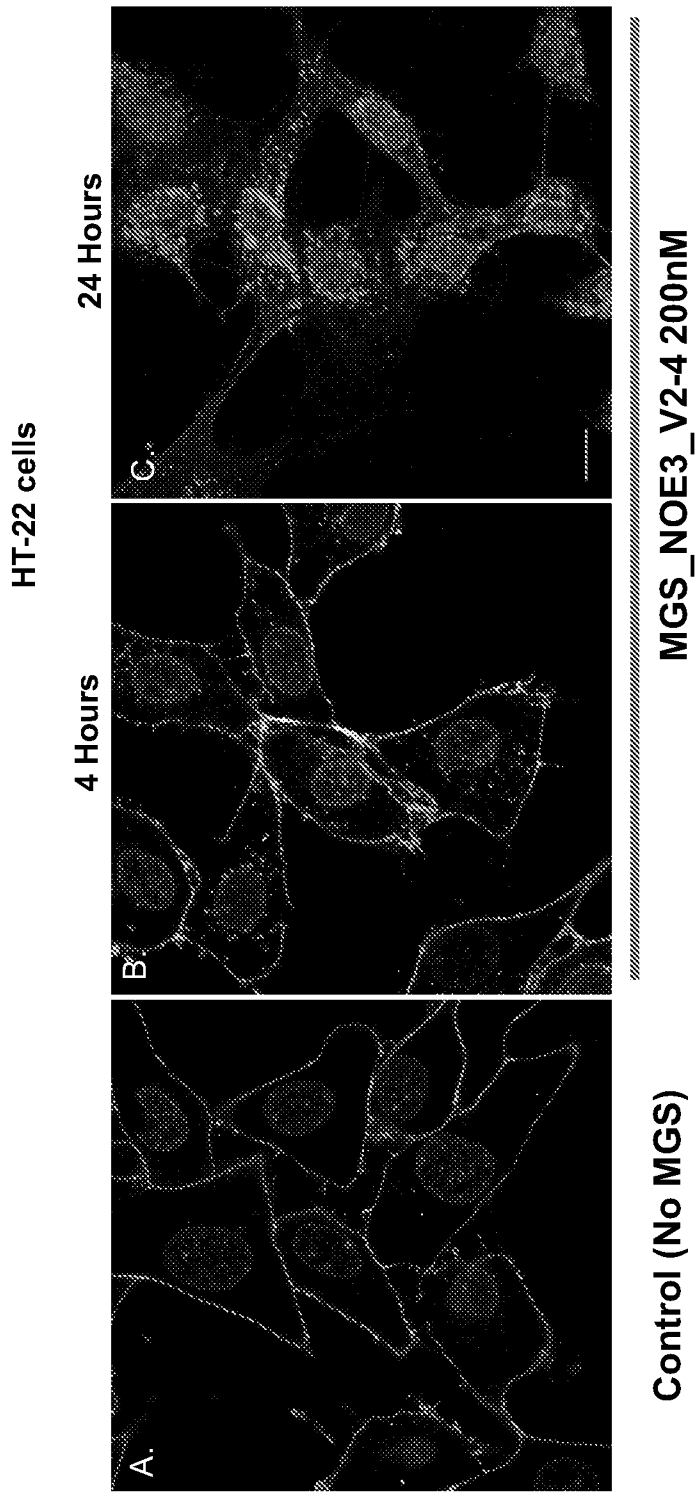
FIGS. 23A-23C show MGS_NOE3_V2-4 is internalized into neuronal cells. The scale bar represents 10 μm.

MGS_NOE3_V2-4 is internalized into neuronal cells (FIG. 23). HT22 cells were incubated with 200 nM of MGS_NOE3_V2-4-streptavidin-AlexaFluor 647 conjugate at 200 nM for the indicated time at 37° C. AlexaFluor488 conjugated wheat germ agglutinin was used to label the cell membrane and Hoechst 33342 was used to stain the nucleus. Live cell imaging was performed, and representative images are shown. Red punctate staining within the cell is observed at 4 h (FIG. 23B) and continues to increase with time (FIG. 23C). A Control sample containing streptavidin 647 but no MGS_NOE3_V2-4 is shown in Panel A. The lack of red staining indicates that MGS_NOE3_V2-4 mediates cellular uptake. Red staining located within the cell perimeter (green stain) indicates cellular internalization of MGS_NOE3_V2-4.

Figures 24A, 24B, 24C:
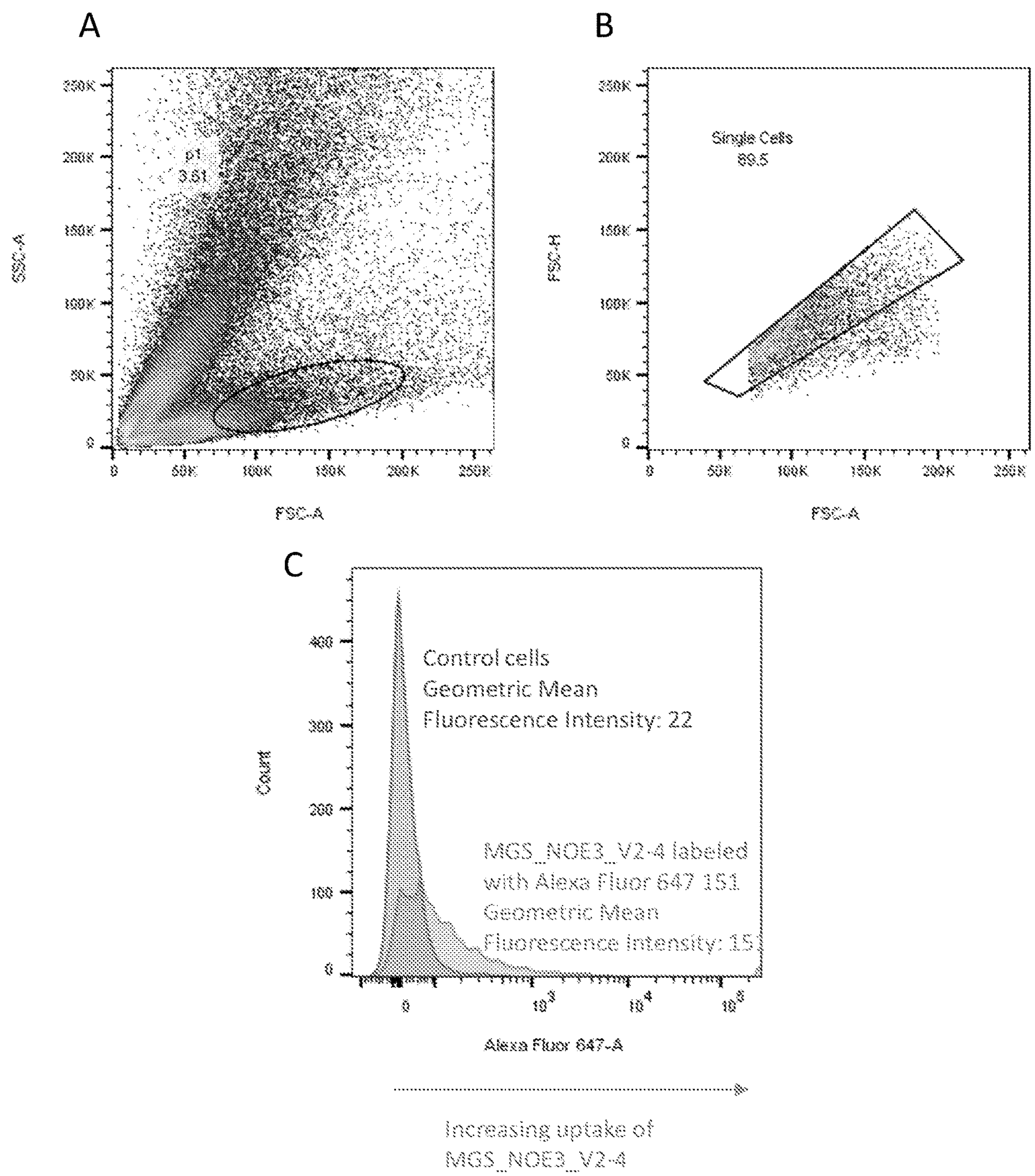
FIGS. 24A-24C show that MGS_NOE3-V2-4 is associated with cells in the CNS after intrathecal injection. (A) Gating strategy for total brain cells vs debris. (B) Gating strategy excluding cell doublets.

FIGS. 24A-24C show that MGS_NOE3-V2-4 is associated with cells in the CNS after intrathecal injection. MGS_NOE3-V2-4 was labeled with Alexa Fluor 647 and injected intrathecally in a C57BL/6 mouse. After the peptide circulated for 1 hr, the animal was euthanized, and the brain tissue was harvested. The whole brain was subsequently dissociated using the Miltenyi Biotec gentleMACS Octo Dissociator. The number of MGS_NOE3_V2-4 molecules internalized into brain cells were analyzed by flow cytometry (BD FACSCelesta).

Figure 25:
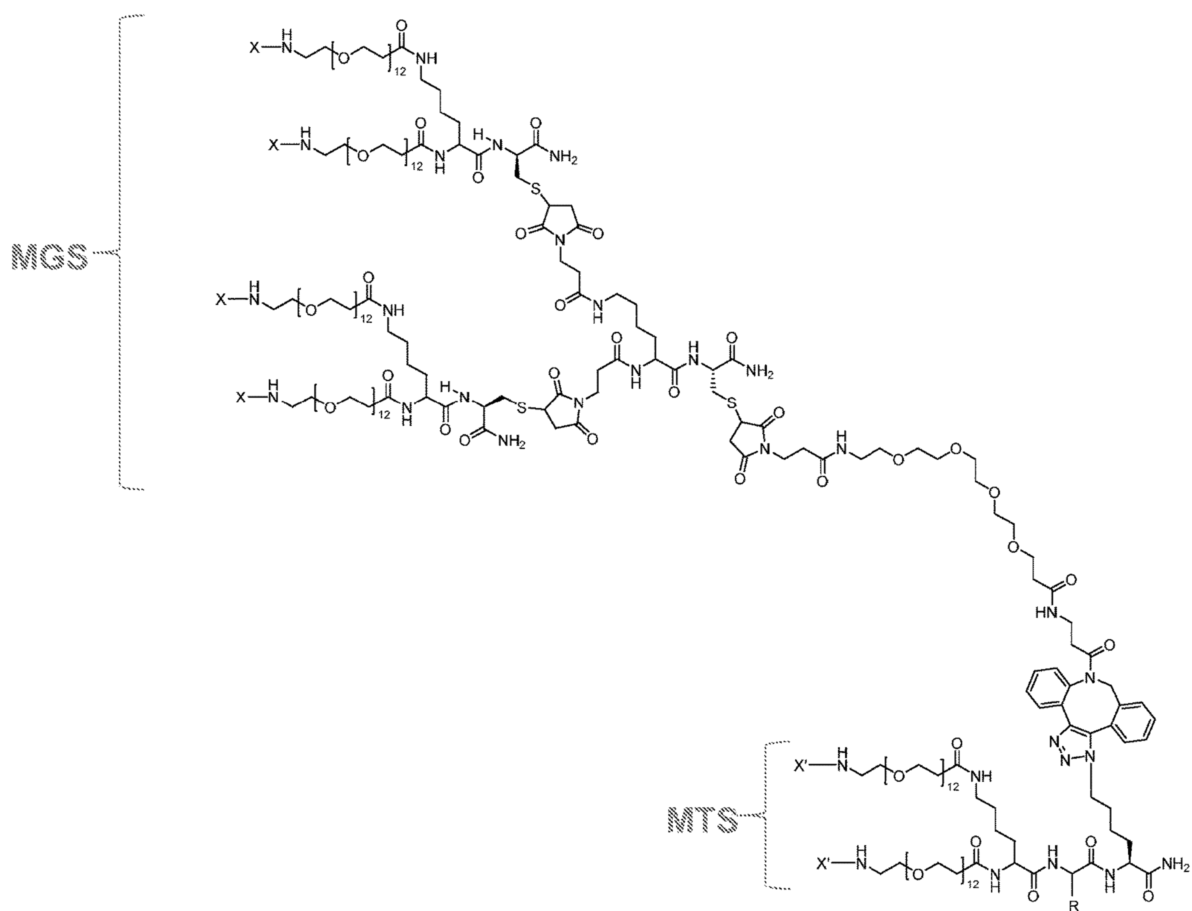
FIG. 25 shows the structure of MTS3_V1-2-MGS_NOE3_V2-4 chimera. X=MGS_NOE3_V2. X'=MTS3_V1. R=attachment point for dyes, imaging agents, therapeutics, proteins, nucleic acids, other peptides and/or lipids.

FIG. 25 shows MTS3_V1-2-MGS_NOE3_V2-4 chimera used for the experiments shown in FIGS. 26 and 27.

Figures 26A, 26B, 26C:
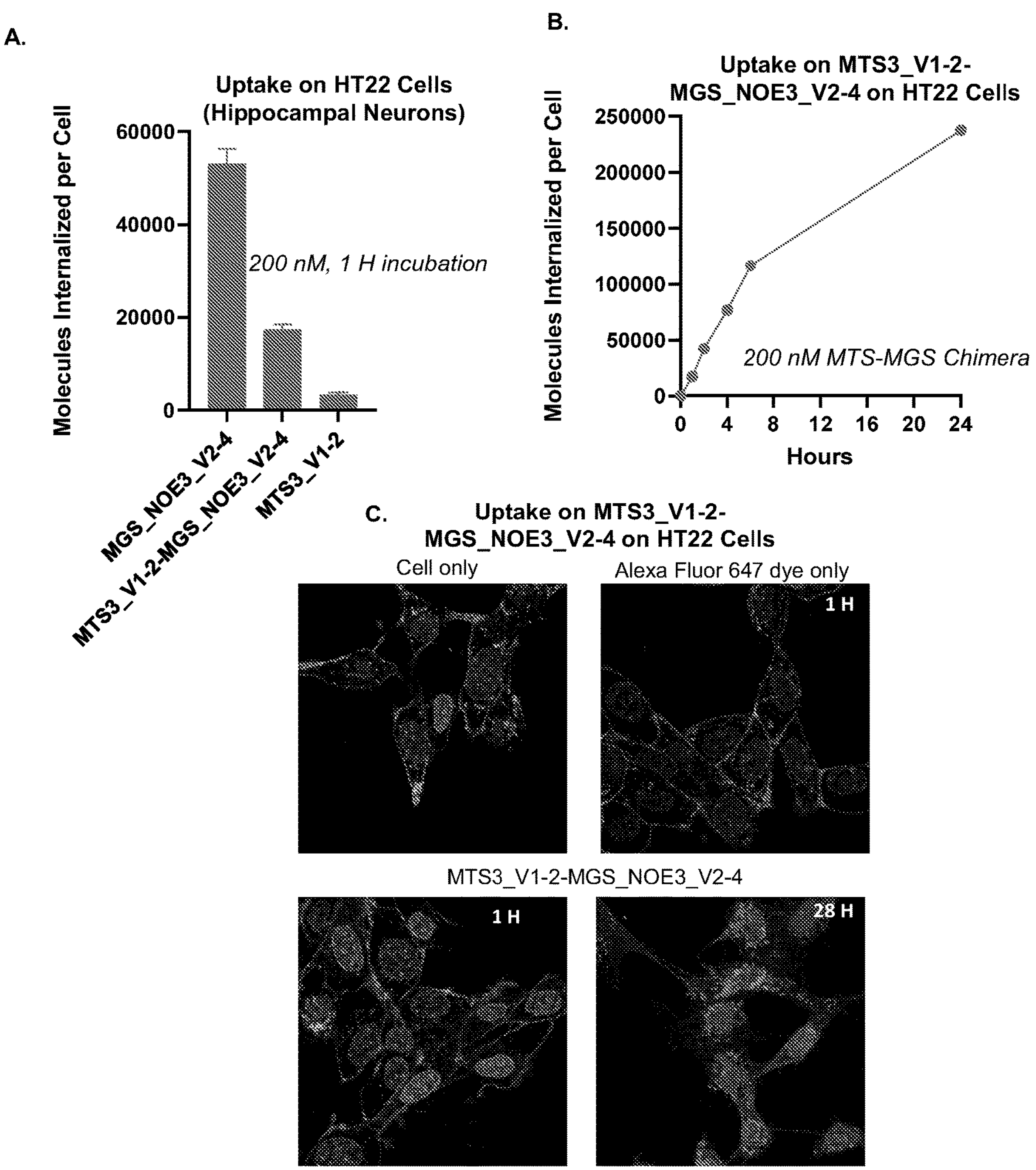
FIGS. 26A-26C show that MTS3_V1-2-MGS_NOE3_V2-4 chimera is internalized into HT22 neuronal cells.
Figures 28A, 28B, 28C, 28D, 28E:
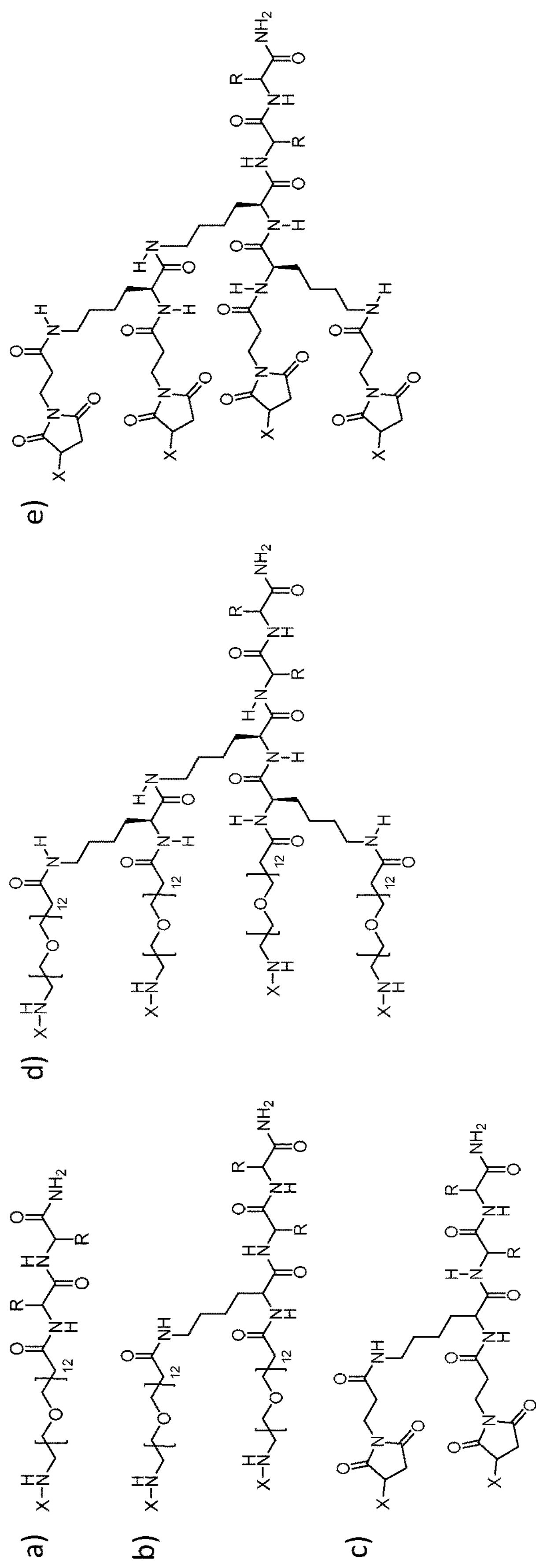
FIGS. 28A-28E show examples of core architectures with PEG linkers. a) Monomeric core with PEG linker. b) Dimeric core with PEG linker. c) Dimeric core with maleimide. d) Tetrameric core with PEG linker. e) Tetrameric core with maleimide. R=attachment point for dyes, imaging agents, therapeutics, proteins, nucleic acids, other peptides, carbohydrates and/or lipids. X=any MGS, MTS, MGS or MTS with attached core, and/or linkers.

FIGS. 26A-C shows that MTS3_V1-2-MGS_NOE3_V2-4 chimera is internalized into HT22 neuronal cells. Punctate staining within the cell is observed at 1 h and continues to increase with time. FIG. 26A Control sample containing Alexa Fluor 647 but no MGS_NOE3_V2-4 is shown as well as HT22 cells alone. The dual target chimera, MTS3 V1-2-MGS_NOE3_V2-4 is internalized into HT22 cells at witnessed by staining within the boundaries of the cell membrane (bottom right of FIG. 26C). Uptake of the dual target chimera, MTS3_V1-2-MGS_NOE3_V2-4 is reduced by a factor of 3 compared to MGS_NOE3_V2-4 alone but is still significant. Uptake of the dual target chimera, MTS3_V1-2-MGS_NOE3_V2-4 continues over time reaching almost 250,000 molecules/cell (≈250) nM) at 24 h. Taken together, these data show that the MTS3_V1-2-MGS_NOE3_V2-4 chimera retains its ability to internalize into neuronal cells, reaching intracellular levels of ≈250 nM at 24 h, and this uptake is driven by the MGS_NOE3_V2-4 component of the chimera.

FIG. 27 shows MTS2_V1-2 binds to the transferrin receptor to gain access to the CNS while MTS3_V1-2 utilizes a novel but yet identified cellular receptor for transport. Recombinant human transferrin receptor was absorbed onto high binding ELISA plates at 1 μg/mL. Biotinylated MTS2_V1-2 or MTS3_V1-2 were incubated at varying concentrations for 1 h after which the samples were removed and the plated washed to remove excess peptide. Retained MTS peptide was detected using streptavidin-HRP and TMB reagent. The absorbance was measured at 450 nm and is proportional to the amount of MTS peptide captured by transferrin receptor. As shown, MTS2_V1-2 binds to human transferrin in a concentration dependent manner which saturates at higher concentrations. By comparison, MTS3_V1-2 and a scrambled control peptide of MTS2_V1-2 show no binding. The binding affinity of MTS2_V1-2 for transferrin receptor was determined by biolayer interferometry on a OctetRED 96 system. The biotinylated MTS2_V1-2 peptide was captured on streptavidin probe. The kon and koff rate were determined at various concentrations of human or mouse transferrin receptor allowing for determination of the dissociation constant. The Kd for MTS2_V1-2 binding to transferrin receptor is 210 nM for the human protein and 12 nM for the mouse receptor. Taken together, these data support that transferrin receptor is the target for MTS2_V1-2. The receptor for MTS3_V1-2 remains unknown, but the data indicate that it is not transferrin receptor, and this peptide likely accesses the CNS via a different mechanism than MTS2_V1-2.

1. Material and Methods i. General Method To Quantify Peptide Internalization in Cells.

Cells were incubated with the desired peptide (MGS, MTS or MGS-MTS conjugate) that was labeled with Alexa Fluor 647 at 37° C. in complete media. Peptide concentration and incubation time as well as cell line used is indicated in each figure. The peptide was removed, and the cells were washed 3× with PBS (137 mM NaCl, 2.7 mM KCl, 10 mM Na2HPO4, 1.8 mM KH2PO4, pH 7.4), 2× with 0.1 M HCl-glycine pH2.2 in 0.9% NaCl, and 1× PBS rinse. Cells were removed by trypsinization. Flow cytometry was performed on a BD FACSCelesta, and data were analyzed using FlowJo_v10.8. Cells were gated based on the forward and side scatter to include only viable cells and a minimum of 10,000 events were counted. For absolute peptide uptake per cell, a standard curve was generated using Quantum™ Alexa Fluor 647 microspheres. MFI was determined at 50% at peak height. Molecules internalized per cell were determined by the standard curve relating MESF to MFI and divided by the number dye molecules/MGS conjugate. GraphPad Prism® was used for non-linear regression curve fitting to calculate an EC50.

For experiments to determine if the cellular receptor is recycled, cells were treated with peptide in the presence of 100 μM chloroquine or 250 μM cycloheximide. At the indicated time points, the cells were washed and analyzed as described above.

ii. CNS Cell Lines Used for Uptake Studies

All cell lines were maintained according to the manufacture's protocols and media supplies.

| Cell Line | Cell Type | Vendor |
|---|---|---|
| HT22 | Mouse hippocampal neuronal cells | Sigma-Aldrich |
| GT1/7 | Mouse hypothalamic GnRH neuronal cell | Sigma-Aldrich |
| HMC3 | Human microglial cells | ATCC |
| CTX TNA2 | Rat astrocyte type 1 | ATCC |
| RN33B | Rat neuronal Schwann cells | ATCC |

HMC3 cells were activated with interferon-gamma (IFN-γ) (10 ng/ml, 24 h). Resting phenotype was characterized by expression of IBA1, and endotoxin receptor CD14, but negative for the astrocyte marker GFAP. Markers of activated microglia, namely MHCII, CD68, and CD11b were negative in resting HMC3 cells but upregulated after activation.

iii. In Vivo MTS and MTS-MGS Targeting Experiments

The MTS peptide directly conjugated to Alexa Fluor 750 dye (1 μg/g body weight) is injected via lateral tail vein into a Sprague-Dawley Rat and allowed to circulate for the indicated time (20 min, 1 h 6 h, 24 h). The animal is anesthetized 10 mins prior to the end of the time point and 2 mL 200× Heparinized Saline is injected intraperitoneally. To collect the CSF, a blunt dissection of the back of the neck is performed to expose the clear dura mater covering the cisterna magna. Using a glass micropipette, CSF is aspirated from the cisterna magna at the indicated time point. Following CSF collection, a transcardial perfusion is performed by flushing with 500 mL ice cold 1× PBS containing heparin to remove any blood from the body. The brain and other tissues are isolated. The brain is homogenized using a Dounce homogenizer in lysis buffer (30 mM Tris-HCl, pH 8.0 0.05% Triton X-100) and the soluble fraction collected. A standard curve using the MTS peptide conjugated to Alexa Fluor 750 is generated to determine the amount of dye in the CSF and brain.

If the brain is to be used for tissue sectioning, the first perfusion is followed by perfusion with 500 mL ice cold 5% paraformaldehyde. Coronal slices of 1 mm thickness are prepared using a brain matrix. The slices are imaged on an Odyssey Imager collecting fluorescent signal at 800 nm.

iv. Confocal Microscopy: In Vitro Cell Analysis

The test cells were seeded in 35 mm confocal microscopy dish 24 hours prior to treatment. The test peptides labeled with Alexa Fluor 647 were incubated on cells in media for the indicated time at 37° C. After incubation, the cells were washed 3 times with PBS, 2 times with 0.1 M HCl-glycine pH 2.2 in 0.9% NaCl and 1 time with PBS. Alexa Fluor 488 conjugated wheat germ agglutinin was used to label the cell membrane and Hoechst 33342 was used to stain the nucleus. Microscopy was acquired on a Zeiss LSM 700 with a Pln Apo 63×/1.4 oil DIC III objective. Images were processed using Zen software.

For peptides that were biotinylated instead of direct labeling with Alexa Fluor 647, the peptide-SA-AF647 conjugate was prepared by mixing Alexa Fluor™ 647 conjugated streptavidin and biotinylated peptide with an equal molecular ratio in 100 μl PBS for 30 minutes at room temperature. After conjugation, 900 μl culture medium containing biotin (600 nM) to saturate all binding sites on streptavidin were added to the mixture. The cell culture medium was then replaced by the peptide containing mixture. The final peptide-SA-AF647 is indicated in each figure. Microscopy was carried out as described above.

v. Confocal Microscopy and Flow Cytometry Analysis for In Vivo Delivery Experiments MTS, MGS, or MTS-MGS labeled with Alexa Fluor 647 were injected into Sprague-Dawley Rats as described above. Following a 2 h circulation time, the animal was euthanized, and the brain was fixed via transcardial perfusion, harvested, cryoprotected, and frozen sectioned in 15 μm sections on a Leica CM1950. Images were taken using a Zeiss LSM 800. Microglia were stained with Iba-1 and cell nuclei were stained with Hoechst 33342.

For flow cytometry assays, the brain was dissociated using the Miltenyi Biotec gentleMACS Octo Dissociator. Whole brain cells were incubated with CD11b/c (Microglia) Magnetic MicroBeads (Miltenyi Biotec) and isolated from the rest of the brain via the Miltenyi QuadroMACS Separator. Microglia were subsequently stained with Iba1 microglia marker. Flow cytometry data were collected via BD FACSCelesta.

Alternatively, all CNS cells were analyzed as a mixture by dissociating the brain using the Miltenyi Biotec gentleMACS Octo Dissociator. No enrichment for a CNS subpopulation was performed and cells were directly analyzed by flow cytometry. Gating was used to eliminate cell debris and cell doublets.

vi. Serum Stability

The concentration of a solution of peptide conjugated with dye (Alexa Fluor 647) was determine by absorbance at 651 nm and ~14 nmol of peptide was lyophilized. The lyophilized peptide powder was dissolved in 400 μL of human serum (Innovative Research, H6430) to achieve a 35 μM solution. The sample was incubated at 37° C. and shaken. For each time point (0, 1, 2, 4, 20 and 24 hours), a 50 μL aliquot was removed from the reaction and 100 μL of absolute ethanol was added to precipitate serum proteins. Samples were incubated on ice for 15 mins before being centrifuged at 12,000 rpm for 5 mins. Subsequently, 50 μL of supernatant was removed and diluted in 150 μL of PBS. Finally, 100 μL of each sample were analyzed by analysis RP-HPLC.

B. Example 2: Reaction Schemes

FIGS. 28-32 show examples of different reaction schemes used to make the disclosed peptides and compositions.

Preparation of Resins for Dimeric Core: To synthesize 25 μmole of peptide (MGS2_V4-2), 80 mg of Rink Amide MBHA resin (Gyros Protein Technology, capacity of 0.31 mmol/g) was weighed into a 45 mL reaction vessel and transferred to a peptide synthesizer (PurePep Chorus, Gyros Protein Technology) for automated synthesis. The resin was swelled in 6 mL mixture of 1:1 N, N-Dimethylformamide (DMF, Fisher)/Dichloromethane (DCM, Fisher) for 30 min then drained.

Preparation of Resins for Tetramer Core: To synthesize 12.5 μmole of peptide (MGS2_V4-4), 40 mg of Rink Amide MBHA resin (Gyros Protein Technology, capacity of 0.31 mmol/g) was weighed into a 45 mL reaction vessel and transferred to a peptide synthesizer (PurePep Chorus, Gyros Protein Technology) for automated synthesis. The resin was swelled in 6 mL mixture of 1:1 N, N-Dimethylformamide (DMF, Fisher)/Dichloromethane (DCM, Fisher) for 30 min then drained.

Manual Addition of Modified Amino Acid: Manual coupling cocktail (relative to resin) generally contained 4.4 eq. of HCTU (Gyros Protein Technology), 10 eq. of N-Methylmorpholine (NMM, Gyros Protein Technology), 5 eq. of Oxyma pure (Gyros Protein Technology), and 5 eq. of modified amino acid, These included but were not limited to, Fmoc-S-tert-butylthio-L-Cysteine (CHEM-IMPEX INT'L INC), N α-Fmoc-N ε-Azide-L-Lysine (CHEM-IMPEX INT'L INC), and Fmoc-Lys (palmitoyl-Glu-OtBu)-OH (BACHEM), dissolved in 1 mL of DMF. Following a 1 h coupling, peptide resin was washed which consisting of two 3 mL washes of DMF, two 3 mL washes of DCM, and thee 3 mL washes of DMF each mixed for 20 sec.

Manual Addition of Linker: Manual coupling cocktail contained 16 eq. of N,N'-Diisopropylcarbodiimide (DIC-Gyros Protein Technology), 16 eq. of N-Methylmorpholine (NMM, Gyros Protein Technology), 8 eq. of Fmoc-amino PEG propionic acid (Polypure), and 8 eq. of Oxyma pure (Gyros Protein Technology) dissolved in 1 mL of DMF. Following a 2 h coupling, peptide resin was washed again (as described above).

Manual Addition of Maleimido-propionic acid: Manual coupling cocktail contained 16 eq. of N,N'-Di-isopropylcarbodiimide (DIC-Gyros Protein Technology), 16 eq. of N-Methylmorpholine (NMM, Gyros Protein Technology), 8 eq. of 3-Maleimido-propionic acid (Polypure), and 8 eq. of Oxyma pure (Gyros Protein Technology) dissolved in 1 mL of DMF. Following a 2 h coupling, peptide resin was washed again (as described above).

Automatic Peptide Synthesis: Peptides (MGS2_V4-2 and MGS2_V4-4) were synthesized on PurePep Chorus using Fmoc solid-phase peptide synthesis. Deprotection and coupling steps utilized nitrogen bubbles for mixing. All steps were performed at room temperature.

Deprotection: Deprotection consisted of two consecutive treatments (5 and 10 min) of 2 mL of 20% Piperidine (Sigma Aldrich) in a 0.1 M Oxyma pure (Gyros Protein Technology)/DMF solution. Deprotection was followed by a wash (as described above).

Coupling: Coupling steps contained 1 mL of 0.25M Fmoc-amino acid (Gyros Protein Technology) in 0.25 M Oxyma pure/DMF solution, 0.5 mL of 0.44 M HCTU (Gyros Protein Technology) in DMF, and 0.5 mL of IM N-Methylmorpholine (NMM, Gyros Protein Technology) in DMF. Following consecutive 30 min and 1-hour couplings, peptide resin was washed again (as described above). After completing all coupling steps, peptide resin was deprotected and washed in preparation for N-terminus amine acetylation.

Acetylation: Acetylation of the N-terminal amine consisted of two 20 min treatments with a 2 mL solution of 0.2 ml of acetic anhydride (Fisher), 0.2 mL of NMM, and 1.6 mL of DMF. Acetylation was followed by 4 washes with 3 mL DMF and 8 washes with 3 mL DCM. Peptide resin was then vacuum dried on Prelude for 1 h.

Cleavage: Peptide resin was transferred into a 5 mL filter syringe and cleaved with a 5 mL cleavage cocktail of 92.5% trifluoroacetic acid (TFA, Fisher), 5% triisopropyl silane (Sigma-Aldrich), and 2.5% MQ-water. Cleavage mixture was stirred for 2-3 h and plunged into cold diethyl ether (Fisher) and shaken vigorously, precipitating the peptide. The mixture was centrifugated for 2 min at 2000 rpms at room temperature and the supernatant decanted. Crude peptide pellets were washed twice with fresh diethyl ether, dried in a fume hood, and finished drying in a vacuum desiccator overnight.

Crude Peptide preparation and purification on RP-HPLC: Crude peptide was weighed and dissolved in a solution of 20-40% Acetonitrile (Fisher), 80-60% MQ-Water, and 0.1% TFA. Peptide solution was vortexed, sonicated, and stirred for ~1 hour. Once dissolved, the peptide solution was filtered through a 0.2 mm filter syringe in preparation for RP-HPLC and analysis. Peptide purification was performed using a Waters Prep LC 2767 system with 0.1% TFA in MQ-Water (Buffer A) and 0.1% TFA in Acetonitrile (Buffer B) as mobile phases. Each injection was run through a Phenomenex Jupiter 5 mm C4 300 Å column (200×212 mm) at a flow rate of 10 mL/min using a 20-70% Buffer B profile (0)-3 min 20%, 3-25 min 20-70%, 25-30 min 90%, 30-35 min 20%) at room temperature. Fractions were collected and analyzed by analytical RP-HPLC and ESI-MS to assess purity, and lyophilized.

Conjugation between a maleimide core and peptide (MGS or MTS): Lyophilized maleimide core was weighed and dissolved in 3M GuHCl/PBS. Subsequently, lyophilized MGS/MTS peptide was separately dissolved in 3M GuHCL/PBS and the pH of that solution was determined and adjusted (if necessary) to ~7. The solutions were combined creating a 1.0:2.2 mole eq. of maleimide-core to peptide. The reaction was stirred for ~3 hr before being purified on preparative RP-HPLC (Agilent 1260). Peptide products were collected, characterized by analytical RP-HPLC and ESI-MS, and then lyophilized (FIG. 29).

Figure 30:
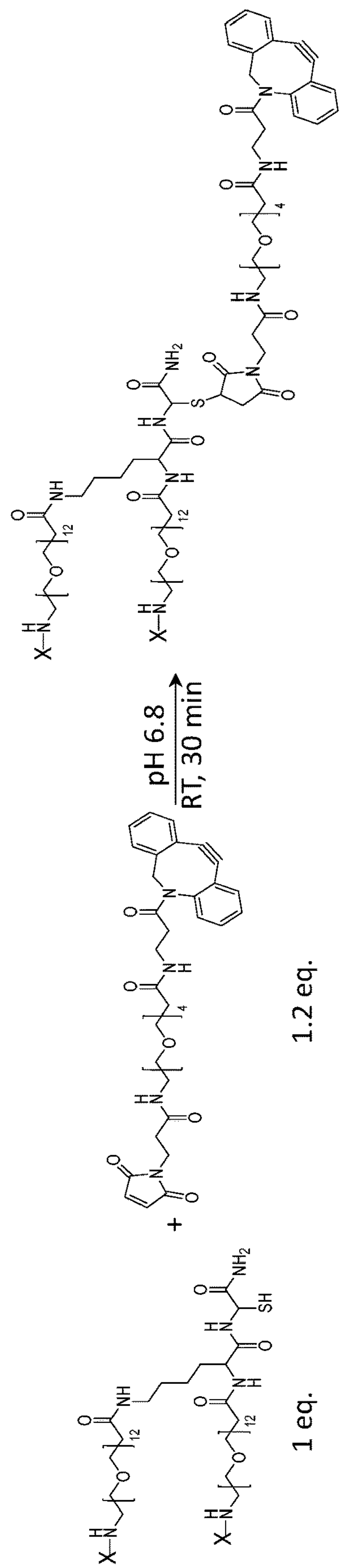
FIG. 30 shows a schematic of the addition of 1.2 eq. of maleimide-PEG4-DBCO to 1 eq. of peptide (any core architecture (dimeric is shown)). X=MGS or MTS.

Addition of DBCO: Lyophilized peptide was dissolved in a 3M Guanidinium chloride (GuHCl, Sigma-Aldrich) PBS solution. The pH of the solution was determined and adjusted (if necessary) to ~6.8. Subsequently, a 1.2 equivalent amount of maleimide-PEG4-DBCO (Sigma-Aldrich), also dissolved in a 3M GuHCl/PBS solution, was added to the peptide solution. The reaction was stirred for 30 mins before being purified on preparative RP-HPLC (Agilent 1260). Peptide products were collected, characterized by analytical RP-HPLC and ESI-MS, and then lyophilized (FIG. 30).

Figure 31:
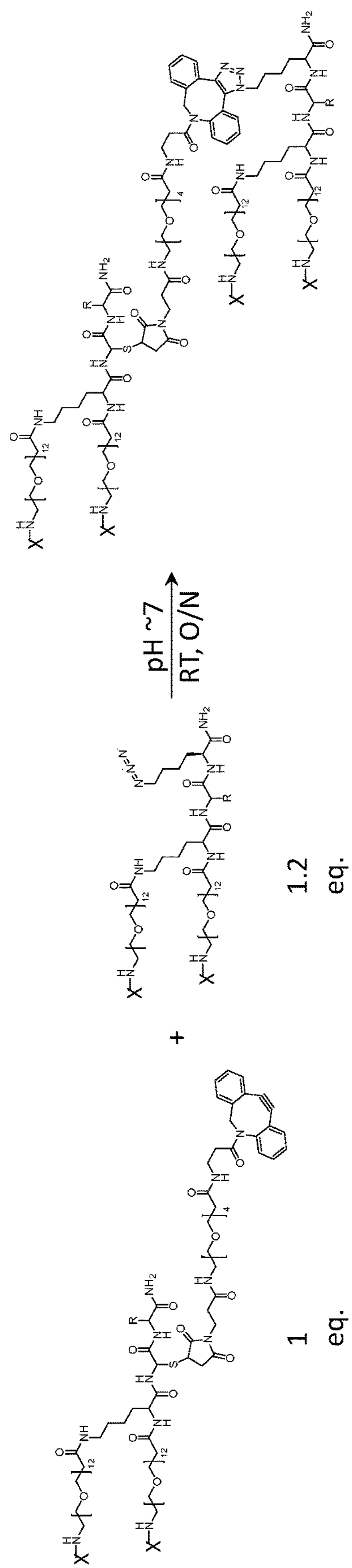
FIG. 31 shows an example of chimeric peptide synthesis between 1 eq. of peptide (any core architecture (dimeric is shown)) with attached DBCO and 1.2 eq. of peptide (any core architecture (dimeric is shown)) with a modified lysine in the core. X=MGS or MTS. R=attachment point for dyes, imaging agents, therapeutics, proteins, nucleic acids, carbohydrates, other peptides and/or lipids.

Chimeric peptide synthesis: Lyophilized peptide (MGS or MTS) with attached DBCO and peptide (MGS or MTS) with N α-Fmoc-N ε-Azide-L-Lysine incorporated in its core were weighed and separately dissolved in 3M GuHCl/PBS. The pH of each solution was determined and adjusted (if necessary) to ~7. The solutions were combined creating a 1:1.2 mole eq. of peptide with attached DBCO to peptide with N α-Fmoc-N ε-Azide-L-Lysine. The reaction was stirred overnight before being purified on preparative RP-HPLC (Agilent 1260). Peptide products were collected, characterized by analytical RP-HPLC and ESI-MS, and then lyophilized (FIG. 31).

Figure 32:
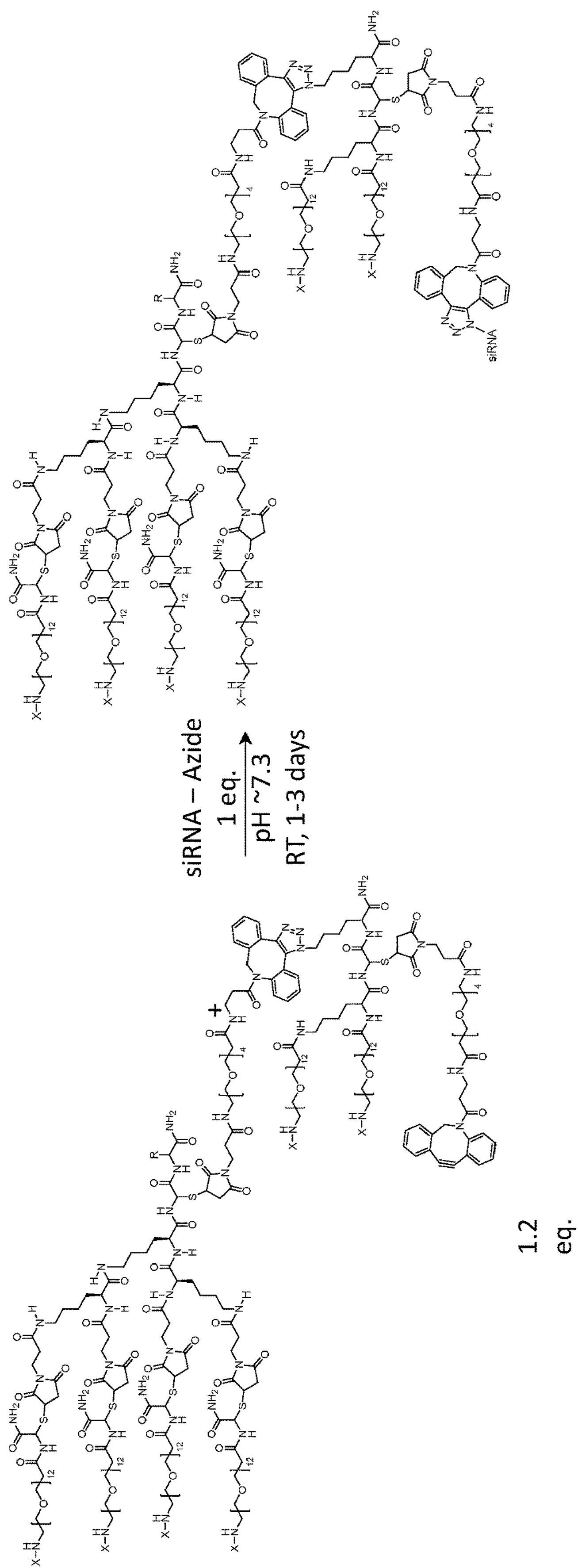
FIG. 32 shows an example conjugation between 1.2 eq. of chimeric peptide (comprised of any core architectures (tetrameric/dimeric chimera is shown)) with a free DBCO and 1 eq. of siRNA with a free Azide. X=MGS or MTS.

Conjugation of siRNA to a Chimeric peptide: Chimeric peptide (comprised of any core architectures) with a free DBCO was dissolved in nuclease-free PBS (NF-PBS) and its pH was determined and adjusted (if necessary) to ~7. Subsequently, siRNA, with an Azide incorporated at either the 5' or 3' end, was dissolved in NF-PBS and its concentration was determined by measuring absorbance at 260 nm. The solutions were combined creating a 1:1.2 mole eq. of siRNA to peptide. The reaction was stirred for 3-7 days before being purified on analysis RP-HPLC (Agilent 1220). Fractions were collected, combined, and characterized by analytical RP-HPLC, and then lyophilized (FIG. 32).

Those skilled in the art will recognize or be able to ascertain using no more than routine experimentation, many equivalents to the specific embodiments of the method and compositions described herein. Such equivalents are intended to be encompassed by the following claims.

We claim:

1. A peptide comprising the amino acid sequence consisting of:

(SEQ ID NO: 1)
GFHNVYPYTWGGFSDIDLMADEI;

(SEQ ID NO: 2)
EQRWVQMLHLQTRYAGEWPG;
or (SEQ ID NO: 3)
FQHNPFPYTYSMEDTDVEIK, wherein the peptide targets central nervous system (CNS) cells.

2. The peptide of claim 1, wherein the peptide has an N-terminal protection group.

3. The peptide of claim 2, wherein the N-terminal protection group is an acetyl group.

4. The peptide of claim 1, wherein the peptide further comprises a linker.

5. The peptide of claim 4, wherein the linker comprises a polyethylene glycol (PEG) linker, an alkyl linker, a maleimide linker, a peptide linker, an amide linker, an aryl linker, a dibenzocyclooctyne linker, an azide linker, a triazole linker, dibenzoazacyclooctyne, a 8,9-dihydro-1H-dibenzo[1,2,3]triazolo [4,45-d]azocine or a combination thereof.

6. The peptide of claim 5, wherein the PEG linker is PEG12 or PEG24.

7. A composition comprising:

a Molecular Guide System (MGS) peptide comprising the amino acid sequence of (SEQ ID NO: 1)
GFHNVYPYTWGGFSDIDLMADEI, (SEQ ID NO: 2)
EQRWVQMLHLQTRYAGEWPG,
or (SEQ ID NO: 3)
FQHNPFPYTYSMEDTDVEIK;

a first linker comprising (i) at least one reactive group capable of binding a C-terminus of the MGS peptide, and (ii) at least one additional reactive group capable of chemically reacting with a moiety;a second linker;

a third linker comprising (i) at least one reactive group capable of binding a C-terminus of a Molecular Transport System (MTS) peptide, and (ii) at least one additional reactive group capable of chemically reacting with a moiety; and the MTS peptide comprising the amino acid sequence of (SEQ ID NO: 9)
DAYKLQTSLDWQMWNP, (SEQ ID NO: 11)
FPSWTSKNQQWTNQRQ,
or (SEQ ID NO: 13)
SKETYSMNAQRQHERS.

8. The composition of claim 7, wherein the C' terminus of the MGS peptide comprising the amino acid sequence of GFHNVYPYTWGGFSDIDLMADEI (SEQ ID NO:1), EQRWVQMLHLQTRYAGEWPG (SEQ ID NO:2), or FQHNPFPYTYSMEDTDVEIK (SEQ ID NO:3) is attached to the first linker.

9. The composition of claim 7, wherein the first linker is attached to the second linker.

10. The peptide of claim 1, wherein the peptide is a Molecular Transport System (MTS) peptide that selectively binds to and internalizes into the CNS cells.

* * * * *